US00RE40189E

(19) United States
(12) Reissued Patent
Nagashima et al.

(10) Patent Number: US RE40,189 E
(45) Date of Reissued Patent: Mar. 25, 2008

(54) METHOD AND APPARATUS FOR OBJECT ORIENTED PROGRAMMING IN COMPONENT BUILDING, ITS STORAGE MEDIUM, USES, SUPPORT AND OBJECT BETWEEN-NETWORK-DISPLAY

(75) Inventors: Fumio Nagashima, Kawasaki (JP); Kaori Suzuki, Kawasaki (JP); Asako Yumoto, Kawasaki (JP); Tsuguto Maruyama, Kawasaki (JP); Shigeru Sasaki, Kawasaki (JP); Ryousuke Suda, Kawasaki (JP); Miwa Ueki, Kawasaki (JP)

(73) Assignee: Fujitsu Limited, Kawasaki (JP)

(21) Appl. No.: 11/370,278

(22) Filed: Mar. 8, 2006

Related U.S. Patent Documents

Reissue of:
(64) Patent No.: 6,178,545
Issued: Jan. 23, 2001
Appl. No.: 08/919,254
Filed: Aug. 28, 1997

U.S. Applications:
(63) Continuation-in-part of application No. 08/855,986, filed on May 14, 1997, now abandoned.

(30) Foreign Application Priority Data

Jun. 27, 1997 (JP) ..... 9-171782

(51) Int. Cl.
*G06F 9/44* (2006.01)
G06F 9/45

(52) U.S. Cl. ..... 717/101; 717/110; 717/120

(58) Field of Classification Search ..... 717/108–110, 717/120–121
See application file for complete search history.

(56) References Cited

U.S. PATENT DOCUMENTS 4,809,170 A * 2/1989 Leblang et al. ..... 395/703
5,265,206 A * 11/1993 Shackelford et al. ..... 709/303
5,339,433 A * 8/1994 Nielsen ..... 395/705

(Continued)

FOREIGN PATENT DOCUMENTS

JP 61-245280 * 10/1986
JP 2-113370 * 4/1990
JP 2-128275 * 5/1990

OTHER PUBLICATIONS

Yoshimura et al, "Defining a strategy to introduce a software product line using existing embadded systems", ACM EMSOFT, pp. 63–72, 2006.*
Pandey et al, "BOTS: A constraints based component system for synthesizing scalable software systems", ACM LCTES, pp. 189–198, 2006.*
Rine et al, "Using adapters to reduce interaction complexity in resubale component based software development", ACM SSR pp. 37–43, 1999.*
Basili et al, "Characterizing and modeling the cost of rework in a librray of reusable software components", ACM, JCSE, pp. 282–291, 1997.*
Jacobson, "Object orienetd development in an industrial environment", ACM OOPSLA, pp. 183–191, Oct. 1987.*
Taylor et al, "An object message model for the development of integrated workstation software", ACM pp. 43–52, Jul. 1990.*

(Continued)

*Primary Examiner*—Anil Khatri
(74) *Attorney, Agent, or Firm*—Staas & Halsey LLP

(57) ABSTRACT

As to an object-oriented programming, reuse of softwares is enhanced and running speed is improved. There are made up a data element list in which pointers to data storage areas of object A are arranged and a pointer element list in which pointers to pointer storage areas of object B are arranged. A combination of the data element list and the pointer element list makes it possible to directly refer to data of the object A from the object B.

2 Claims, 84 Drawing Sheets

U.S. PATENT DOCUMENTS

| | | | | | |
|---|---|---|---|---|---|
| 5,551,035 | A | * | 8/1996 | Arnold et al. | 709/303 |
| 5,560,014 | A | * | 9/1996 | Imamura | 717/1 |
| 5,572,731 | A | * | 11/1996 | Morel et al. | 717/1 |
| 5,572,733 | A | * | 11/1996 | Ryu et al. | 717/1 |
| 5,581,761 | A | * | 12/1996 | Radia et al. | 395/702 |
| 5,586,326 | A | * | 12/1996 | Ryu et al. | 717/1 |
| 5,632,034 | A | * | 5/1997 | O'Farrell | 717/1 |
| 5,758,160 | A | * | 5/1998 | McInerney et al. | 395/701 |
| 5,764,897 | A | * | 6/1998 | Khalid | 709/201 |
| 5,787,413 | A | * | 7/1998 | Kauffman et al. | 707/2 |
| 5,860,004 | A | * | 1/1999 | Fowlow et al. | 717/109 |
| 5,907,707 | A | * | 5/1999 | Ramalingam et al. | 717/1 |
| 5,926,637 | A | * | 7/1999 | Cline et al. | 717/1 |
| 6,028,998 | A | * | 2/2000 | Gloudeman et al. | 717/1 |
| 6,071,317 | A | * | 6/2000 | Nagel | 717/4 |
| 6,077,312 | A | * | 6/2000 | Bates et al. | 717/4 |
| 6,604,196 | B1 | * | 8/2003 | Monday et al. | 713/100 |
| 7,103,873 | B2 | * | 9/2006 | Tanner et al. | 717/109 |
| 7,124,135 | B1 | * | 10/2006 | Turba et al. | 707/100 |
| 7,188,158 | B1 | * | 3/2007 | Stanton et al. | 709/220 |

OTHER PUBLICATIONS

Bensley et al, "An execution model for distributed object orienetd computation", ACM OOPSLA, pp. 316–322, Oct. 1987.*

Durham and Johnson, "A framework for run–time systems and its visual programming language", OOPSLA96, ACM. pp. 406–420, 1996.*

U.S. Appl. No. 08/855,986, Nagashima et al., filed May 14, 1997.*

Austin et al, "Efficient detection of all pointers and arrays access errors", SIGPLAN ACM, pp. 290–301, 1994.*

Edelson, "A mark and sweep collector for C++", ACM pp. 51–58, Aug. 1992.*

Hayes, "Using key object opportunism to collect old objects", ACM OOPSLA, pp. 33–46, May 1991.*

Jarvinen et al, "Object oriented specification of reactive systems", IEEE, pp. 63–71, 1990.*

* cited by examiner (BUS)

| |
|---|
| POINTER TO SUBSTANTIAL OBJECT |
| POINTER TO BUS OF SUBSTANTIAL OBJECT |
| POINTER TO NEXT BUS |
| OTHER DATA |

| | |
|---|---|
| OBJECT B : BUS1 | OBJECT C : BUS2 |
| OBJECT B : BUS1 | OBJECT D : BUS2 |
| OBJECT B : BUS1 | OBJECT E : BUS1 |
| | |
| | |
| | |

| | |
|---|---|
| OBJECT B : BUS1 | OBJECT C : BUS2 |
| OBJECT B : BUS1 | OBJECT E : BUS1 |
| OBJECT B : BUS1 | OBJECT D : BUS2 |
| | |
| | |
| | |

Fig. 113

| | ITEMS | KEYWORDS | REMARKS |
|---|---|---|---|
| (A) | PROJECT | LSIBuilderProject | |
| | PROJECT NAME | LSIBuilderProjectName | |
| | PATH OF COMPILER SYSTEM | MSVCRoot | |
| | PATH OF FIRSTSIGHT SYSTEM | CoreRoot | |
| | PATH OF USER AREA | UserRoot | |
| (B) | DEFINITION OF ARCHIVES | Archives | |
| | NAME OF ARCHIVES | ArchivesName | |
| | PATH OF LIB | LibPath | |
| | PATH OF DLL | DllPath | |
| (C) | NAME OF LIBRARY TO BE BUILT | LibName | |
| | COMPILE MODE | Debug | |
| | DEFINITION OF #define AND typedef | Header | |
| (D) | DEFINITION OF LSI | LSI | |
| | NAME OF LSI | LSIName | |
| | COLOR OF LSI | Color | TREE COLORS OF RGB (0-255) |
| | DATA BUS | DataBus | |
| | NAME OF DATA CORRECTION PROCESS | ProcessName | |
| | NAME OF DATA BUS | Name | |
| | TYPE OF VARIABLES | VariableType | CODE OF FUNCTION |
| | DATA CORRECTION PROCESS | Process | |
| | DIRECT DEVELOPMENT INTO DefineConnector | Inline | |
| | DISTINCTION BETWEEN INPUT AND OUTPUT | IO | input OR output |
| | COLOR OF BUS | Color | |
| | INSTRUCTION | InstBus | |
| | NAME OF INSTRUCTION BUS | Name | |
| | FUNCTION NAME OF ENTRY POINT | ProcessName | |
| | MEANING OF RETURN VALUE | ReturnValue | zero OR nonzero OR NUMERAL |
| | INSTRUCTION PROCESS | Process | CODE OF FUNCTION |
| | Cmd ? | Cmd | yes/no |
| | DIRECT DEVELOPMENT INTO Cmd OR Command | Inline | |
| | COLOR OF BUS | Colo | |
| | GLOBAL VARIABLES (GLOBAL VARIABLES INSIDE LSI) | Variables | |
| | DEFINITION #define AND typedef | Header | |
| | INITIALIZATION PROCESS | Initialize | CODE OF FUNCTION |
| | CONSTRUCTOR | Constructor | CODE OF FUNCTION |
| | DESTRUCTOR | Destructor | CODE OF FUNCTION |

METHOD AND APPARATUS FOR OBJECT ORIENTED PROGRAMMING IN COMPONENT BUILDING, ITS STORAGE MEDIUM, USES, SUPPORT AND OBJECT BETWEEN-NETWORK-DISPLAY

Matter enclosed in heavy brackets [ ] appears in the original patent but forms no part of this reissue specification; matter printed in italics indicates the additions made by reissue.

This application is a continuation-in-part, of application Ser. No. 08/855,986, filed on May 14, 1997, now [pending] *abandoned.*

BACKGROUND OF THE INVENTION

1. Field of the Invention

The present invention relates to an object-oriented programming apparatus for performing object-oriented programming, an object-oriented programming supporting apparatus for supporting an object-oriented programming, a component builder apparatus for building components forming a part of an object, an object-oriented program storage medium for storing therein object-oriented programs, a program storage medium for use in an object-oriented programming, the program storage medium being adapted for storing therein a program to support an object-oriented programming, a component storage medium for storing therein components, and an object-between-network display method of visually displaying in the form of a network of objects, data integration due to data sharing, integration of control flows among objects, and the like, on a plurality of objects produced by object-oriented programming.

2. Description of the Related Art

Hitherto, when a program, which is incorporated into a computer so as to be operated, is described, a programming is performed in such a manner that a function name (command) and a variable are described in turn. In case of such a programming scheme, since there is a need to describe the programming with the commands in its entirety, it is necessary for a programmer to investigate the commands one by one through a manual, or to remember a lot of commands. However, those commands are different for each program language. Accordingly, even if a programmer remembers a lot of commands of a certain program language, when the programmer describes a program with another program language, there occurs such an inconvenience that the programmer has to do over again learning the commands of the program language. Further, formats of programs are also different for each program language. These matters make a description of the program difficult and give such an impression that a development of programs is a special field which is deemed that it is difficult for a nonprofessional to enter thereinto. Recently, programs are increasingly large-scaled and complicated, and thus there is emphasized more and more a necessity that a development of programs is made easier, and also a necessity for contributing to a reuse of the once developed programs.

In such a technical background, recently, object-oriented programming has been widely adopted. An object is a named entity that combines a data structure with its associated operations. That is, the object comprises "data" and "its associated operations". The term "object-oriented" implies a concept that the "data" and "its associated operations", that is, the object, is treated in the form of units. Also in such an object-oriented programming, there is a need to essentially build each individual software (object). After the individual objects are once built, however, a programming is completed in such a manner that a coupling relation of object-to-object is described such that a certain object calls another object. It is expected that this concept of object-oriented programming serves to significantly improve operability of large-scaled and complicated software, the creation of such software, and the maintenance thereof.

In object-oriented programming, an operation in which a certain object calls another object uses concepts of messages and methods such that the calling object issues a message to the called party of the object, while the called party of the object receives the issued message and executes its associated methods (operations). Hitherto, data necessary for a process was provided in the form of arguments of the messages.

One of the objects of the object-oriented programming resides in the point that software (object) once made up can be reused even if the system is altered. In order to implement this, there is a need to make up a relatively small and simple object.

In general, however, it is said that an object-oriented program is low in its execution rate because it takes a lot of time to recognize a corresponding relation between the received message and its assorted method, and also it takes a lot of time to transfer data from an object, which issues the message, to an object which executes the method.

In order to improve the program execution rate, hitherto, there was adopted a technique in which operations in one object are increased to reduce opportunities of issuing messages directed to another object. In this case, however, the operations in one object becomes complicated, and the object is scaled up. This technique is contrary to the desire for reusable object, and thus, it is one of the causes of prohibiting the possibility of promoting reuse of the software in object-oriented programming.

When the object-oriented programs are promoted, the serious problem is involved in handling of a large amount of software accumulated up to now, which is not based on an object-oriented concept. The object-oriented programming technology according to the earlier development has been associated with such a problem that the possibility of promoting reuse of the existing software is extremely low.

SUMMARY OF THE INVENTION

In view of the above-mentioned problem, it is therefore an object of the present invention to provide the function of coupling a plurality of objects with one another so that information efficiently flows among the plurality of objects. This function is provided in an object-oriented programming apparatus and an object-oriented program storage medium for storing therein a plurality of objects and object-coupling programs.

To attain the above-mentioned object, according to the present invention, there is provided an object-oriented programming apparatus for interconnecting a plurality of objects. A first object includes an output instruction bus portion for issuing messages directed to at least one other object. A second object includes an input instruction bus portion responsive to messages issued by another object and depicted to activating a method in the second object associated with the received message. A data element list of a third object is generated, in which pointers to data storage areas for storing data are arranged. A pointer element list of a fourth object are generated in which pointers to pointer storage areas for storing pointers to data are arranged. The transfer of data between the third object and the fourth object is provided by writing the pointers arranged in the data element list of the third object into the pointer storage areas indicated by the pointers arranged in the pointer element list of the fourth object.

In the object-oriented programming apparatus and storage medium according to the present invention, it is preferable that a method element list is generated including as method elements a method ID for specifying a method of another object associated with a message of the object itself, and a pointer to another object in which the method specified by the method ID is executed.

BRIEF DESCRIPTION OF THE DRAWINGS

FIG. 94 is a typical illustration showing a cable list element list;

FIG. 95 is a view exemplarily showing a cable list displayed on a display screen 102a;

FIG. 113 is a view showing a table for definition items to give various definitions shown in FIG. 112.

DESCRIPTION OF THE PREFERRED EMBODIMENTS

Hereinafter, there will be described embodiments of the present invention.

First, there will be explained an outline of an object ware programming system in which embodiments according to the present invention are put together, and then each individual embodiment will be explained.

Figure 1:
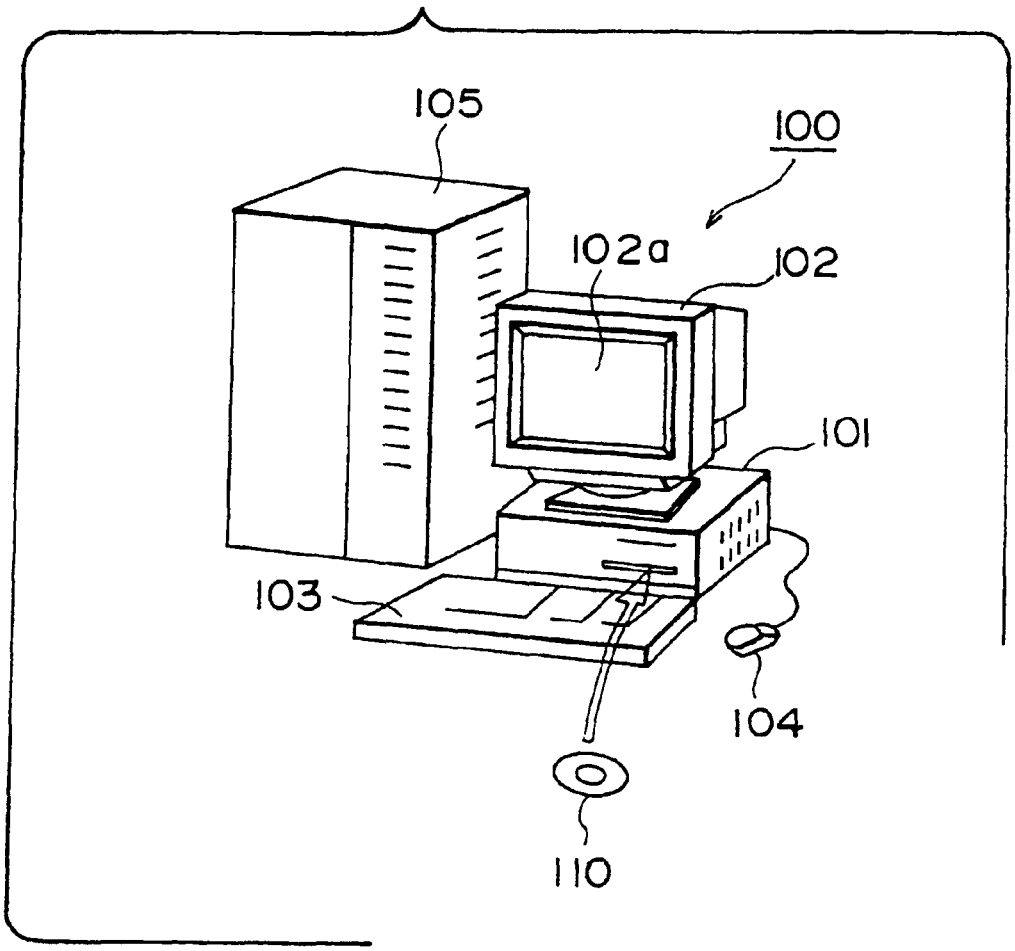
FIG. 1 is a perspective illustration of a computer system including an object-oriented programming apparatus according to an embodiment of the present invention.

FIG. 1 is a perspective illustration of a computer system including each individual embodiment of the present invention of an object-oriented programming apparatus, an object-oriented programming supporting apparatus, a component builder apparatus, an object-oriented program storage medium, a program storage medium for use in an object-oriented programming, a component storage medium, and an object-between-network display method.

In FIG. 1, a computer system 100 comprises: a main body unit 101 incorporating thereinto a CPU, an MO (magneto-optical disc) drive and the like; an image display unit 102 for displaying on its display screen 102a images in accordance with an instruction from the main body unit 101; a keyboard 103 for inputting various types of information to the computer system 100; a mouse 104 for designating a desired position on the display screen 102a of the display 102; and a storage unit 105 for storing objects, object coupling programs and the like which will be described hereinafter.

A development of programs can be implemented by the computer system 100 shown in FIG. 1. It is acceptable that programs, which are developed by another same type of computer system, are stored in a portable type of recording medium such as an MO (magneto-optical disc) 110, and the MO 110 is loaded into the computer system 100 shown in FIG. 1 so that the developed programs can be inputted into the computer system 100. Likewise, it is possible to transfer the programs developed with the use of the computer system 100 shown in FIG. 1 through the MO 110 to another computer system.

Figure 2:
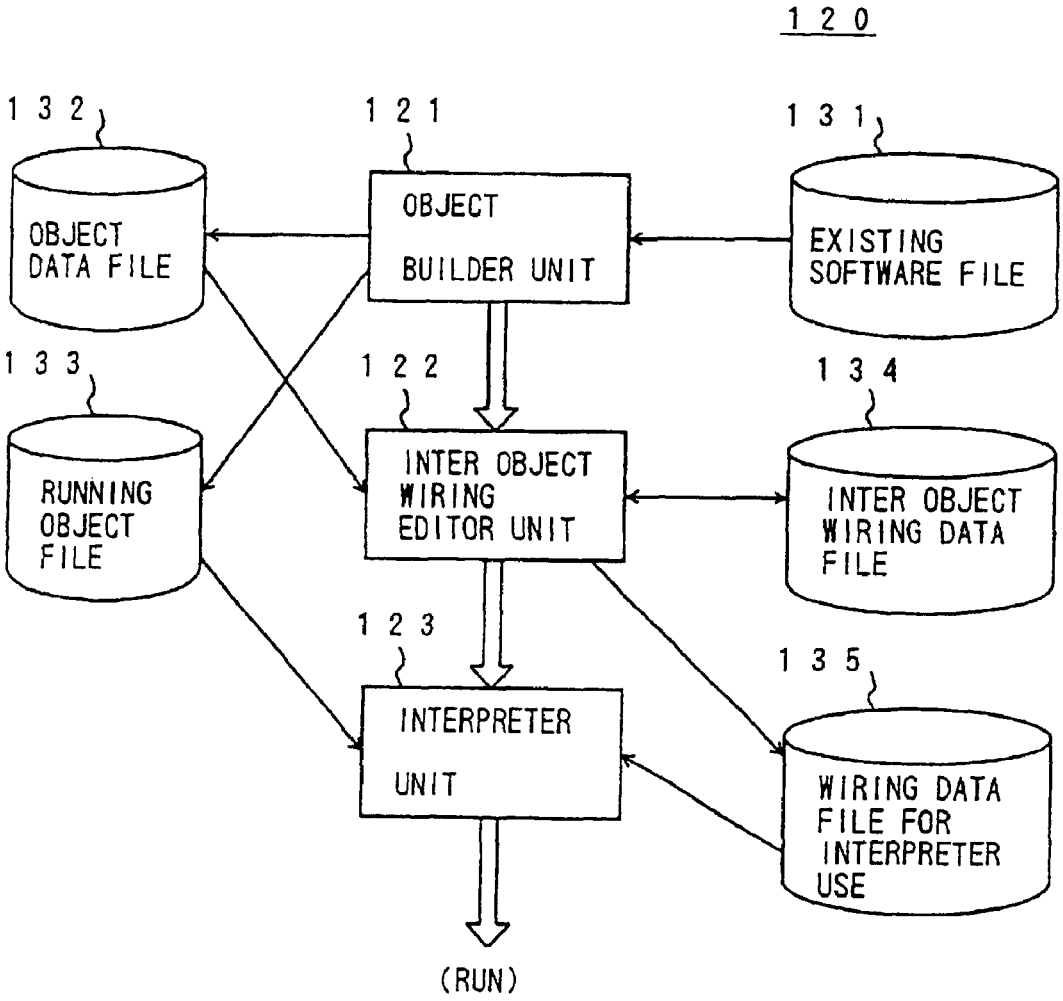
FIG. 2 is a block diagram of an object ware programming system implemented in the computer system shown in FIG. 1.

FIG. 2 is a block diagram of an object ware programming system implemented in the computer system shown in FIG. 1.

An object ware programming system 120 comprises an object builder unit 121 for building objects and/or a component which "includes" existing softwares, an interobject wiring editor unit 122 for displaying a wiring among objects (a coupling relation) to preform an editing, and an interpreter unit 123 for connecting and running objects (including an object consisting of a combination of the existing software and the component), which are generated in the object builder unit 121, in accordance with the wiring among objects, or the coupling relation, which is defined by the interobject wiring editor unit 122.

While the object builder unit 121 can build directly an object through an operation of the keyboard 103 or the mouse 104 in the computer system 100 shown in FIG. 1, the object ware programming system 120 is provided with an existing application file 131 for storing existing various types of application programs (hereinafter, it may happen that the application program is referred to simply as an application), which have been developed with various types of program languages. And thus the object builder unit 121 may also build a component which serves as one object, "involving" the editing application stored in the existing application file 131, together with the existing application. It is to be noted that the object is expressed including an object consisting of a combination of the above-mentioned component and the exiting application "involved" in the component, unless we note the particular.

The object built in the object builder unit 121 is stored in an object data file 132 and a running object file 133. The object data file 132 stores therein, of data representative of the object built in the object builder unit 121, data necessary for a display of objects and a wiring (definition of the coupling relation) among objects. On the other hand, the running object file 133 stores therein running objects in which the object built in the object builder unit 121 is converted into a running format of one.

The interobject wiring editor unit 122 displays, upon receipt of data as to an object stored in the object data file 132, the object on the display screen 102a of the image display unit 102 shown in FIG. 1, and defines a coupling state among objects in accordance with an operation of the keyboard 103 or the mouse 104. As will be described, a display on the display screen 102a is given with a display style close to that of an LSI (Large Scale Integrated Circuit)

as the hardware, and a definition of the coupling state among objects is performed in such a sense that terminals of such a plurality of LSI's are wired by signal lines. Hence, hereinafter, it may happen that the object is referred to as "LSI", and a definition of the coupling state among objects is referred to as "wiring".

When a wiring among objects is performed by the interobject wiring editor unit 122, an interobject wiring data file 134 is used for the purpose of saving an intermediate result of the wiring and displaying the intermediate result through loading. The interobject wiring data file 134 stores wiring information which is convenient as a man-machine interface. For example, in the system according to present embodiment, there is provided a hierarchical structure of objects for the purpose of easy understanding of wiring for users. The interobject wiring data file 134 stores also data as to such a hierarchical structure.

In this manner, when the interobject wiring editor unit 122 has completed the wiring, an interpreter use wiring data file 135 stores information (hereinafter, it is referred to as "wiring data") representative of a coupling state among objects. When the interpreter use wiring data file 135 stores the wiring data, information simply available for user's understanding, for example, information of the hierarchical structure of objects, is omitted, and only the wiring data, which is necessary for actuation of the object (software), is extracted and stored in the interpreter use wiring data file 135.

In the interpreter unit 123, the running objects stored in the running object file 133 are coupled and executed in accordance with the wiring data stored in the interpreter use wiring data file 135.

Hereinafter, the respective embodiments will be described. As a matter of convenience of explanation and for better understanding of the invention, there will be described, taking into account of the arrangement of the object ware programming system 120 shown in FIG. 2, first, the embodiment concerning the interpreter unit 123 and the associated periphery, then the embodiment concerning the interobject wiring editor unit 122 and the associated periphery, and finally the embodiment concerning the object builder unit 121 and the associated periphery.

First, there will be described the embodiment concerning the interpreter unit 123 and the associated periphery.

Figure 3:
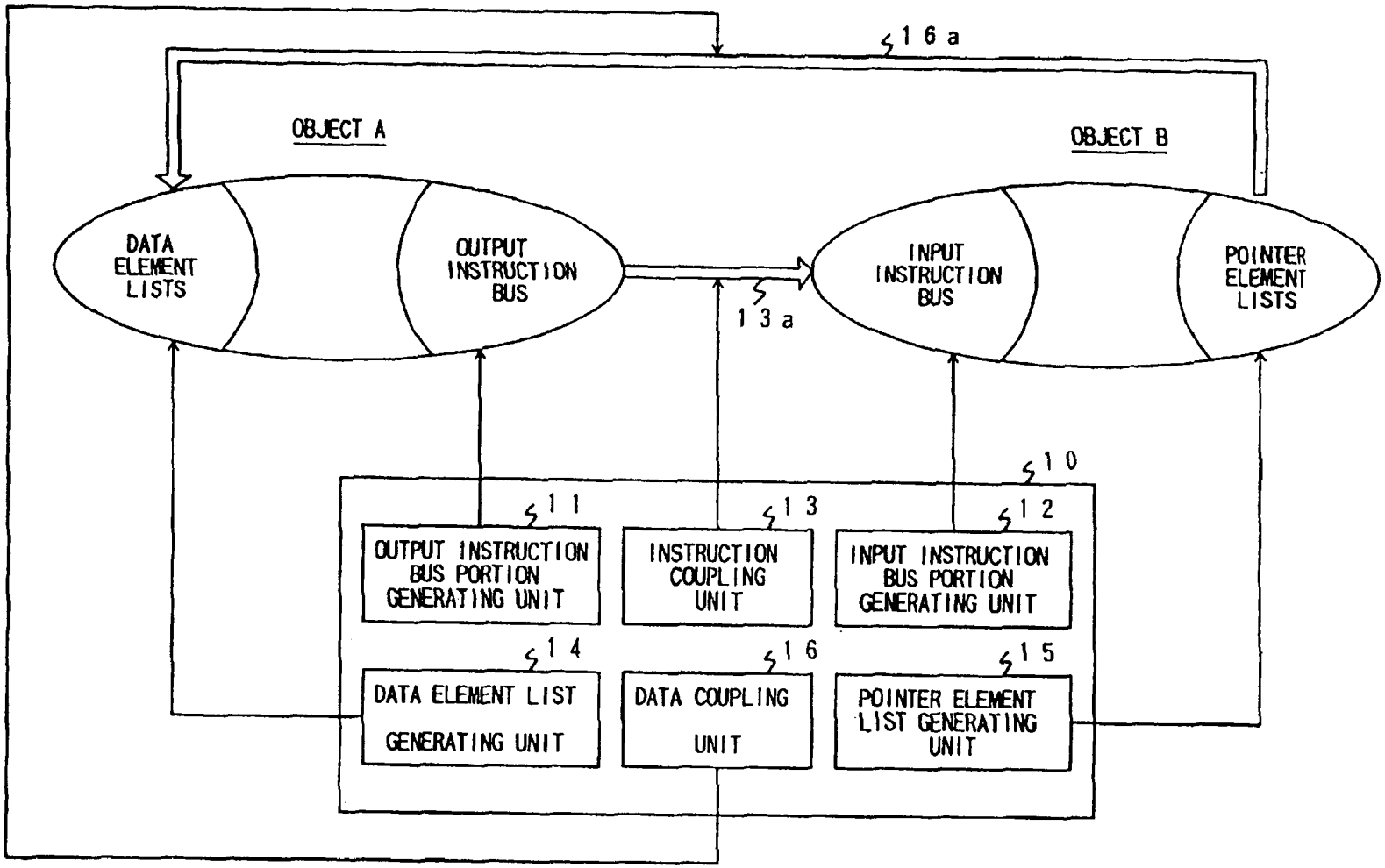
FIG. 3 is a typical illustration showing a first example of a software system implemented within the computer system shown in FIG. 1.

FIG. 3 is a typical illustration showing a first example of a software system implemented within the computer system shown in FIG. 1. Now referring to FIG. 3, there will be described a schematic construction of a first object-oriented programming apparatus and a first object-oriented program storage medium according to one embodiment of the present invention, and then referring to FIG. 4 et seq. there will be described details of those.

A corresponding relation between the software system shown in FIG. 3 and the present invention is as follows. That is, the storage unit 150 (FIG. 1), in which the software system shown in FIG. 3 is stored, corresponds to the first object-oriented program storage medium according to an embodiment of the present invention, and a combination of the hardware of the computer system 100 shown in FIG. 1 and an object coupling unit 10 which is in a state operable under the computer system 100 corresponds to the first object-oriented programming apparatus. Incidentally, when the software system showing FIG. 3 is downloaded onto the MO 110, the MO 110 also corresponds to an example of the first object-oriented program storage medium according to an embodiment of the present invention.

Now, let us consider typically two objects A and B each comprising data and processing (method).

An output instruction bus portion generating unit 11, in the object coupling unit 10, generates a portion which forms a core of an output instruction bus portion for performing an issue process of a message of an object (for example object A) to another object (for example object B).

An input instruction bus portion generating unit 12, in the object coupling unit 10, generates an input instruction bus portion of an object (for example object B). The input instruction bus portion receives a message directed to the self object (for example object B) issued by another object (for example object A), and activates a method of the self object (for example object B), which method is associated with the received message.

Incidentally, according to the present embodiment, the output instruction bus portion generating unit 11 and the input instruction bus portion generating unit 12 are provided in the object coupling unit 10. However, it is acceptable that the objects A and B have originally structures corresponding to the output instruction bus portion or the input instruction bus portion. Alternatively, it is acceptable that the object coupling unit 10 does not always comprise the output instruction bus portion generating unit 11 and the input instruction bus portion generating unit 12.

An instruction coupling unit 13, in the object coupling unit 10, permits a message to be transferred between objects (objects A and B) by means of giving an association of a message of the object A with a method of object B.

A data element list generating unit 14, in the object coupling unit 10, generates a data element list of an object (typically object A) in which pointers to data storage areas for storing therein data are arranged.

Likewise, a pointer element list generating unit 15, in the object coupling unit 10, generates a pointer element list of an object (object B) in which pointers to pointer storage areas for storing therein pointers to data are arranged.

A data coupling unit 16, in the object coupling unit 10, permits a message to be transferred between objects A and B by means of writing pointers, which are arranged in the data element list produced by the data element list generating unit 14, into pointer storage areas indicated by the pointers arranged in the pointer element list of the object B produced by the pointer element list generating unit 15.

Figure 4:
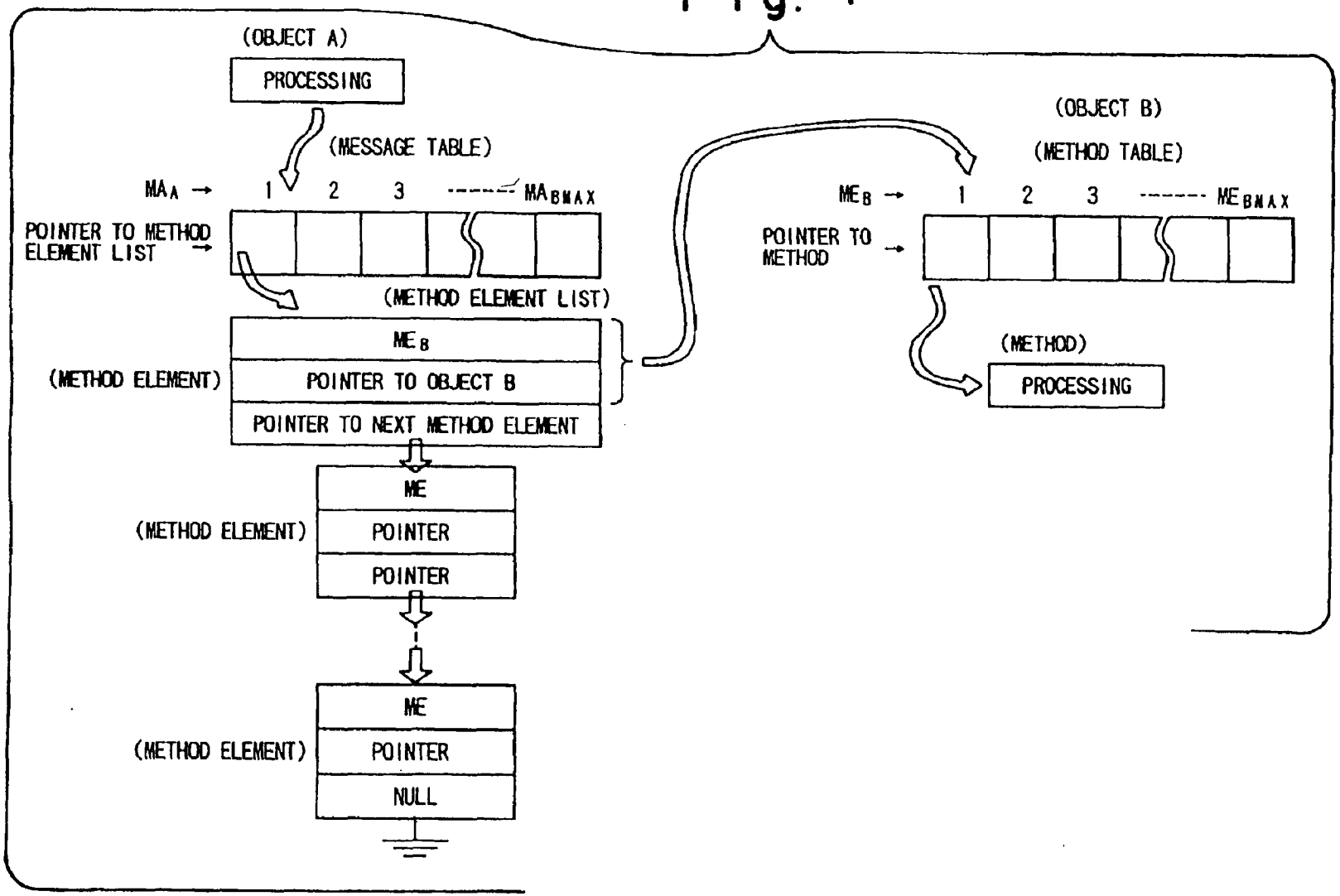
FIG. 4 is a typical illustration showing an example of a data structure of an output instruction bus portion of an object A and an input instruction bus portion of an object B shown in FIG. 3.

FIG. 4 is a typical illustration showing an example of a data structure of an output instruction bus portion of an object A and an input instruction bus portion of an object B shown in FIG. 3.

The object A has a message table consisting of an arrangement of a maximum number $MA_{AMAX}$ of messages of the object A. The message table stores pointers to a method element list, which will be described hereinafter, corresponding to a message number $MA_A$ of each message (where a message number is expressed by MA and it is expressed by a suffix A that the message number is of a message of the object A).

The method element list consists of an arrangement of a single or a plurality of method elements. Each of the method elements comprises a method number ME for specifying a method, a pointer to an object in which the method specified by the method number ME is executed, and a pointer to the subsequent method element. Here, the method number is expressed by an ME, and the object in which the method specified by the method number ME is executed is expressed by a suffix. Specifically, the uppermost state of the method element shown in FIG. 3 stores a method number $ME_B$ of a method of the object B, and a pointer to the object B.

The last stage of method element $ME_B$ in FIG. 3 stores a pointer to the subsequent method element data (referred to as "null") indicating of that the method element is of the final stage itself and there is no method element after itself.

The method element lists are generated at the maximum by a number corresponding to the number of messages of the object A. Each of the method element lists corresponds to the associated message of the object A. When the message is issued, the associated method element list is referred to.

While a one method element list corresponds to a one message on a one-to-one basis, it is not always arranged that method elements arranged on a one method element list are the only ones related to a certain object (e.g. the object B) and it is permitted that method elements related to a plurality of methods of a plurality of objects are arranged on a one method element list.

While the above-mentioned description explains a construction of the output instruction bus unit of the object A, the output instruction bus unit is provided for each of the objects which issue messages to another object.

The object B has a method table consisting of an arrangement of a maximum $ME_{BMAX}$ of a method number $ME_B$ of the object B. The method table stores therein a pointer to the method specified by the method number $ME_B$, corresponding to the method number $ME_B$ of each method.

While the above-mentioned description explains a construction of the input instruction bus unit of the object B, the input instruction bus unit receives a message issued by another object, in a similar fashion to that of the output instruction bus unit, and is provided for each of the objects, which executes the method associated with the received message. In some cases, it happens that one object has both an output instruction bus unit and an input instruction bus unit.

Figure 5:
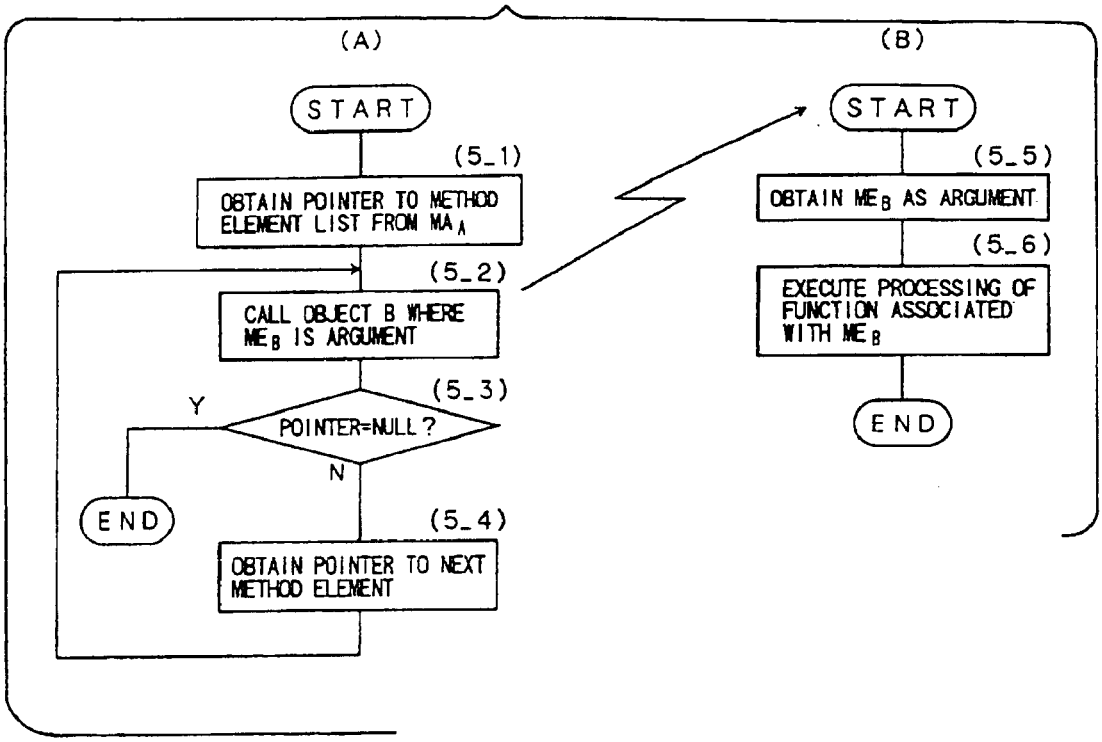
FIGS. 5(A) and (B) are flowcharts useful for understanding processing for issue of a message.

FIG. 5 is a flowchart useful for understanding processings for an issue of a message.

When it is intended to issue a message in a certain processing in execution in the object A, a message table is referred to so as to obtain, from a message number MA of the message intended to be issued, a pointer to the method element list associated with the message number $MA_{Ani}ID$ (step 5_1), so that the method elements arranged in the method element list indicted by the pointer are referred to. For example, when the uppermost stage of the method element shown in FIG. 4 is referred to, the object B indicated by a pointer stored in the method element referred to is called wherein a method number $ME_B$ stored in the method element serves as an argument (step 5_2). Such a message issue processing is performed on each of the method elements arranged in a one method element list for each issue of a one message (steps 5_3, 5_4).

In the object B called wherein the method number $ME_B$ serves as an argument, the method number $ME_B$ given in the form of an argument is obtained (step 5_5). In step 5_6 there is provided such a process that the method table is referred to so as to obtain a pointer to a method specified by the obtained method number $ME_B$, and a processing of the method indicated by the pointer is performed.

Figure 6:
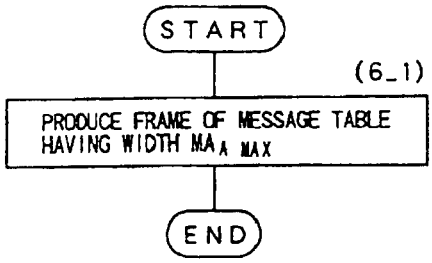
FIG. 6 is a flowchart useful for understanding processings of an output instruction bus portion generating unit of an object coupling unit shown in FIG. 3.

FIG. 6 is a flowchart useful for understanding processings of an output instruction bus portion generating unit 11 of an object coupling unit 10 shown in FIG. 3.

In step 6_1, a frame of the message table having a width $MA_{AMAX}$ shown in FIG. 4 is produced.

Incidentally, according to the present embodiment, it is so arranged that when the object A issues a message, a pointer of the method element list is identified through a message table. However, it is acceptable that the pointer to the method element is written directly into a process (method) of the object A, for example, and thus in this case, there is no need to provide the message table. In other words, the process shown in FIG. 6, or the output instruction bus portion generating unit 11 shown in FIG. 3 is not always needed.

Figure 7:
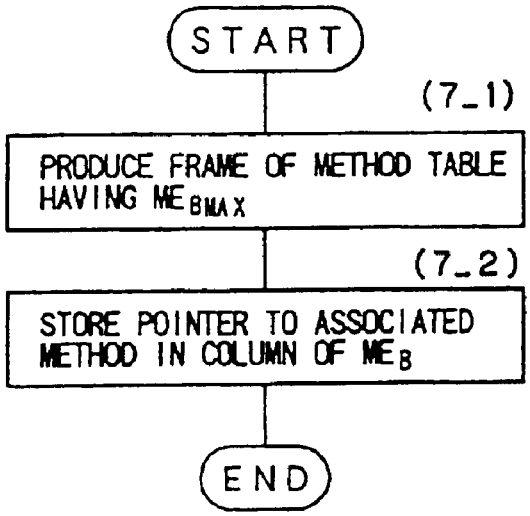
FIG. 7 is a flowchart useful for understanding processings of an input instruction bus portion generating unit of an object coupling unit shown in FIG. 3.

FIG. 7 is a flowchart useful for understanding processings of an input instruction bus portion generating unit 12 of an object coupling unit 10 shown in FIG. 3.

In step 7_1, a frame of the method table having a width $ME_{BMAX}$ shown in FIG. 4 is produced. And in step 7_2, a pointer to the method associated with the respective method number $ME_B$ is stored in a column of the respective method number $ME_B$ within the frame.

Incidentally, according to the present embodiment, it is so arranged that a pointer of the method is recognized through a method table. However, there may be no need to provide an association of the method number $ME_B$ with the pointer to the method in form of the message table. Accordingly, the process shown in FIG. 7, or the input instruction bus portion generating unit 12 shown in FIG. 3 is not always needed.

Figure 8:
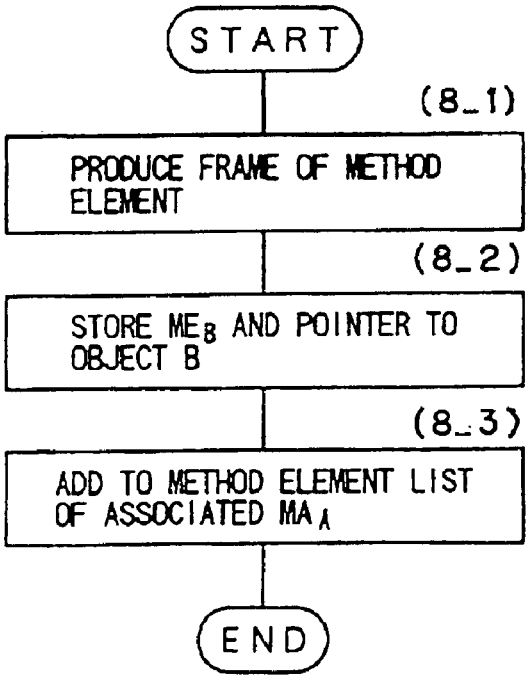
FIG. 8 is a flowchart useful for understanding processings of an instruction coupling unit of an object coupling unit shown in FIG. 3.

FIG. 8 is a flowchart useful for understanding processings of an instruction coupling unit 13 of an object coupling unit 10 shown in FIG. 3. Here, also it is assumed that the object B is typical of another object.

When the method elements are produced, an operator, who operates the computer system shown in FIG. 1, designates a corresponding relation between a message and a method. This corresponding relation is determined by the following designations.

(a) A pointer of the object A (b) A pointer of the object B (c) A message number $MA_A$ of the object A (d) A method number $ME_B$ of the object B It is noted that designations of the above-noted (a) to (d) are performed, for example, in such a manner that designations for a name of the object, a processing (e.g. "display on a screen the spreadsheet program and the spreadsheet result") and the like are performed by clicking through an operation of a mouse 104 (cf. FIG. 1), of an icon displayed on a display screen 102s. More in detail, as will be described later, objects are displayed in the form of an LSI, and a designation is performed through an operation for wiring among terminals of the LSI's using the mouse 104.

In the processing shown in FIG. 8, first, a frame of the method element is produced (step 8_1). In step 8_2, the method number $ME_B$ and the pointer of the object B are stored in the frame of the method element, so that they are added to the method element list of the associated message number $MA_A$ (step 8_3). That is, the pointer to the method element to be added is stored in the column of the pointer to the next method element, of the last stage of method element arranged in the method element list, and the "null" is stored in the column of the pointer to the next method element, of the method element to be added. The processing shown in FIG. 8 is repeatedly performed, if necessary, to produce the method element list.

Incidentally, when none of method element is arranged in the method element list, according to the present embodiment, a pointer to a method element intended to be registered is stored in the column of the associated message number $MA_A$, of the message table.

According to the present embodiment, producing the method element list in the manner as mentioned above may provide an association of the message of the object A with the method of the object B. This feature makes it possible for an operator to easily grasp a corresponding relation between the message and the method so as to readily recognize the method associated with the message, thereby implementing a high speed processing.

Figure 9:
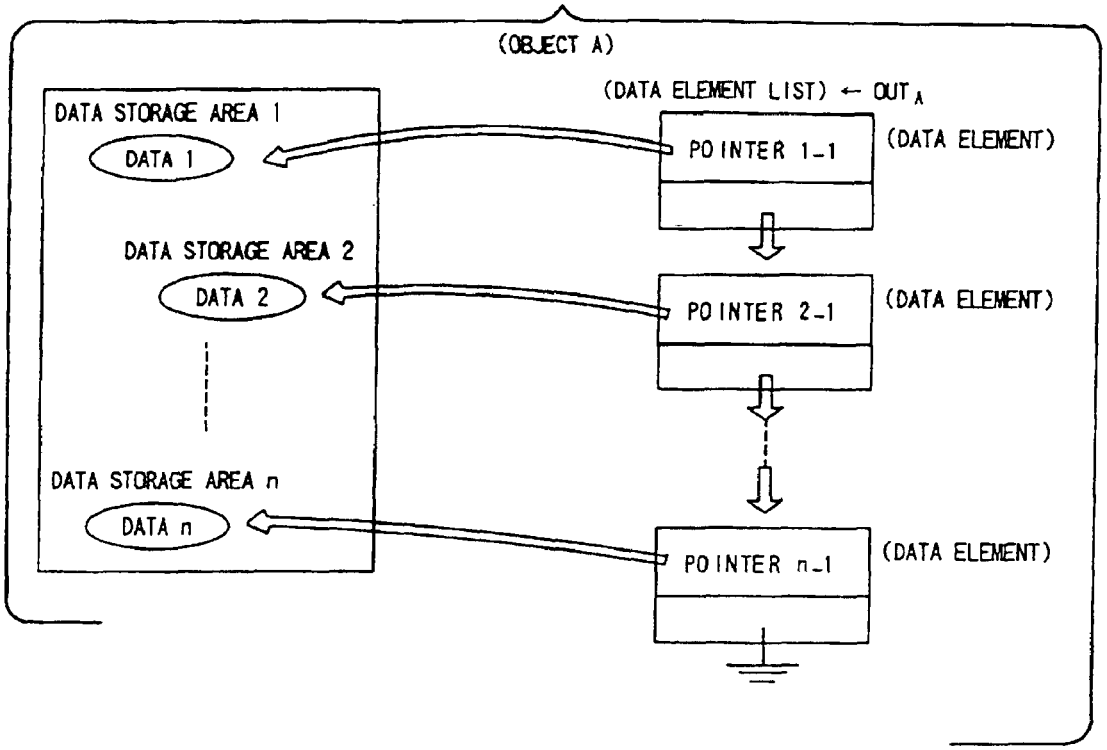
FIG. 9 is a typical illustration showing an example of a data structure of a data element list of the object A shown in FIG. 3.

FIG. 9 is a typical illustration showing an example of a data structure of a data element list of an object A shown in FIG. 3.

The object A includes a lot of data (e.g. n pieces of data) to be transferred to the object B. The data element list generating unit 14 of the object coupling unit 10 shown in FIG. 3 produces the data element lists shown in FIG. 8.

In the data element list, there are arranged the data elements, the number of which corresponds to the number of data (n pieces of data). Each of the data elements comprises a pointer to a data storage area for storing therein data, and a pointer to the subsequent data element. The "null" is written into the column of the pointer to the subsequent data element, of the last stage of the data element. Incidentally, in FIG. 9, for example, the pointer associated with the data storage area 1 is denoted by a pointer 1_1 but not a pointer 1. The reason this is done is so that such a pointer is distinguished from a pointer which will be described later.

An "$OUT_A$" in FIG. 9 denotes a data element list number. As to the data element lists, there is such a possibility that a large number of data element lists are produced in accordance with a number of destinations to which data are transferred. Here, the data element lists are discriminated from one another by the data element list number "$OUT_A$" (where the suffix A denotes the object A).

Figure 10:
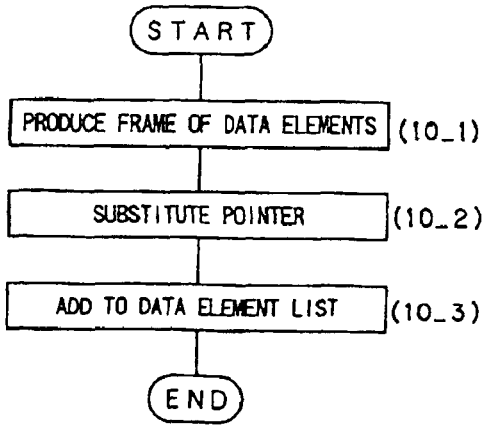
FIG. 10 is a flowchart useful for understanding processings of a data element list generating unit of the object coupling unit shown in FIG. 3.

FIG. 10 is a flowchart useful for understanding processings of a data element list generating unit 14 of an object coupling unit 10 shown in FIG. 3.

In order to produce a data element list, first, a frame of data elements is produced (step 10_1). A pointer to a data storage area is substituted into the frame (step 10_2). In step 10_3, the pointer to the data storage area is added to the data element list. When the pointer to the data storage area is added to the data element list, the pointer to the data element list to be added is stored in the column of the pointer to the next data element, of the data element arranged in the last stage of the data element list, and the "null" is stored in the column of the pointer to the next data element, of the data element list to be added.

The processing shown in FIG. 10 is repeatedly performed, if necessary, to produce the data element list.

Figure 11:
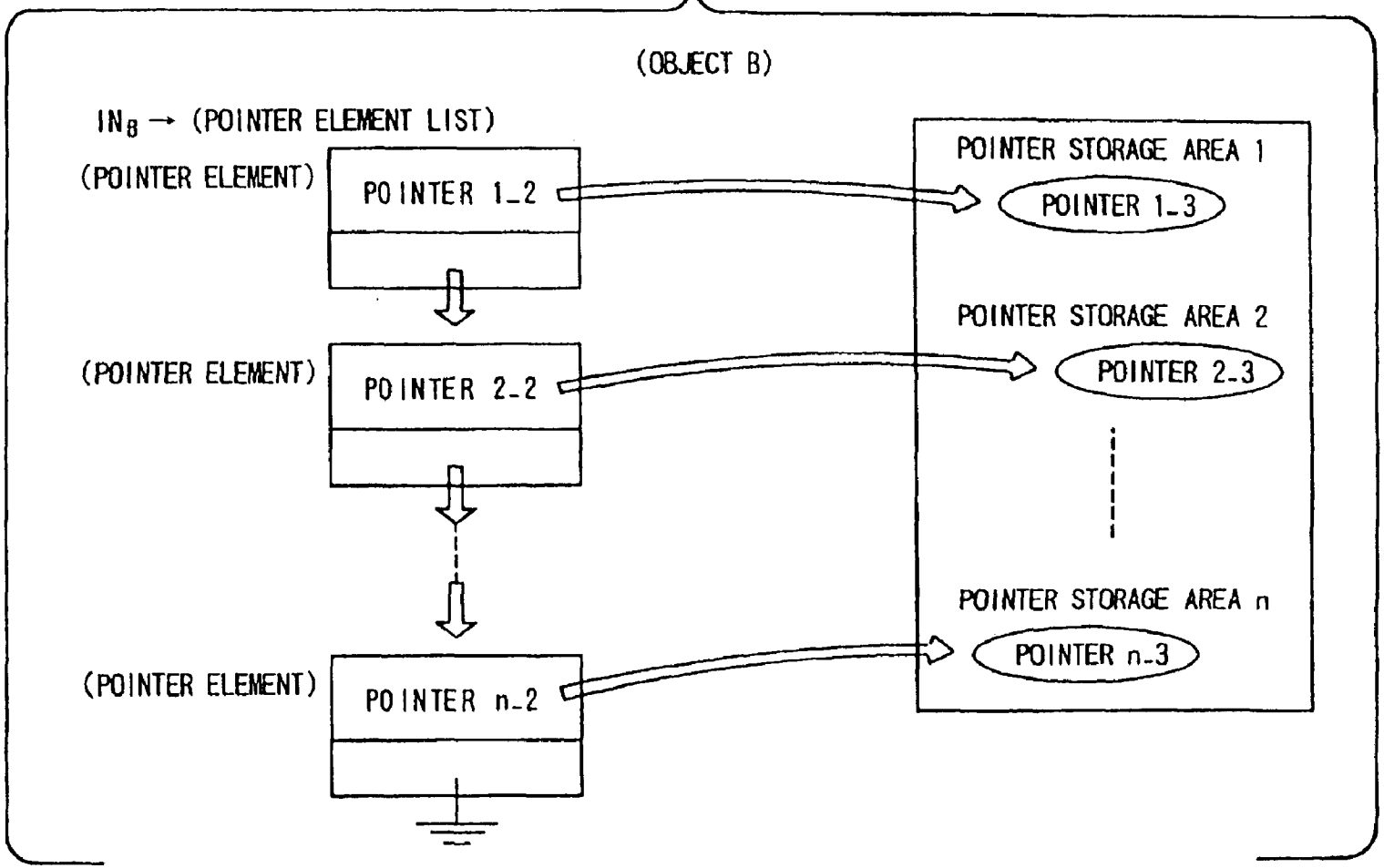
FIG. 11 is a typical illustration showing an example of a data structure of a pointer element list of the object B shown in FIG. 3.

FIG. 11 is a typical illustration showing an example of a data structure of a pointer element list of an object B shown in FIG. 3.

The object B includes a lot of segments (e.g. n pieces of segments) needed to receive data from the object A. Each of the segments has the associated pointer storage area. The pointer storage areas 1 to n store, at the stage before data elements are coupled with pointer elements, arbitrary pointers to data, 1_3, 2_3, . . . , n_3, respectively. The pointer element list generating unit 15 of the object coupling unit 10 shown in FIG. 3 produces the pointer element list shown in FIG. 11.

In the pointer element list, there are arranged the pointer elements the number of which corresponds to the number of pointer storage areas (n pieces of area). Each of the pointer elements comprises a pointer to the associated pointer storage area, and a pointer to the subsequent pointer element. Incidentally, in FIG. 11, for example, the pointer to the pointer storage area 1 is denoted by a pointer 1_2 but not a pointer 1, and an arbitrary pointer stored in the pointer storage area 1 is denoted by a pointer 1_3. The reason this is done so that the pointers in FIG. 11 and the pointers stored in the date elements shown in FIG. 9 can be distinguished from one another.

As to the pointer element lists also, in a similar fashion to that of the data element lists, there is such a possibility that a large number of pointer element lists are produced in accordance with a number of sinks which receive data. Here, the pointer element lists are discriminated from one another by a pointer element list number "$IN_B$" (where the suffix B denotes the object B).

Figure 12:
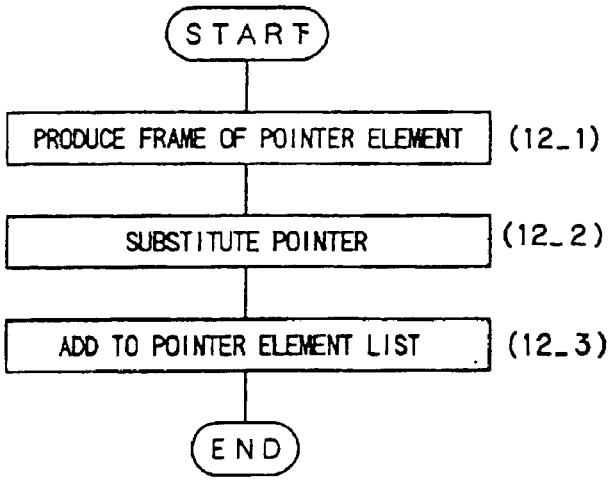
FIG. 12 is a flowchart useful for understanding processings of a pointer element list generating unit of the object coupling unit shown in FIG. 3.

FIG. 12 is a flowchart useful for understanding processings of a pointer element list generating unit 15 of an object coupling unit 10 shown in FIG. 3. This processing is similar to the processing of the data element list generating unit 14, which processing is shown in FIG. 10. Thus, the redundant description will be omitted.

First, a frame of pointer elements is produces (step 12_1). A pointer to the associated pointer storage area is stored in the frame (step 12_2). In step 12_3, the pointer to the associated pointer storage area is added to the pointer element list. The processing shown in FIG. 12 is repeatedly performed, if necessary, to produce the pointer element list.

Figure 13:
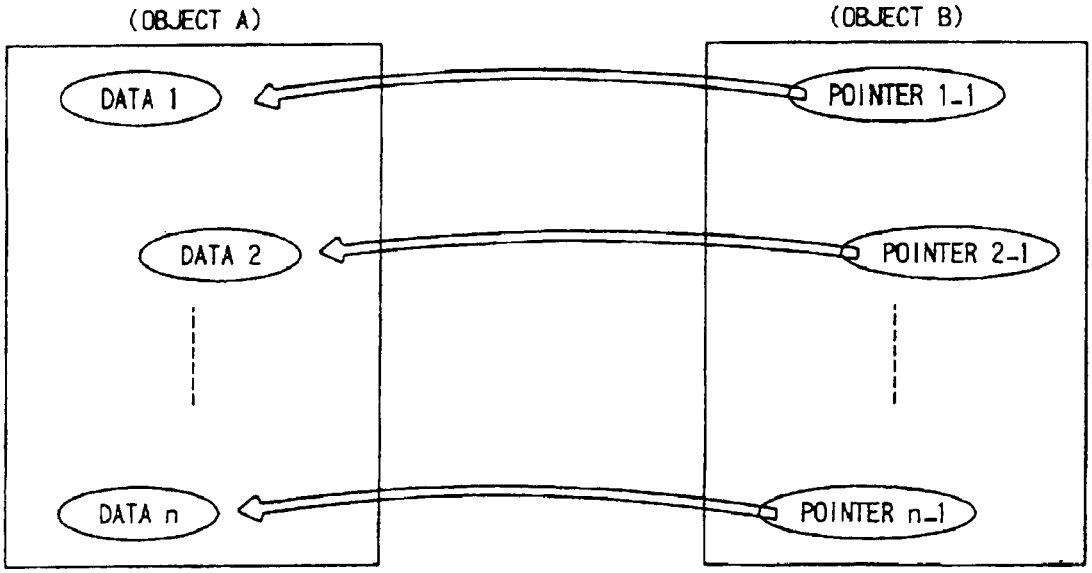
FIG. 13 is a typical illustration showing a structure after an execution of processings of a data coupling unit of the object coupling unit shown in FIG. 3.

FIG. 13 is a typical illustration showing a structure after an execution of processings of a data coupling unit 16 of an object coupling unit 10 shown in FIG. 3.

Pointer storage areas 1 to n of the object B store therein pointers 1_1 to n_1 stored in the data elements arranged in the data element lists shown in FIG. 9, respectively. This structure permits the object B to directly refer to data of the object A.

Figure 14:
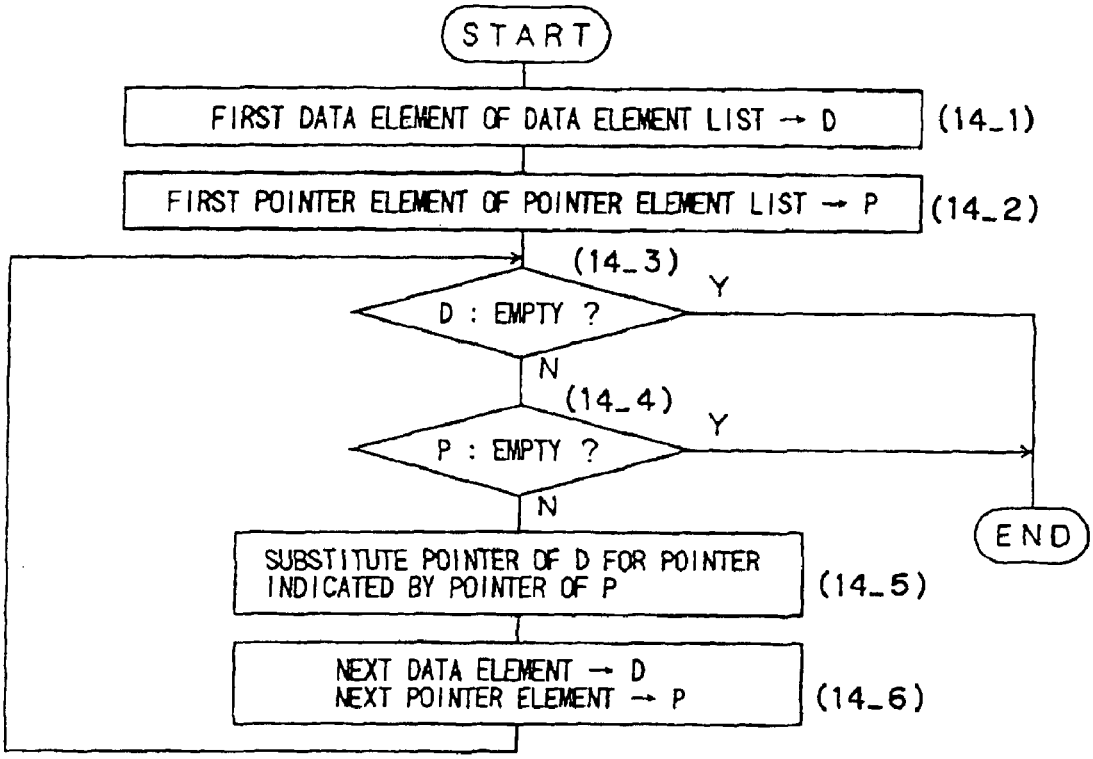
FIG. 14 is a flowchart useful for understanding processings of a data coupling unit of the object coupling unit shown in FIG. 3.

FIG. 14 is a flowchart useful for understanding processings of a data coupling unit 16 of an object coupling unit 10 shown in FIG. 3.

In step 14_1, the pointer 1_1 stored in the data element arranged in the head of the data element list shown in FIG. 9 is stored in a working area D. Likewise, in step 14_2, the pointer 1_2 stored in the pointer element arranged in the head of the pointer element list shown in FIG. 11 is stored in the working area D.

Next, in step 14_3, it is determined whether the working area D is empty, in other words, it is determined whether a mapping, which will be described on step 14_5, is completed up to the last stage of data element arranged in the data element list shown in FIG. 9. When the working area D is empty, the processing shown in FIG. 14 is terminated.

Likewise, in step 14_4, it is determined whether a working area P is empty, in other words, it is determined whether a mapping is completed up to the last stage of pointer element arranged in the pointer element list shown in FIG. 11. When the working area P is empty, the processing shown in FIG. 14 is terminated.

In step 14_5, a pointer (e.g. pointer 1_1 shown in FIG. 9) stored in the working area D is substituted for a pointer (e.g. pointer 1_3) stored in the pointer storage area (e.g. pointer storage area 1) indicated by a pointer (e.g. pointer 1_2 shown in FIG. 11) stored in the working area P. Thus, there is provided a mapping or a correspondence between the data 1 of the object A and the pointer 1_1 of the object B, which mapping is shown in FIG. 13.

In step 14_6, a pointer (e.g. pointer 2_1) stored in the next data element arranged in the data element list shown in FIG. 9 is stored in the working area D. Likewise, a pointer (e.g. pointer 1_2) stored in the next pointer element arranged in the pointer element list shown in FIG. 11 is stored in the working area P. And the process returns to the step 14_3. In this manner, this routine is repeated. Again in step 14_5, when there is provided a mapping between the last stage of data element of the data element list shown in FIG. 9 and the last stage of pointer element of the pointer element list shown in FIG. 11, the process goes to the step 14_6 in which the working areas D and P are reset to be empty. And the process returns to the step 14_3 and the processing shown in FIG. 14 is terminated. While the above-explanation was made assuming that the number of the data elements arranged in the data element list is the same as the number of pointer elements of the pointer element list, when they are different from one another in the number, the working areas D or P are reset to be empty at the time when a mapping for one less in number is terminated, and then the processing of FIG. 14 is terminated.

After the processing of FIG. 14 or the mapping between the data element list and the pointer element list is terminated, the data element list and the pointer element list become useless and thus be erased.

In the data coupling processing explained in conjunction with FIGS. 9 to 14, an operator, who operates the computer system 100, inputs:

(a) A pointer of the object A;

(b) A pointer of the object B;

(c) A data element list number $OUT_A$ of the object A;

(d) A pointer element list number $IN_A$ of the object B.

It is noted that an input of data of the above-noted items (a) to (d) are performed, in a similar fashion to that of the input of the corresponding relation between the message and the method explained referring to FIG. 8, by clicking of an icon displayed on a display screen 102a (cf. FIG. 1).

In the processing shown in FIG. 14, while the mapping between the data elements arranged in the data element list and the pointer elements arranged in the pointer element list is performed in accordance with the sequence of their arrangements, for example, when the objects A and B are made up, a provision of such a rule that the same name or the associated name is given for the data storage area and the pointer storage area which are associated with one another, or such a rule that there is provided an arrangement of the same or associated names in such a manner that the associated one-to-one are arranged in the same sequence makes it possible to generate, by referring to their names or the sequences of the arrangements, the data element list and the pointer element list in which the data elements and the pointer elements, which are associated with one another, respectively, are arranged in the same sequence in their lists, respectively. Thus, it is possible to provide the mapping associated with the arrangement sequence as shown in FIG. 14.

According to the present embodiment, as shown in FIG. 3, it is possible to directly refer to data of the object A from the object B, thereby efficiently transferring date between the objects and substantially improving a processing operational speed as being over a plurality of objects. Thus, there is no need to make up large objects in view of decreasing the processing speed, and it is permitted to make up a lot of small unit of objects thereby essentially improving a reusability of the software.

According to the present embodiment mentioned above, the object coupling unit 10 shown in FIG. 3 couples a plurality of objects with each other at the stage of an initialization, or at the stage in which a software system comprising a plurality of objects is constructed, but there is considered no re-coupling of the object-to-object after starting of the operation of the software system thus constructed.

In view of the foregoing, next, there will be described alternative embodiments in which after starting of the operation of the software system constructed, a re-coupling of the object-to-object is dynamically performed, based on the above-mentioned embodiment.

Hereinafter, first, referring to FIGS. 15 to 18, there will be described the schematic construction of each of the second to fifth object-oriented programming apparatuses according to embodiments of the present invention and the second to fifth object-oriented program storage medium according to embodiments of the present invention, and thereafter referring to FIGS. 19 to 35, there will be described embodiments in which the second to fifth object-oriented programing apparatuses according to embodiments of the present invention and the second to fifth object-oriented program storage medium according to embodiments of the present invention are put together, respectively.

Figure 15:
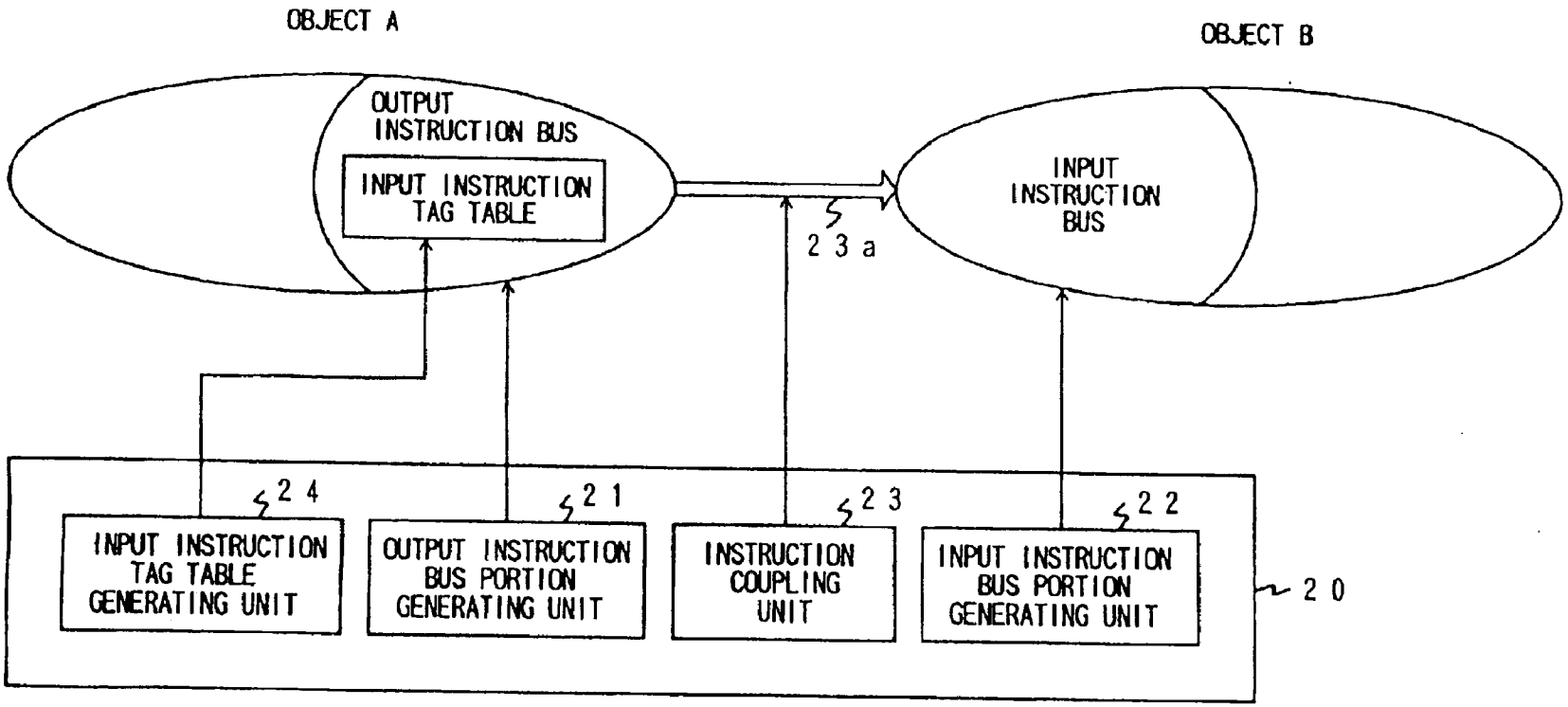
FIG. 15 is a typical illustration showing a second example of a software system implemented within the computer system shown in FIG. 1.

FIG. 15 is a typical illustration showing a second example of a software system implemented within the computer system shown in FIG. 1.

A corresponding relation between the software system shown in FIG. 15 and the present invention is as follows.

That is, the storage unit 105 (cf. FIG. 1), in which the software system shown in FIG. 15 is stored, corresponds to the second object-oriented program storage medium according to an embodiment of the present invention, and a combination of the hardware of the computer system 100 and an object coupling unit 20 which is in a state operable under the computer system 100 corresponds to the second object-oriented programing apparatus. Incidentally, when the software system shown in FIG. 15 is downloaded onto the MO 110 shown in FIG. 1, the MO 110 also corresponds to an example of the second object-oriented program storage medium according to an embodiment of the present invention.

Also in FIG. 15, let us consider typically two objects A and B among a number of objects.

In the object coupling unit 20 shown in FIG. 15, an output instruction bus portion generating unit 21, an input instruction bus portion generating unit 22, and an instruction coupling unit 23 are the same in their processing as the output instruction bus portion generating unit 11, the input instruction bus portion generating unit 12 and the instruction into coupling unit 13 of the object coupling unit 10 shown in FIG. 3, respectively. Thus, in a similar fashion to that of FIG. 3, the instruction coupling unit 23 produces a path 23a to provide an association of messages of the object A with messages of the object B. It is also similar to that of FIG. 3 that the output instruction bus portion generating unit 21 and the input instruction bus portion generating unit 22 are not always needed.

An input instruction tag table generating unit 24 produces, on the output instruction bus portion of the object A, an input instruction tag table showing a correspondence between a message of another object (here typically the object B) and a method of the object A.

As will be described later, the input instruction tag table is transferred to the object B in the form of an argument of a message issued from the object A to the object B. In the object B, during a processing of the object B there is dynamically produced a passage for an issue of a message directed from the object B to the object A, for example.

Figure 16:
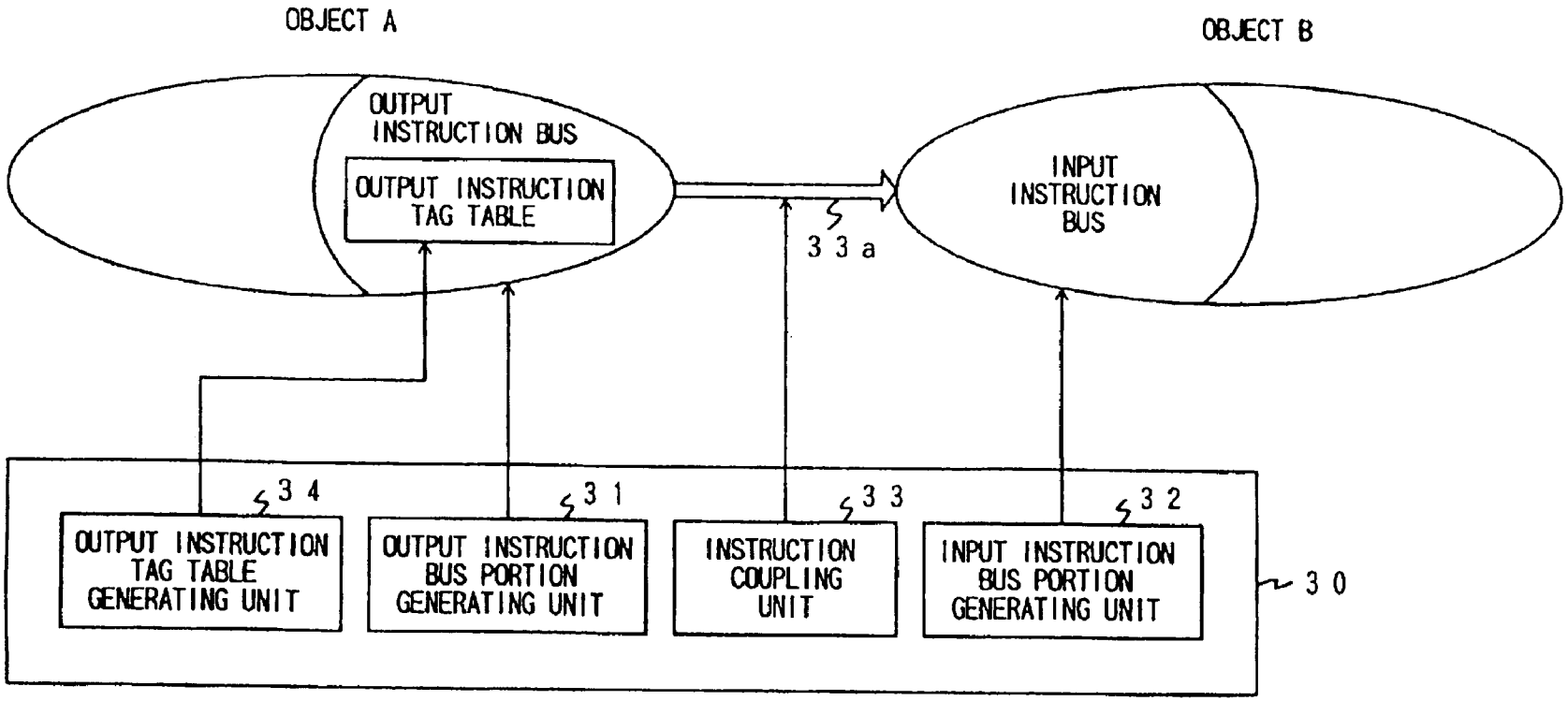
FIG. 16 is a typical illustration showing a third example of a software system implemented within the computer system shown in FIG. 1.

FIG. 16 is a typical illustration showing a third example of a software system implemented within the computer system shown in FIG. 1.

A corresponding relation between the software system shown in FIG. 16 and the present invention is as follows.

That is, the storage unit 105 (cf. FIG. 1), in which the software system shown in FIG. 16 is stored, corresponds to the third object-oriented program storage medium according to an embodiment of the present invention, and a combination of the hardware of the computer system 100 and an object coupling unit 30 which is in a state operable under the computer system 100 corresponds to the third object-oriented programming apparatus. Incidentally, when the software system shown in FIG. 16 is downloaded onto the MO 110 shown in FIG.1, the MO 110 also corresponds to an example of the third object-oriented program storage medium according to an embodiment of the present invention.

Also in FIG. 16, let us consider typically two objects A and B among a number of objects.

In the object coupling unit 30 shown in FIG. 16, an output instruction bus portion generating unit 31, an input instruction bus portion generating unit 32, and an instruction coupling unit 33 are the same in their processing as the output instruction bus portion generating unit 11, the input instruction bus portion generating unit 12 and the instruction coupling unit 13 of the object coupling unit 10 shown in FIG. 3, respectively. Thus, in a similar fashion to that of FIG. 3, the instruction coupling unit 33 produces a path 33a to provide an association of messages of the object A with messages of the object B. It is also similar to that of FIG. 3 that the output instruction bus portion generating unit 31 and the input instruction bus portion generating unit 32 are not always needed.

An output instruction tag table generating unit 34 produces, on the output instruction bus portion of the object A, an output instruction tag table showing a correspondence between a method of another object (here typically the object B) and a message of the object A.

As will be described later, the output instruction tag table is transferred to the object B in the form of an argument of a message issued from the object A to the object B. In the object B, during a processing of the object B there is dynamically rearranged a passage for an issue of a message directed from the object A to the object B, for example.

Figure 17:
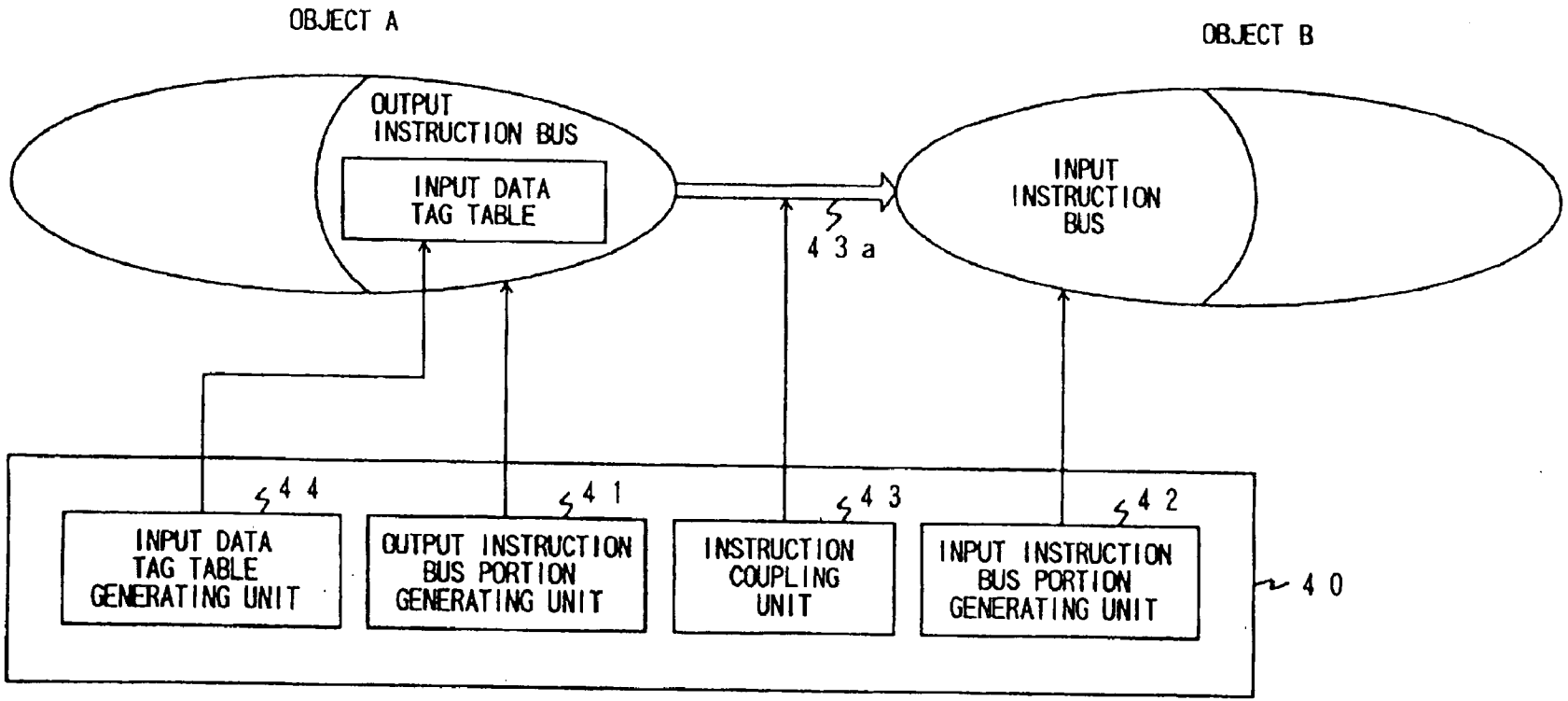
FIG. 17 is a typical illustration showing a fourth example of a software system implemented within the computer system shown in FIG. 1.

FIG. 17 is a typical illustration showing a fourth example of a software system implemented within the computer system shown in FIG. 1.

A corresponding relation between the software system shown in FIG. 17 and the present invention is as follows.

That is, the storage unit 105 (cf. FIG. 1), in which the software system shown in FIG. 17 is sorted, corresponds to the fourth object-oriented program storage medium according to an embodiment of the present invention, and a combination of the hardware of the computer system 100 and an object coupling unit 40 which is in a state operable under the computer system 100 corresponds to the fourth object-oriented programming apparatus. Incidentally, when the software system shown in FIG. 17 is downloaded onto the MO 110 shown in FIG. 1, the MO 110 also corresponds to an example of the fourth object-oriented program storage medium according to an embodiment of the present invention.

Also in FIG. 17, let us consider typically two objects A and B among a number of objects.

In the object coupling unit 40 shown in FIG. 17, an output instruction bus portion generating unit 41, an input instruction bus portion generating unit 42, and an instruction coupling unit 43 are the same in their processing as the output instruction bus portion generating unit 11, the input instruction bus portion generating unit 12 and the instruction coupling unit 13 of the object coupling unit 10 shown in FIG. 3, respectively. Thus, in a similar fashion to that of FIG. 3, the instruction coupling unit 43 produces a path 43a to provide an association of messages of the object A with messages of the object B. It is also similar to that of FIG. 3 that the output instruction bus portion generating unit 41 and the input instruction bus portion generating unit 42 are not always needed.

An input data tag table generating unit 44 produces, on the output instruction bus portion of the object A, an input data tag table showing a correspondence between a data element list number $OUT_B$ for specifying a data element list in which pointers to data storage areas of another object (here typically the object B) are arranged and a pointer element list number $IN_A$ for specifying a pointer element list in which pointers to pointer storage areas of the object A are arranged.

The data element list number $OUT_B$ and the pointer element list number $IN_A$ are determined at the stages when the objects B and A are made up, respectively. However, at the stage in which the input data tag table is simply generated, the data element list itself and the pointer element list itself are not yet produced. The input data tag table is transferred to the object B in the form of argument of a message issued from the object A to the object B. Upon receipt of the input data tag table, the object B produces a data element list of one's own (the object B) dynamically during a processing of the object B and a pointer element list of the object A as well, so that the data element list and the pointer element list are coupled together. Details thereof will be described later.

Figure 18:
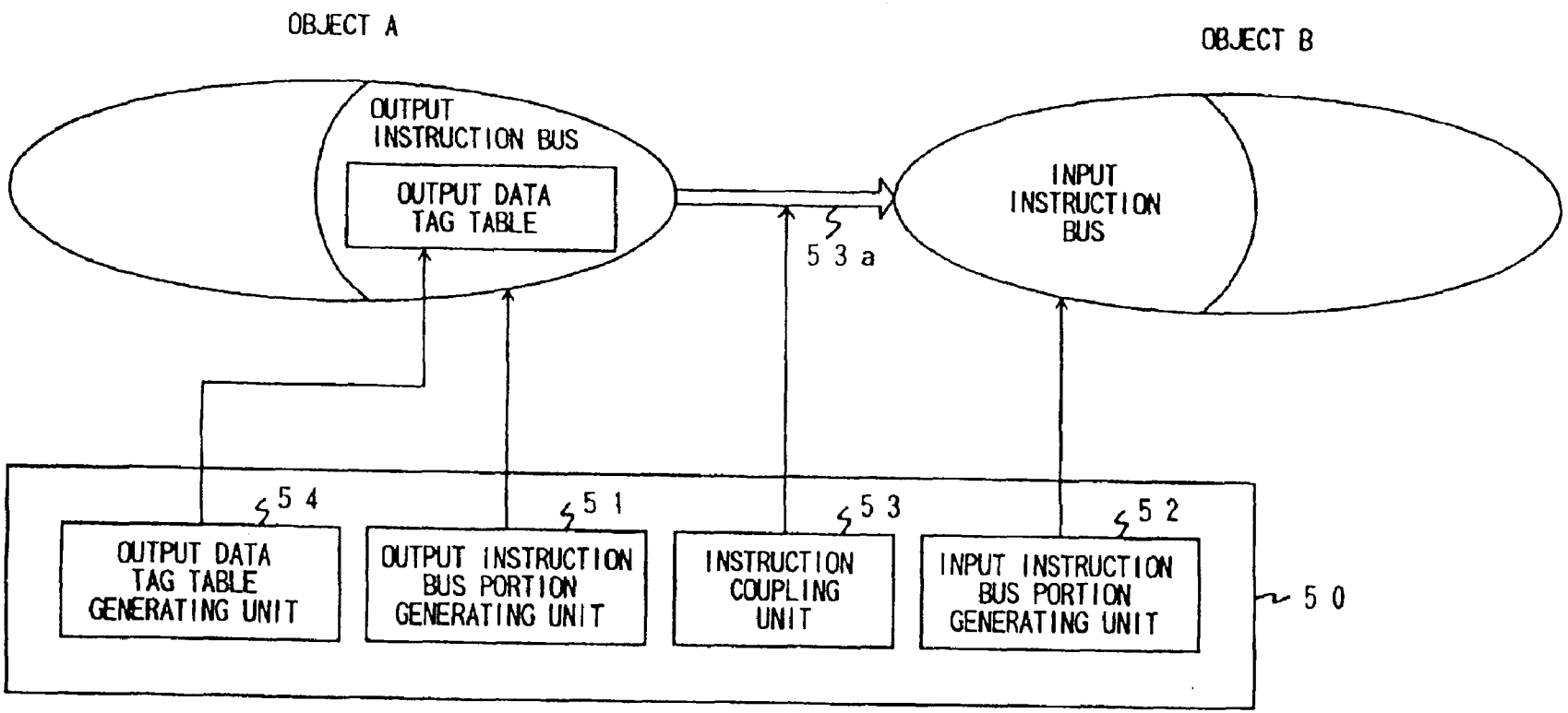
FIG. 18 is a typical illustration showing a fifth example of a software system implemented within the computer system shown in FIG. 1.

FIG. 18 is a typical illustration showing a fifth example of a software system implemented within the computer system shown in FIG. 1.

A corresponding relation between the software system shown in FIG. 18 and the present invention is as follows.

That is, the storage unit 105 (cf. FIG. 1), in which the software system shown in FIG. 18 is stored, corresponds to the fifth object-oriented program storage medium according to an embodiment of the present invention, and a combination of the hardware of the computer system 100 and an object coupling unit 50 which is in a state operable under the computer system 100 corresponds to the fifth object-oriented programming apparatus. Incidentally, when the software system shown in FIG. 18 is downloaded onto the MO 110 shown in FIG. 1, the MO 110 also corresponds to an example of the fifth object-oriented program storage medium according to an embodiment of the present invention.

Also in FIG. 18, let us consider typically two objects A and B among a number of objects.

In the object coupling unit 50 shown in FIG. 18, an output instruction bus portion generating unit 51, an input instruction bus portion generating unit 52, and an instruction coupling unit 53 are the same in their processing as the output instruction bus portion generating unit 11, the input instruction bus portion generating unit 12 and the instruction coupling unit 13 of the object coupling unit 10 shown in FIG. 3, respectively. Thus, in a similar fashion to that of FIG. 3, the instruction coupling unit 53 produces a path 53a to provide an association of messages of the object A with messages of the object B. It is also similar to that of FIG. 3 that the output instruction bus portion generating unit 51 and the input instruction bus portion generating unit 52 are not always needed.

An output data tag table generating unit 54 produces, on the output instruction bus portion of the object A, an output data tag table showing a correspondence between a pointer element list number $IN_B$ for specifying a pointer element list in which pointers to pointer storage areas of another object (here typically the object B) are arranged and a data element list number $OUT_A$ for specifying a data element list in which pointers to data storage areas of the object A are arranged.

The pointer element list number $IN_B$ and the data element list number $OUT_A$ are determined at the stages when the objects B and A are made up, respectively. However, at the stage in which the output data tag table is simply generated, the pointer element list itself and the data element list itself are not yet produced. The output data tag table is transferred to the object B in the from of argument of a message issued from the object A to the object B. Upon receipt of the output data tag table, the object B produces a data element list of the object A dynamically during a processing of the object B and a pointer element list of one's own (the object B) as well, so that the data element list and the pointer element list are coupled together. Details thereof will be described later.

Figure 19:
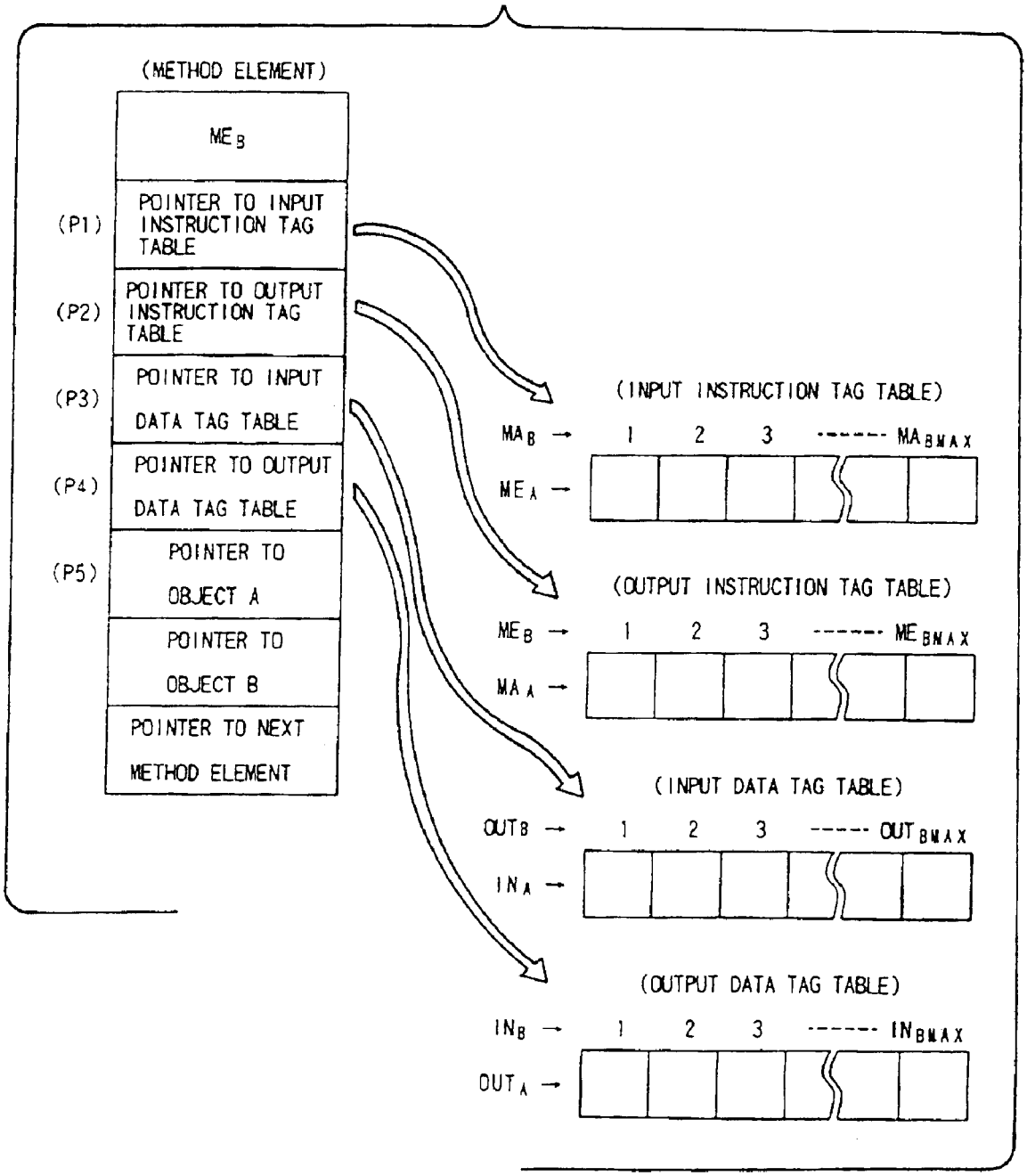
FIG. 19 is a typical illustration showing a part of the data structure of objects A shown in FIGS. 15 to 18.

FIG. 19 is a typical illustration showing a part of the data structure of objects A shown in FIGS. 15 to 18. FIG. 19 shows, of the data structure shown in FIG. 4, one method element, an input instruction tag table, an output instruction tag table, an input data tag table, and output data tag table, these four tag tables being coupled with the method element. FIG. 19 shows overall data structure of the embodiments having all aspects of the respective embodiments explained referring to FIGS. 15 to 18.

Appended to the method element shown in FIG. 19 are the structure of the method element shown in FIG. 4, that is, a method number $ME_B$ of another object (here typically object B), a pointer to an object (here object B) which executes a method specified by the method number $ME_B$, a pointer to the subsequent method element, a pointer to an input instruction tag table (hereinafter, it happens that this pointer is referred to as P1), a pointer to an output instruction tag table (hereinafter, it happens that this pointer is referred to as P2), a pointer to an input data tag table (hereinafter, it happens that this pointer is referred to as P3), a pointer to an output data tag table (hereinafter, it happens that this pointer is referred to as P4), and a pointer to oneself (object A) (hereinafter, it happens that this pointer is referred to as P5).

The input instruction tag table has the same width in its arrangement as the maximum number $MA_{BMAX}$ of messages of another object (here object B), and stores therein the method number $ME_A$ of the object A in association with the message number $MA_B$ of the object B.

The output instruction tag table has the same width in its arrangement as the maximum number $ME_{BMAX}$ of method of another object (here object B), and stores therein the message number $MA_A$ of the object A in association with the method number $ME_B$ of the object B.

The input data tag table has the same width in its arrangement as the maximum number $OUT_{BMAX}$ of data element lists of another object (here object B), and stores therein the pointer element list number $IN_A$ of the object A in association with the data element list number $OUT_B$ of the object B.

The output data tag table has the same width in its arrangement as the maximum number $IN_{BMAX}$ of pointer element lists of another object (here object B), and stores therein the data element list number $OUT_A$ of the object A in association with the pointer element list number $IN_B$ of the object B.

Incidentally, while FIG. 19 shows, with respect to the output instruction bus portion of the object A, four tag tables related to the object B, generally, these four tag tales are provided in set by the number of party objects which receive messages issued by the object A, when the output instruction bus portion of the object A is viewed as a whole. That is, these four tag tables are provided in association with each of the respective objects concerned. This is the similar as to the matter of the output instruction bus portion of another object not limited to the object A.

In the event that the object A issues messages to the object A referring to the method element shown in FIG. 19, transferred from the object A are the method number $ME_B$ of the object B and in addition, if necessary, part or all of the pointers P1-P5 in the form of augments. Alternatively, it is acceptable that the method number $ME_B$ and all of the pointers P1-P5 are always transferred in the form of arguments.

Hereinafter, so far as it is not noted specifically, the explanation will be made presupposing the data structure in which the data structure shown in FIG. 4 has been altered as shown in FIG. 19.

Figure 20:
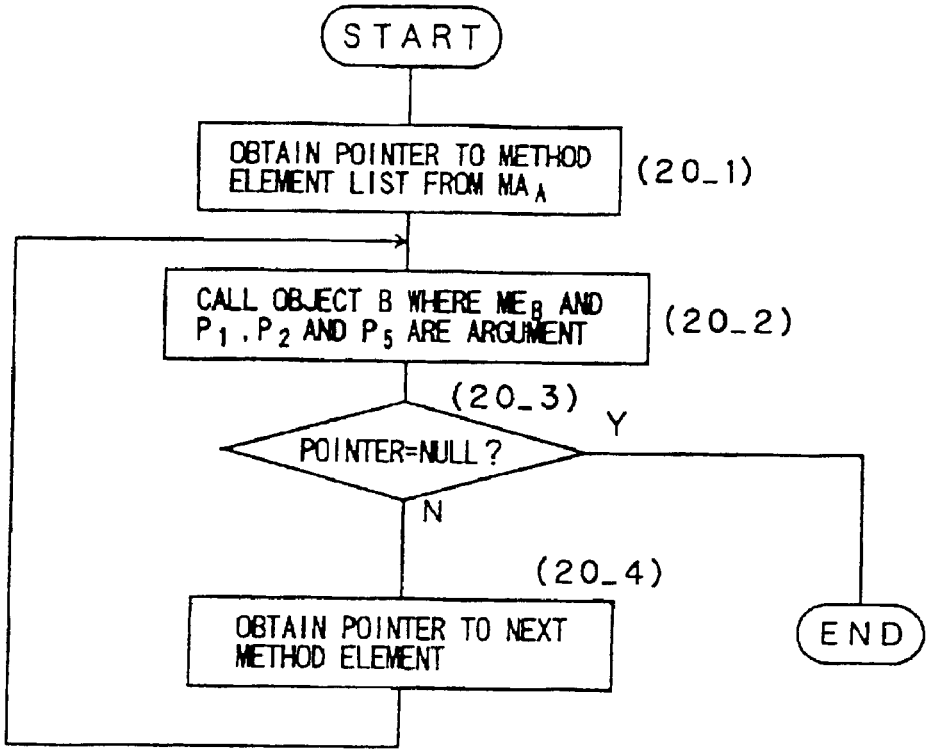
FIG. 20 is a flowchart useful for understanding an example of processings for issue of a message of an object A.

FIG. 20 is a flowchart useful for understanding an example of processings for an issue of a message of an object A.

In FIG. 20, the steps 20_1, 20_3 and 20_4 are the same as the steps 5_1, 5_3 and 5_4 of FIG. 5, respectively. Thus, the redundant explanation will be omitted.

In step 20_2, the method number $ME_B$ and in addition the pointers P1, P2 and P5, according to the present example, are transferred to the object B in the form of arguments. Upon receipt of the message, the object B executes a processing of a method specified by the method number $ME_B$ in accordance with the flowchart shown in FIG. 5(B).

Figure 21:
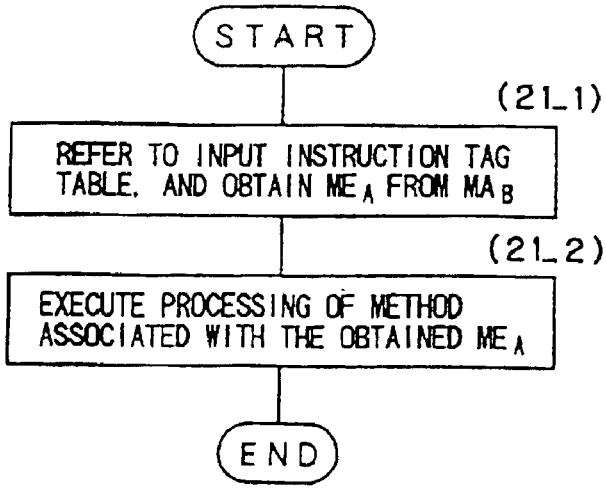
FIG. 21 is a flowchart useful for understanding a first example of a partial processing of an object B.

FIG. 21 is a flowchart useful for understanding a first example of a partial processing of processings of an object B. The partial processing is executed during a processing of a method specified by the method number $ME_B$ transferred to the object B in the form of arguments.

In step 21_1, referring to the input instruction tag table transferred to the object B in the form of arguments, the method number $ME_A$ of the object A is obtained from the message number $MA_B$ of the object B. In step 21_2, during a processing of the object B, a processing of the method of the obtained method number $ME_A$ of the object A is executed.

Figure 22:
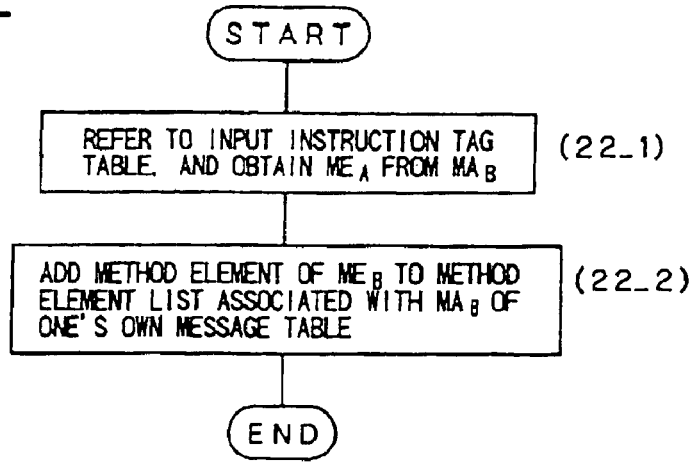
FIG. 22 is a flowchart useful for understanding a second example of a partial processing of an object B.

FIG. 22 is a flowchart useful for understanding a second example o f a partial processing of processings of an object B.

In step 22_1, referring to the input instruction tag table transferred to the object B in the form of arguments, the method number $ME_A$ of the object A is obtained from the message number $MA_B$ of the object B. In step 22_2, a method element related to the method number $ME_A$ of the object A is added to a method element list associated with the message number $MA_B$ of the message table of one's own (the object B). In this manner, thereafter, an issuance of the message of the message number $MA_B$ of the object B permits an execution of the method of the method number $ME_A$ of the object A.

Figure 23:
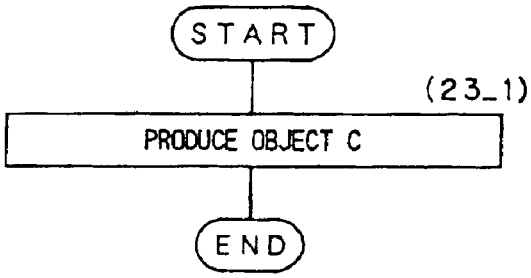
FIG. 23 is a flowchart useful for understanding a third example of a partial processing of an object B.

FIG. 23 is a flowchart useful for understanding a third example of a partial processing of processings of an object B. In this case, in the partial processing, the argument of the message issued in the object A is not referred to directly.

In step 23_1, a processing of the object B causes an object C to be produced. A processing of producing another object in one object is one of the usual processings in the object-oriented programming. Thus, an explanation as to the technique of producing the object C will be omitted.

Figure 24:
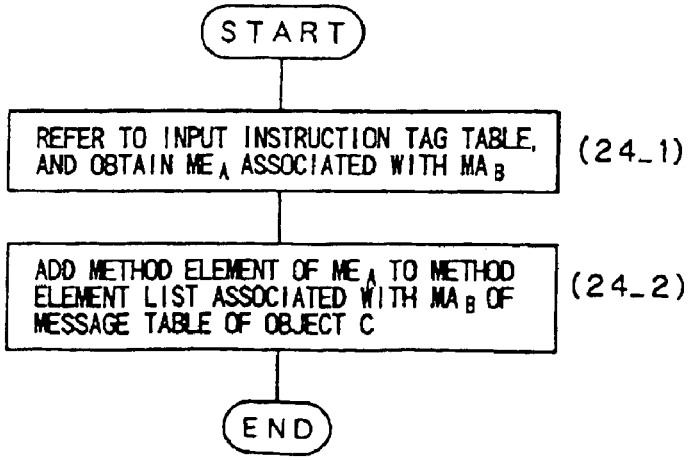
FIG. 24 is a flowchart useful for understanding a fourth example of a partial processing of an object B.

FIG. 24 is a flowchart useful for understanding a fourth example of a partial processing of processings of an object B.

With respect to the partial processing shown in FIG. 24, there is a need, prior to its execution, to preform the partial processing shown in FIG. 23 so that the object C is produced. However, with respect to timing of a producing of the object C, it is not restricted specifically. It is acceptable that the object C is produced during a series of processing at the present time in the object B. Alternatively, it is acceptable that the object C is produced in processing at the previous or earlier time in the object B.

In the partial processing shown in FIG. 24, in step 24_1, referring to the input instruction tag table transferred to the object B in the form of arguments, the method number $ME_A$ of the object A, which is associated with the message number $MA_B$ succeeded to the object C, originally the message number of the object B, is obtained. In step 24_2, a method element of the method number $ME_A$ of the object A is added to the method element list of the object C associated with the message number $MA_B$ of the message table of the object C. Thus, a path of messages from the object C to the object A is formed.

Figure 25:
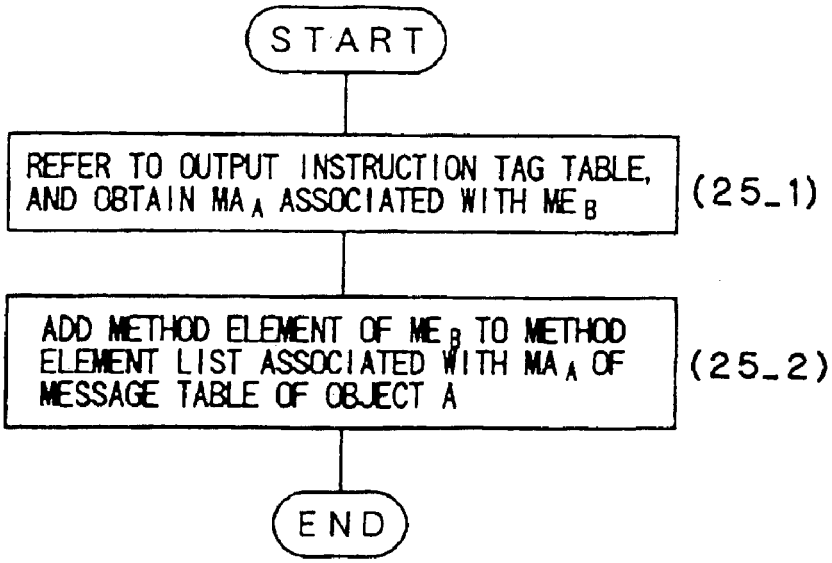
FIG. 25 is a flowchart useful for understanding a fifth example of a partial processing of an object B.

FIG. 25 is a flowchart useful for understanding a fifth example of a partial processing of processings of an object B.

In step 25_1, referring to the output instruction tag table, the message number $MA_A$ of the object A associated with the method number $ME_A$ of the object A is obtained. In step 25_2, a method element related to the method number $ME_B$ of the object B is added to a method element list associated with the message number $MA_A$ of the message table of the object A. In this manner, thereafter, an issuance of the message of the message number $MA_A$ of the object A permits an execution of the method of the method number $ME_B$ of the object B.

Figure 26:
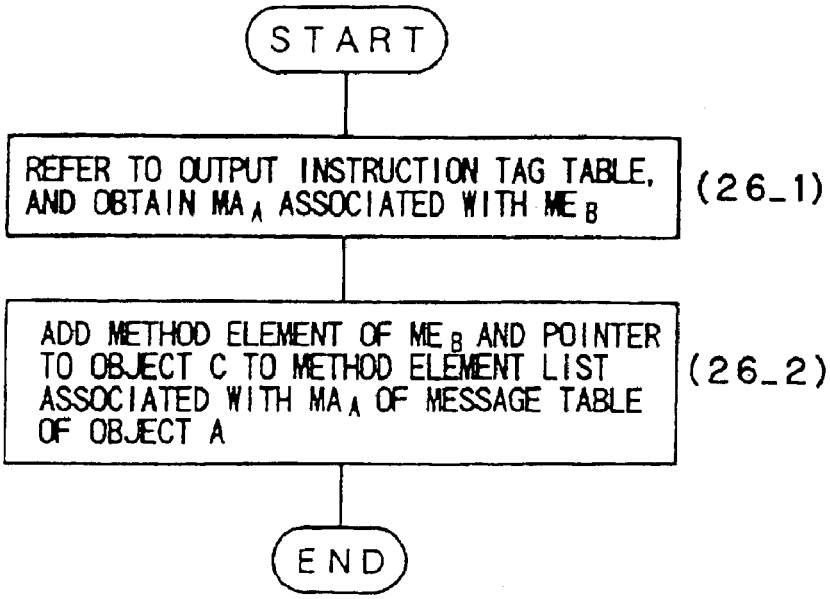
FIG. 26 is a flowchart useful for understanding a sixth example of a partial processing of an object B.

FIG. 26 is a flowchart useful for understanding a sixth example of a partial processing of processings of an object B.

With respect to the partial processing shown in FIG. 26, there is a need, prior to its execution, to preform the partial processing shown in FIG. 23 so that the object C is produced. However, with respect to timing of a producing of the object C, it is not restricted specifically. It is acceptable that the object C is produced during a series of processing at the present time in the object B. Alternatively, it is acceptable that the object C is produced in processing at the previous or earlier time in the object B.

In the partial processing shown in FIG. 26, in step 26_1, referring to the output instruction tag table transferred to the object B in the form of arguments, the message number $MA_A$ of the object A, which is associated with the method number $ME_B$ succeeded to the object C, originally the message number of the object B, is obtained. In step 26_2, a method element, in which the method number $ME_B$ and the pointer to the object C are stored, is added to the method element list associated with the message number $MA_A$ of the message table of the object A.

In this manner, thereafter, it is possible to issue messages from the object A to the newly produced object C.

Figure 27:
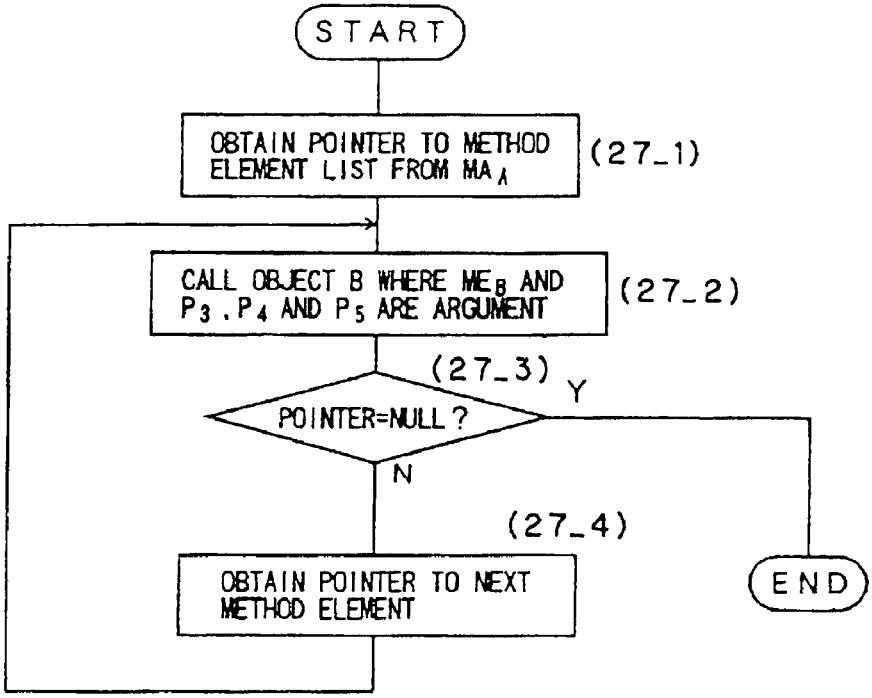
FIG. 27 is a flowchart useful for understanding another example of processing for issue of a message of an object A, which is different from the example of that shown in FIG. 20.

FIG. 27 is a flowchart useful for understanding another example of processings for an issue of a message of an object A, which is different from the example of that shown in FIG. 20.

In FIG. 27, steps 27_1, 27_3 and 27_4 are the same as the steps 20_1, 20_3 and 20_4 of FIG. 20, and the steps 5_1, 5_3 and 5_4 of FIG. 5, respectively. Thus, the redundant explanation will be omitted.

In step 27_2, the object B is called, where the method number $ME_B$ and in addition the pointers P3, P4 and P5 are argument.

Upon receipt of the message, the object B executes a processing of a method specified by the method number $ME_B$.

Figure 28:
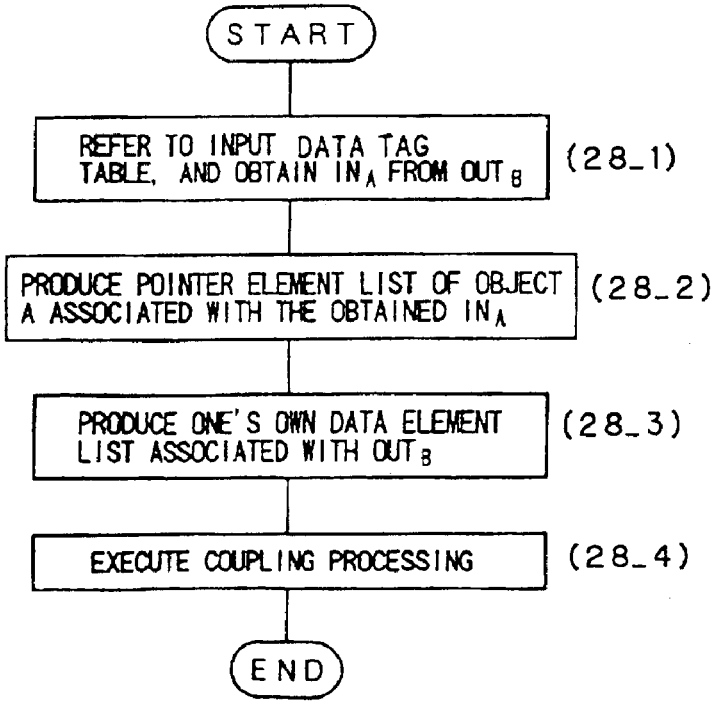
FIG. 28 is a flowchart useful for understanding a seventh example of a partial processing of an object B.

FIG. 28 is a flowchart useful for understating a seventh example of a partial processing of processings of an object B.

In step 28_1, referring to the input data tag table transferred to the object B in the form of arguments, the pointer element list number $IN_A$ of the object A is obtained from the data element list number $OUT_B$ of the object B. In step 28_2, the pointer element list (cf. FIG. 11 wherein the pointer element list of the object B is shown) of the object A, which is associated with the obtained pointer element list number $IN_A$, is produced. In step 28_3, the data element list (cf. FIG. 9 wherein the data element list of the object A is shown) of the object B, which is associated with the data element list number $OUT_B$, is produced. And in step 28_4, a coupling processing of the data element list with the pointer element list (cf. FIG. 13 wherein the pointer of the object B indicates the data of the object A, and in this respect, positions of the object A and the object B are reversed, as compared with the present case) is executed.

In this manner, according to the present embodiment, a path for transfer of data between objects is formed during an execution of a processing, so called dynamically.

Figure 29:
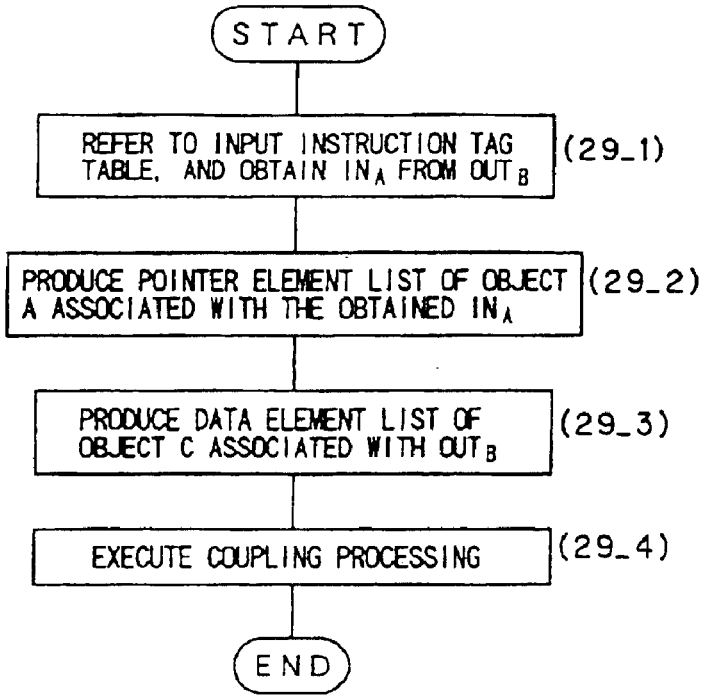
FIG. 29 is a flowchart useful for understanding a eighth example of a partial processing of an object B.

FIG. 29 is a flowchart useful for understanding a eighth example of a partial processing of processings of an object B.

With respect to the partial processing shown in FIG. 29, there is a need, prior to its execution, to perform the partial processing shown in FIG. 23 so that the object C is produced. However, with respect to timing of a producing of the object C, any times are acceptable if the object C is produced before the partial processing shown in FIG. 29.

In the partial processing shown in FIG. 29, in step 29_1, referring to the input data tag table transferred to the object B in the form of arguments, the pointer element list number $IN_A$ of the object A is obtained from the data element list number $OUT_B$, which is succeeded to the object C, originally the data element list number of the object B. In step 29_2, the pointer element list of the object A, which is associated with the obtained pointer element list number $IN_A$, is produced. In step 29_3, the data element list of the object C, which is associated with the data element list number $OUT_B$, is produced. And in step 29_4, a coupling processing of the data element list of the object C with the pointer element list of the object A is executed.

In this manner, according to the present embodiment, a path for directly referring to data of the newly produced object C from the object A is formed during an execution of a processing, so called dynamically.

Figure 30:
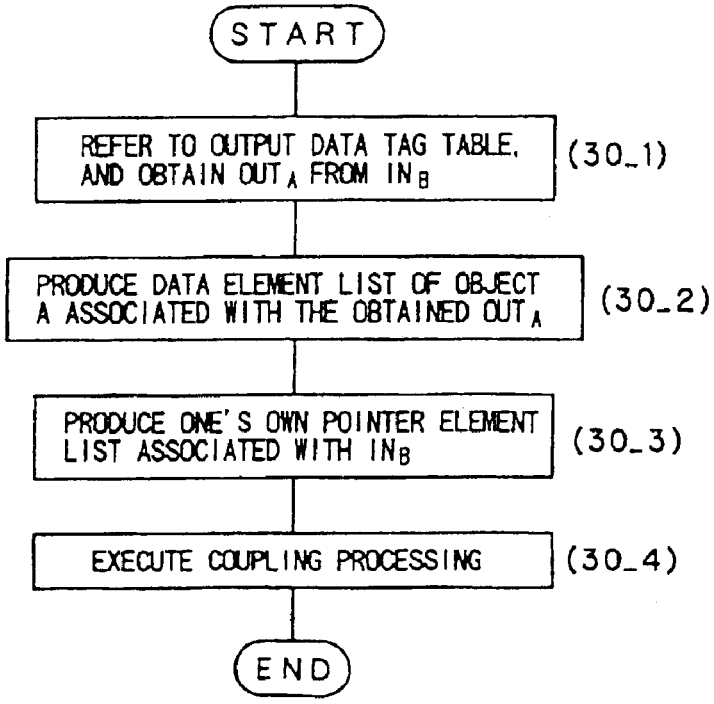
FIG. 30 is a flowchart useful for understanding a ninth example of a partial processing of an object B.

FIG. 30 is a flowchart useful for understanding a ninth example of a partial processing of processings of an object B.

In the partial processing shown in FIG. 30, in step 30_1, referring to the output data tag table transferred to the object B in the form of arguments, the data element list number $OUT_A$ of the object A is obtained from the pointer element list number $IN_B$ of the object B. In step 30_2, the data element list of the object A, which is associated with the obtained data element list number $OUT_A$ of the object A, is produced. In step 30_3, the pointer element list of one's own (the object B), which is associated with the pointer element list number $IN_B$, is produced. And in step 30_4, a coupling processing of the data element list of the object A with the pointer element list of the object B is executed.

In this manner, according to the present embodiment, a path for directly referring to data of the object A from the object B is formed ruing an execution of a processing, so called dynamically.

Figure 31:
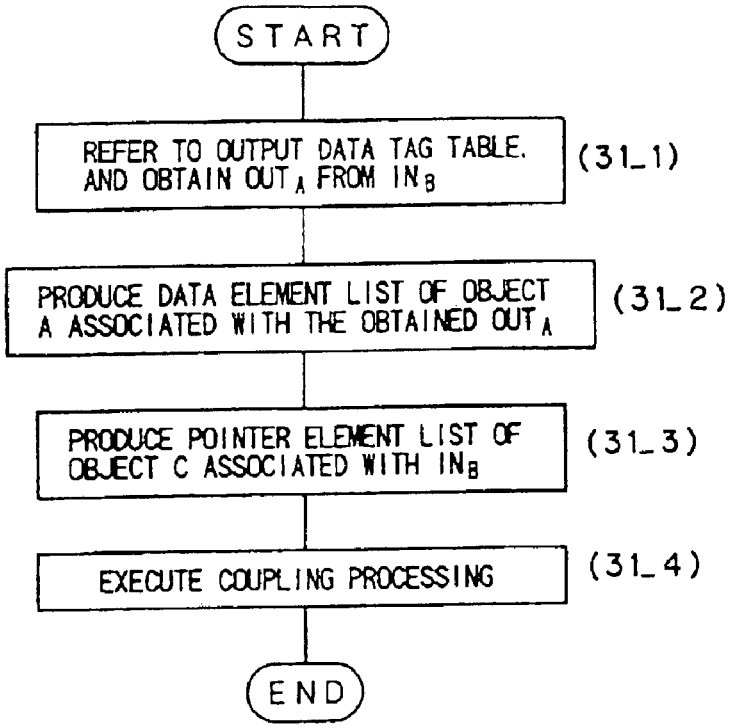
FIG. 31 is a flowchart useful for understanding a tenth example of a partial processing of an object B.

FIG. 31 is a flowchart useful for understanding a tenth example of a partial processing of processings of an object B.

With respect to the partial processing shown in FIG. 31, there is a need, prior to its execution, to perform the partial processing shown in FIG. 23 so that the object C is produced. However, with respect to timing of a producing of the object C, any times are acceptable if the object C is produced before the partial processing shown in FIG. 31.

In the partial processing shown in FIG. 31, in step 31_1, referring to the output data tag table transferred to the object B in the form of arguments, the data element list number $OUT_A$ of the object A is obtained from the pointer element list number $IN_B$, which is succeeded to the object C, originally the pointer element list number of the object B. In step 31_2, the data element list of the object A, which is associated with the obtained data element list number $OUT_A$ is produced. In step 31_3, the pointer element list of the object C, which is associated with the pointer element list number $IN_B$, is produced. And in step 31_4, a coupling processing of the data element list of the object A with the pointer element list of the object C is executed.

In this manner, according to the present embodiment, a path for directly referring to data of the object A from the object C is formed during an execution of a processing, so called dynamically.

While the above description concerns various types of partial processings during a processing of the object B, those various types of partial processings are not always executed independently, and if necessary, a plurality of partial processings are performed continuously or in their combination.

Figure 32:
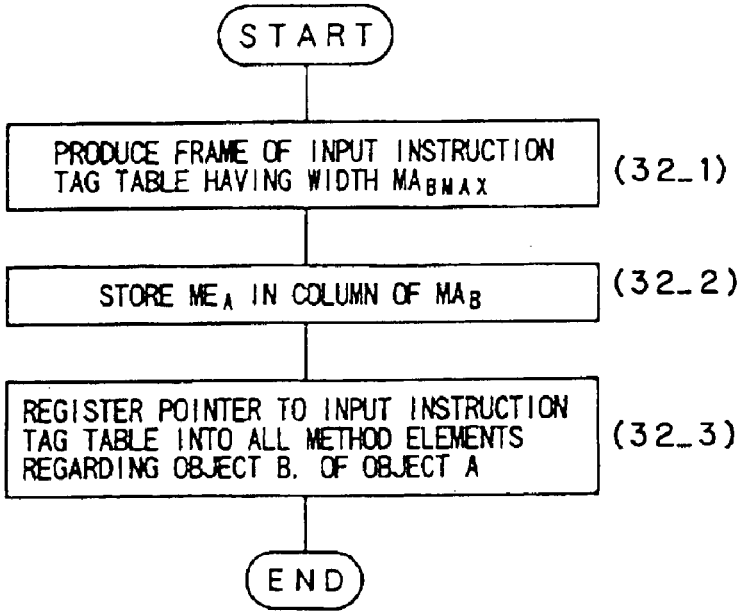
FIG. 32 is a flowchart useful for understanding processings of an input instruction tag table generating unit of an object coupling unit shown in FIG. 15.

FIG. 32 is a flowchart useful for understanding processings of the input instruction tag table generating unit 24 of the object coupling unit 20 shown in FIG. 15.

An operator, who operates the computer system 100 (cf. FIG. 1) instructs the following items:

(a) A pointer of the object A (b) A pointer of the object B (c) A method number $ME_A$ of the object A (d) A message number $MA_B$ of the object B In the processing shown in FIG. 32, upon receipt of the above-noted instructions, a frame of the input instruction tag table having the same width as the maximum number $MA_{BMAX}$ of messages of the object B is produced (step 32_1). In step 32_2, the method number $ME_A$ of the object A is stored in the column of the message number $MA_B$ of the object B of the frame thus produced. In step 32_3, a pointer to the input instruction tag table is registered into the whole method elements (e.g. the method element shown in FIG. 19) related to the object B, of the object A. It is noted that FIG. 19 shows an illustration in which the pointer (P1) to the input instruction tag table has been already registered.

While the object B is typically dealt with according to the present embodiment, the output instruction bus portion of the object A produces input instruction tag tables related to all of the objects which have a possibility of receiving messages issued from the object A, and pointers to the input instruction tag tables are registered into method elements related to the objects associated with the input instruction tag tables thus produced, respectively. This is the similar as to the matter of the output instruction tag tables, the input data tag tables and the output data tag tables.

Figure 33:
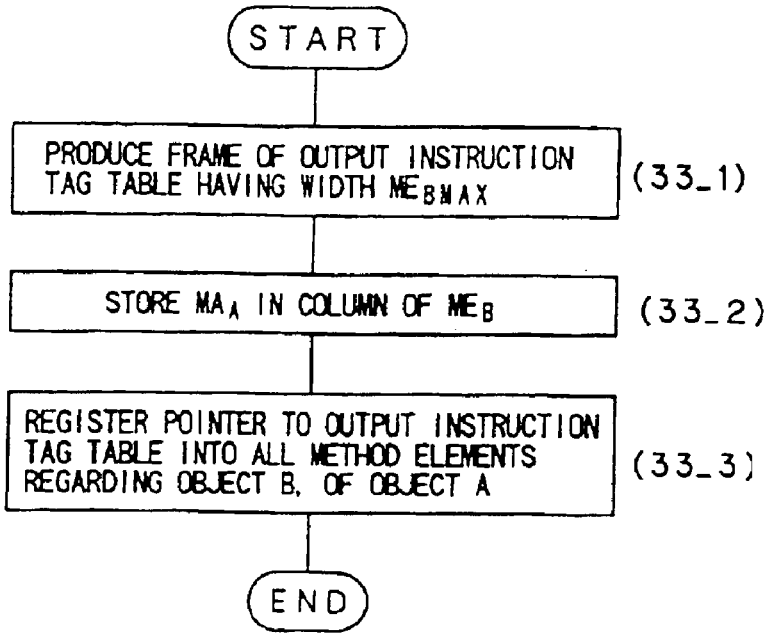
FIG. 33 is a flowchart useful for understanding processings of an output instruction tag table generating unit of an object coupling unit shown in FIG. 16.

FIG. 33 is a flowchart useful for understanding processings of the output instruction tag table generating unit 34 of the object coupling unit 30 shown in FIG. 16.

An operator, who operates the computer system 100 (cf. FIG. 1), instructs the following items in a similar fashion to that of wiring of LSI's:

(a) A pointer of the object A (b) A pointer of the object B (c) A message number $MA_A$ of the object A (d) A method number $ME_B$ of the object B In the processing shown in FIG. 33, upon receipt of the above-noted inputs, a frame of the output instruction tag table having the same width as the maximum number $ME_{BMAX}$ of methods of the object B is produced (step 33_1). In step 33 2, the message number $MA_A$ of the object A is stored in the column of the method number $ME_B$ of the object B of the frame thus produced. In step 33_3, a pointer to the output instruction tag table is registered into the whole method elements related to the object B, of the object A. It is noted that FIG. 10 shows an illustration in which the pointer (P2) to the output instruction tag table has been already registered.

Figure 34:
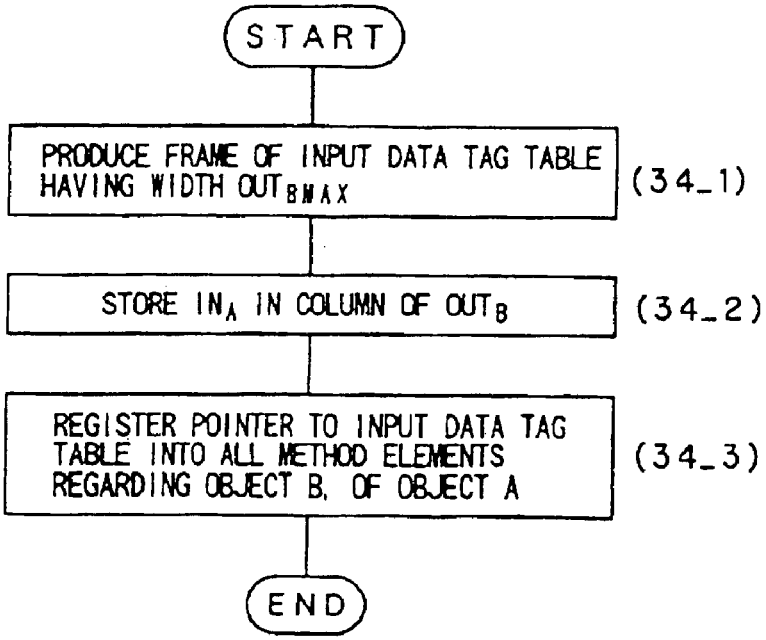
FIG. 34 is a flowchart useful for understanding processings of an input data tag table generating unit of an object coupling unit shown in FIG. 17.

FIG. 34 is a flowchart useful for understanding processings of the input data tag table generating unit 44 of the object coupling unit 40 shown in FIG. 17.

An operator, who operates the computer system 100 (cf. FIG. 1), instructs the following items in a similar fashion to that of wiring of LSI's:

(a) A pointer of the object A (b) A pointer of the object B (c) A pointer element list number $IN_A$ of the object A (d) A data element list number $OUT_B$ of the object B In the processing shown in FIG. 34, upon receipt of the above-noted instructions, a frame of the input data tag table having the same width as the maximum number $OUT_{BMAX}$ of data element lists of the object B is produced (step 34_1). In step 34_2, the pointer element list number $IN_A$ of the object A is stored in the column of the data element list number $OUT_B$ of the object B of the frame thus produced. In step 34_3, a pointer to the input data tag table is registered into the whole method elements related to the object B, of the object A. It is noted that FIG. 19 shows an illustration in which the pointer (P3) to the input data tag table has been already registered.

Figure 35:
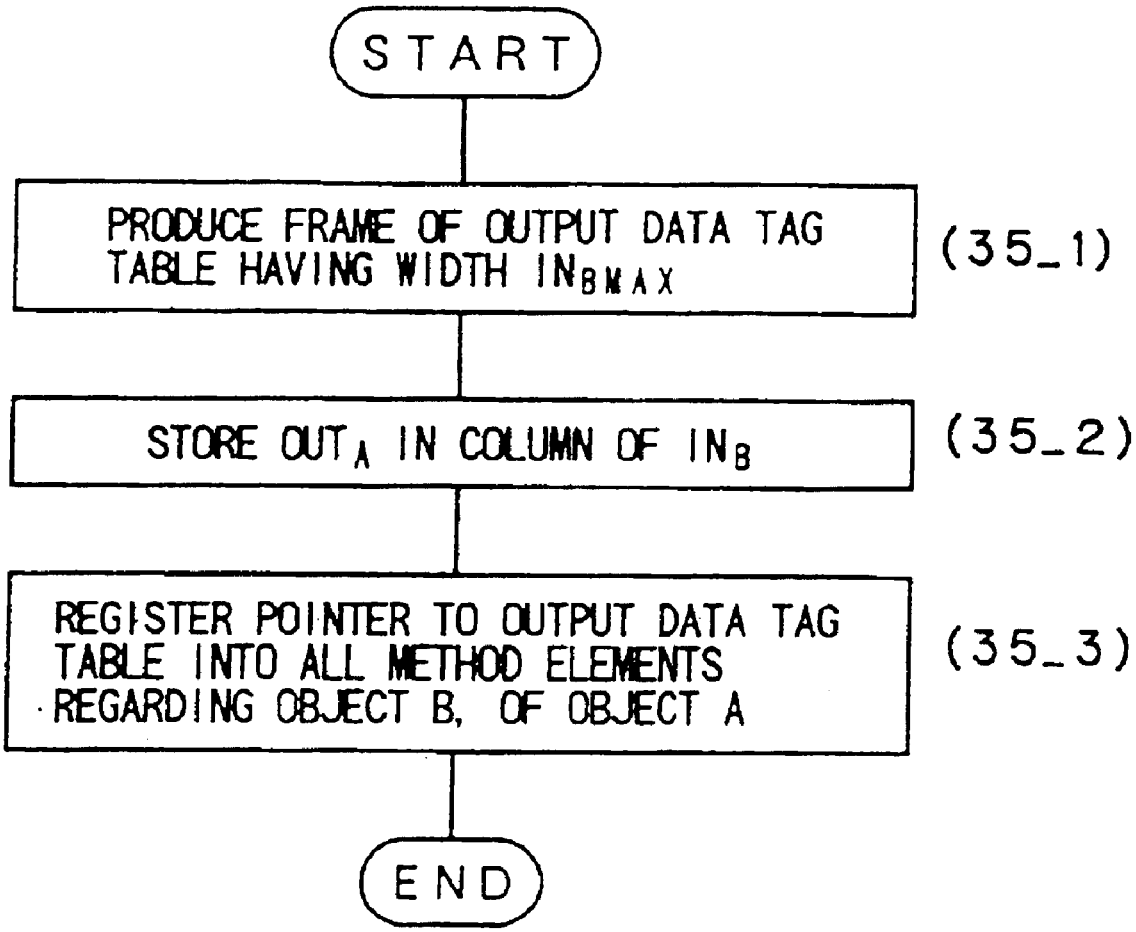
FIG. 35 is a flowchart useful for understanding processings of an output data tag table generating unit of an object coupling unit show in FIG. 18.

FIG. 35 is a flowchart useful for understanding processings of the output data tag table generating unit 54 of the object coupling unit 50 shown in FIG. 18.

An operator, who operates the computer system 100 (cf. FIG. 1), instructs the following items in a similar fashion to that of wiring of LSI's:

(a) A pointer of the object A (b) A pointer of the object B (c) A data element list number of the object A (d) A pointer element list number of the object B In the processing shown in FIG. 35, upon receipt of the above-noted inputs, a frame of the output data tag table having the same width as the maximum number $IN_{BMAX}$ of pointer element lists of the object B is produced (step 35_1). In step 35_2, the data element list number $OUT_B$ of the object A is stored in the column of the pointer element list number $IN_B$ of the object B of the frame thus produced. In step 35_3, a pointer to the output data tag table is registered into the whole method elements related to the object B, of the object A. It is noted that FIG. 19 shows an illustration in which the pointer (P4) to the output data tag table has been already registered.

While it is acceptable that the processings in FIGS. 32 to 35 are executed independently and only one of four tag tables shown in FIG. 19 is registered into the method element, it is also acceptable that two or more of these four tag tables are registered into one method element, if necessary or always. Further, although FIGS. 32 to 35 fail to clearly state, in the event that anyone of the processings shown in FIGS. 32 to 35 is executed, the pointer (P5) to the object A itself is registered into the method.

According to the embodiments explained referring to FIGS. 15 to 35, not only are object-to-object coupled with one another in the initial state, but also a coupling of a message with a method, and a coupling of data with a pointer are performed during an execution of processings or dynamically. When a new object is produced, in a similar fashion as to the matter of the new object, the dynamic coupling is performed. In this manner, the new coupling is performed in accordance with conditions, and a very higher speed of transfer of messages and data among a plurality of objects is implemented.

Next, there will be described an embodiment concerning the interobject wiring editor unit 122 and the associated periphery. Here, of the embodiment concerning the interobject wiring editor unit 122 and the associated periphery, there will be described an embodiment of an object-between-network display method on the display screen 102a of the display unit 102 of the computer system 100.

As described above, while the object oriented programming has various drawbacks such that reuse of software is low and a running speed is slow, there exists an idea such that objects are wired to describe a connecting relation among the objects. However, according to the earlier technology, the connecting relation among the objects is very simple, such that data is transferred to another object in the form of an argument of the message. As described in the embodiment related to the above-mentioned interpreter unit 123, however, in the event that there is a need of perform a wiring among pointers of the objects, which is more complicated than a wiring among the objects, according to the conventional display scheme, it is difficult for users to readily understand the connecting relation among the objects and to efficiently perform a wiring.

For example, hitherto, when a object-between-network is displayed, there is no distinction between a position of display for objects and a position of display for wirings among the objects, and arrangement and wiring of the objects are performed freely. Thus, a certain display device permits an object to overlap with a wiring. This raises such a problem that users are obliged to perform a wiring so as to avoid an overlapping. Also a certain another display device does not display a resultant network even if a wiring is implemented. This raises such a problem that users cannot readily grasp a relation between objects.

Further, according to the prior art system, the displayed object is of a hierarchical structure, and a device for displaying subnetworks constituting a certain object displays such subnetworks on a new screen or window. This raises such a problem that it is difficult for users to identify a connecting relation between a network of the parent object and the subnetworks, and in addition such a problem that the network of the parent object goes behind the new window.

Furthermore, according to the conventional object-between-network display, an object is fixed or variable in size. However, in the event that the object is fixed, in a case where the number of input and output terminals of the object is variable, there is a possibility that the selection of a large number of input and output terminals bring about narrow terminal intervals and thus it will be difficult to display terminal names. Also in the event that the object is variable in size, users have to control the size of the object. This raises such a problem that a work amount is increased.

Still further, according to the conventional object-between-network display, in the event that directions of the flow of data and instructions in the network wiring are indicated, arrows are appended to only one terminal end or only both ends. Consequently, it is impossible to identify the flow direction in the middle of a wiring. Thus, in a case where the objects on both the ends of a wire are out of the display screen, there is a problem that it is impossible to identify whether the terminal of the object, which is a staring end or a terminal end, is an input terminal or an output terminal.

Still furthermore, according to the conventional object-between-network display, in the event that wires intersect, in order to identify whether two wires intersect or separate from one another, a mark such as a black point or the like is appended to a junction, alteratively a circular arc mark or the like is utilized. However, in the event that the mark such as a black point or the like is appended to a junction, it is necessary for users to understand a rule of the display. On the other hand, in the event that the circular arc mark is utilized, there is a problem that a radius of width is needed for a one wire.

In view of the foregoing problems involved in the object-between-network display, an embodiment, which will be described hereinafter, is to provide a display method easy for users to be understood.

Hereinafter, there will be described embodiments of an object-between-network display method according to the present invention. First, fundamental embodiments of an object-between-network display method according to the present invention will be explained, and then the more descriptive embodiments will be explained.

Figure 36:
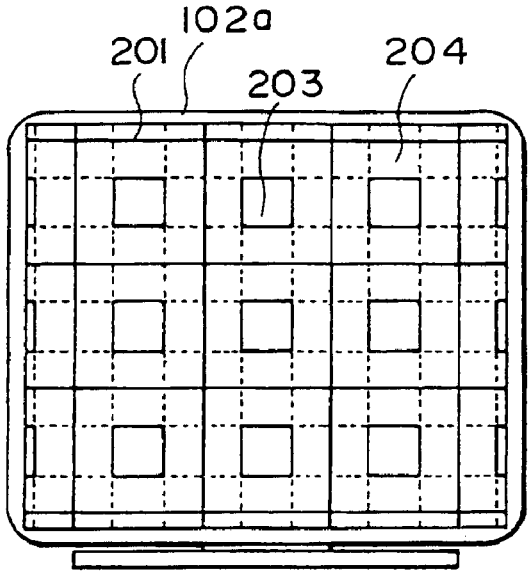
FIG. 36 is a typical illustration of a display screen useful for understanding an object-between-network display method according to an embodiment of the present invention.

FIG. 36 is a typical illustration of a display screen useful for understanding an object-between-network display method according to an embodiment of the present invention While FIG. 35 shows a lattice 201 which appears on the display screen 102a, it is noted that the lattice 201 is shown for the purpose of a clarification that the display screen 102a is partitioned into a plurality of display areas, and the lattice 201 is not displayed indeed on the display screen 102a.

The display screen 102a is partitioned by the lattice 201 into a plurality of display areas each consisting of one measure. Each of the display areas comprises an object display domain 203 for displaying one of a plurality of objects produced by an object-oriented programming, and a wiring display domain 204 for displaying a wiring to connect a plurality of objects to one another. The term "wiring" implies wires representative of the path 13a, 23a, 33a, 43a and 53a for a transfer of messages shown in FIGS. 3 and 15 to 18, and the path 16a for a transfer of data shown in FIG. 2. The wiring display domain 204 is determined in its location in such a manner that the wiring display domain 204 is formed between the object display domain-to-domain 203 of the adjacent two display areas.

There is display on the display screen 102a an image such that each of a plurality of objects constituting a network is disposed on the associated one of the object display domains 203 of the respective display areas, and wirings for coupling the plurality of objects with one another are displayed on the wiring display domains 204.

According to the display method as mentioned above, it is possible to obtain an arrangement in which objects are arranged in good order, and in addition possible to obtain a display easy to see involving no overlapping of the objects with the wirings since the domains for displaying the objects and the domains for displaying the wirings are separately prepared.

Next, there will be explained a method of display for a network wherein objects constituting the network are given with a hierarchical structure.

Figure 37:
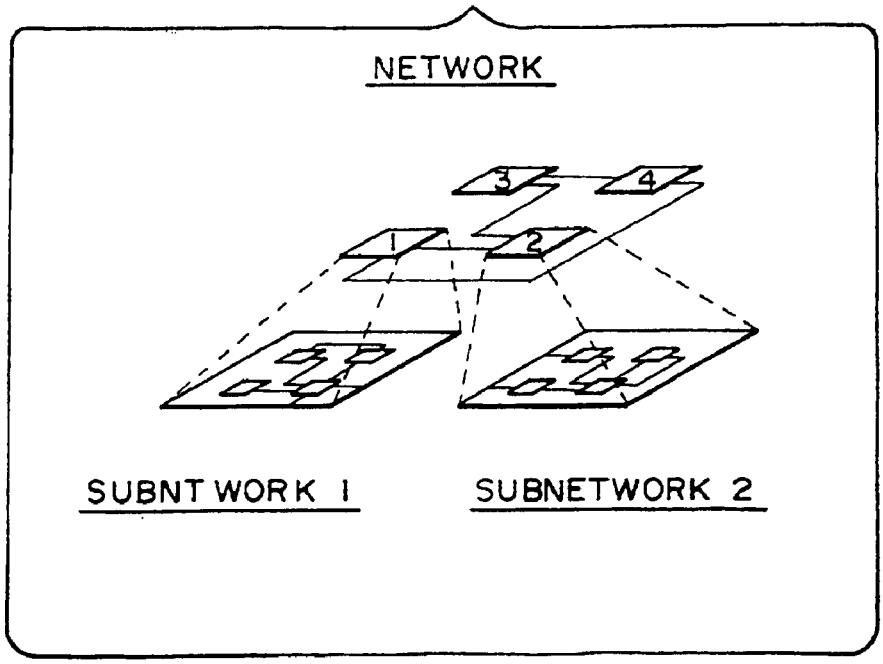
FIG. 37 is an explanatory view useful for understanding hierarchical networks.

FIG. 37 is an explanatory view useful for understanding hierarchical networks.

FIG. 37 shows an example in which objects 1 and 2 are constructed with subnetworks 1 and 2, respectively. Each of the subnetworks 1 and 2 comprises a plurality of objects and wirings for coupling the plurality of objects with one another. While FIG. 37 shows two stages of hierarchical structure, it is acceptable that three or more stages of hierarchical structure is provided.

Figure 38A:
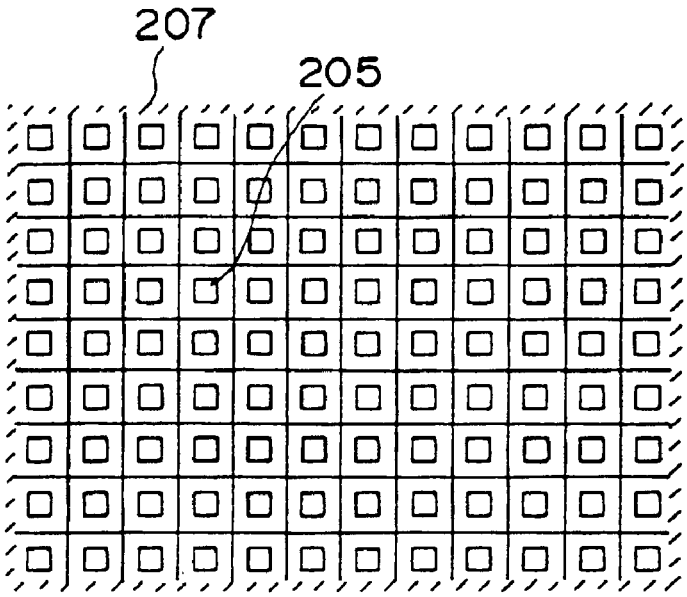
FIGS. 38(A) and 38(B) are illustrations each showing by way of example a display image consisting of a lot of objects and wirings.
Figure 38B:
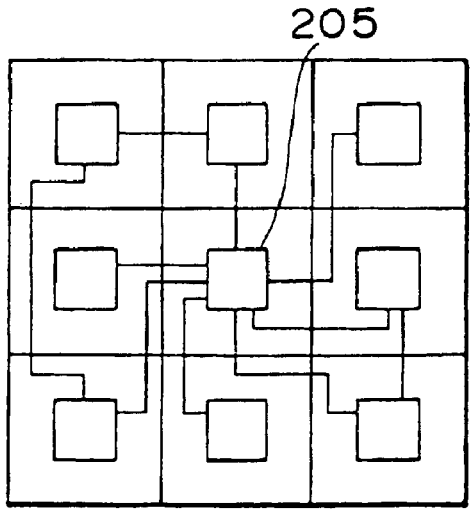

FIGS. 38(A) and (B) are illustrations each showing by way of example a display image consisting of a lot of objects and wirings. FIG. 38(A) shows a display image in its entirety, and FIG. 38(B) shows a partial image, with the object 205 as the central part.

Figure 39:
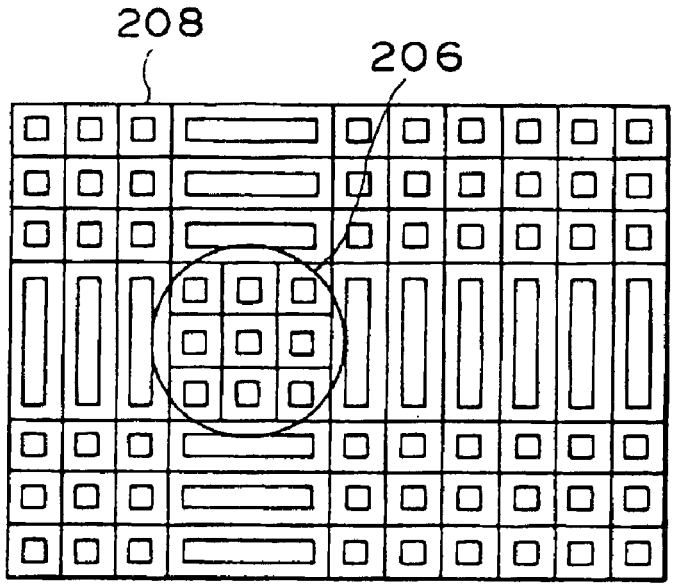
FIGS. 39(A) and 39(B) are illustrations each showing by way of example a display image of a subnetwork.
Figure 39:
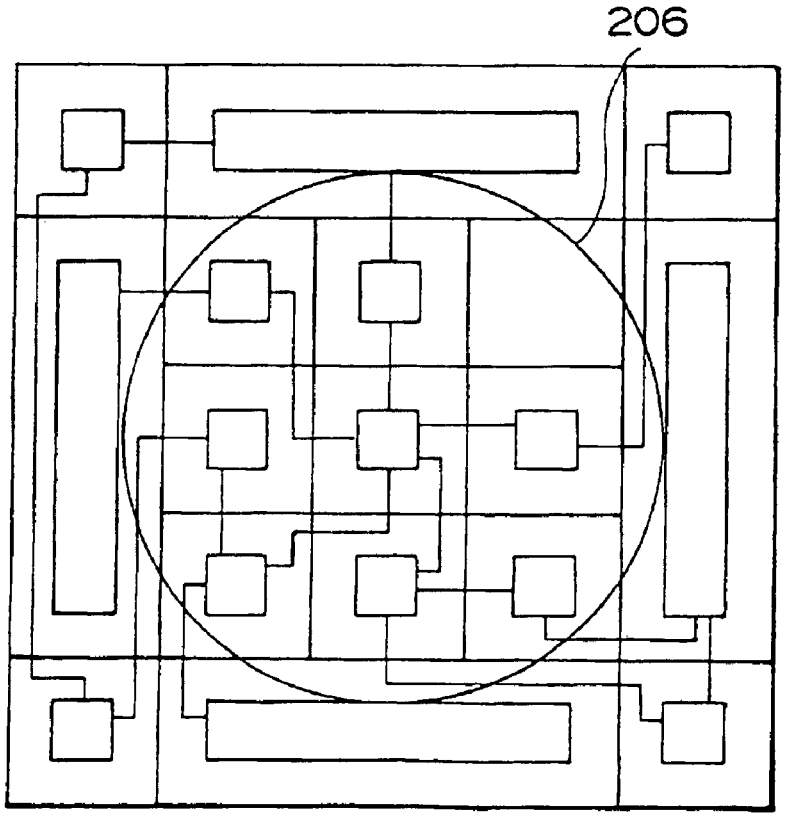

FIGS. 39(A) and (B) are illustrations each showing by way of example a display image of a subnetwork 206 constituting the object 205, instead of the object 205 shown in FIGS. 38(A) and (B). FIG. 39(A) shows a display image in its entirety, and FIG. 39(B) shows a partial image, with the object 206 as the central part.

In the event that the subnetwork, which comprises the above-mentioned lower class of plurality of objects in hierarchical structure, instead of the object 205 included in a display image 207 shown in FIGS. 38(A) and (B), and wiring for coupling those objects with one another, is displayed, a display area boarder than a display area of the object 205 is allocated to the subnetwork 206; display areas, which are arranged at the upper and lower sides of the display area of the subnetwork 206, are enlarged to right and left; display areas, which are arranged at the right and left sides of the display area of the subnetwork 206, are enlarged up and down; and as to display areas located at diagonal sides with respect to the display area of the subnetwork 206, the same size as that of the display areas on the display image shown in FIGS. 38(A) and (B) in which the object 205 equivalent to the subnetwork 206 is displayed is allocated.

As shown in FIGS. 39(B), there are displayed wires among a plurality of objects constituting the subnetwork 206, and in addition there are displayed wires among the subnetwork 206 and the surrounding networks of the subnetwork 206.

An adoption of the above-mentioned display method makes it possible to easily confirm the connecting state of the subnetwork with the surrounding networks, as compared with the conventional scheme in which the subnetwork 206 is displayed on an independent window.

Figure 40A:
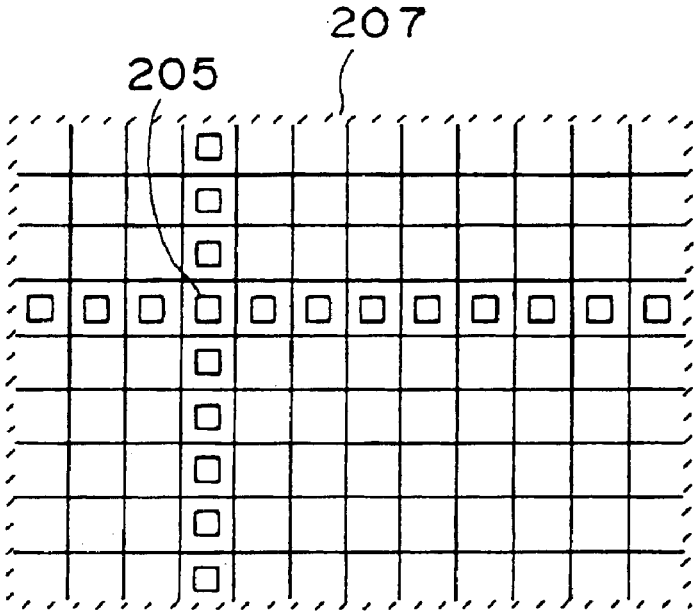
FIGS. 40(A) and 40(B) are illustrations each showing an alternative embodiment of the display method of the subnetwork.
Figure 40B:
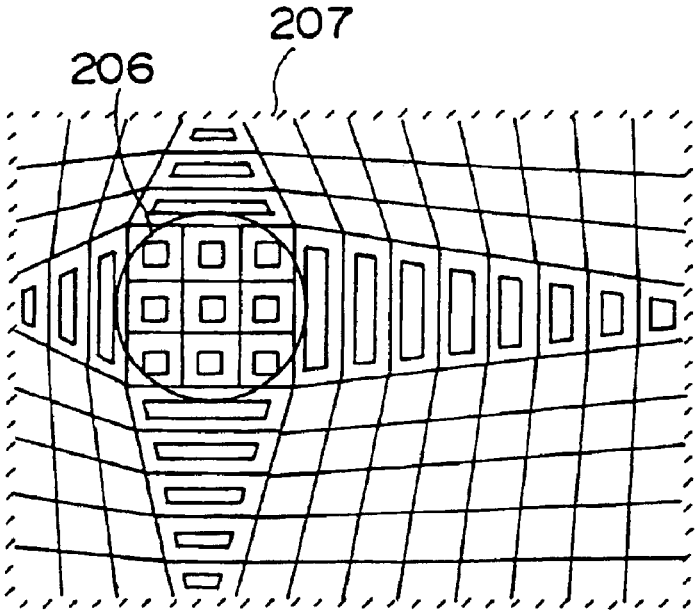

FIGS. 40(A) and (B) are illustrations each showing an alternative embodiment of the display method of the subnetwork. FIG. 40(A) shows an example of a display image before a subnetwork is displayed, the display image including an object equivalent to the subnetwork. FIG. 40(B) shows an example of a display image in which the object is replaced by the subnetwork.

It is assumed that the object 205 included in the display image 207 shown in FIG. 40(A) is replaced by the subnetwork 206 equivalent to the object 205, as shown in FIG. 40(B).

The subnetwork 206 is allocated a display area boarder than that of the object 205. However, the display areas located around the display image shown in FIG. 40(B) is display areas in which the same object is displayed, as compared with the display areas located around the display image shown in FIG. 40(A). Further, with respect to the position and the size of the sides adjacent to the periphery of the display image 207, of the display areas located around the display image, FIG. 40(A) and FIG. 40(B) are the same as each other. That is, in FIG. 40(A) and FIG. 40(B), the same information is displayed except for the point that the object 205 is replaced by the subnetwork 206, while FIG. 40(B) shows that the display area except for the subnetwork 206 is distorted. Thus, it is possible to prevent display areas located apart from the subnetwork 206 from disappearing from the display screen owing to displaying the subnetwork 206 as a substitute for the object 205 as in FIG. 39(A) compared with FIG. 37(A).

Accordingly, similar to the example of FIGS. 39(A) and 39(B), an adoption of the above-mentioned display method makes it possible to easily confirm the connecting state of the subnetwork with the surrounding networks, and in addition makes is possible to confirm throughout the network displayed before a display of the subnetwork (the first image) in a state that the subnetwork is displayed, while deformed.

Figure 41B:
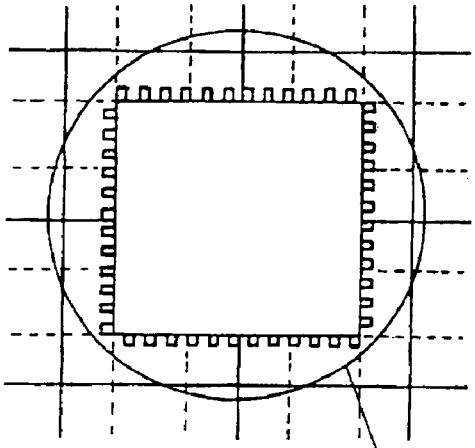
FIGS. 41(A), 41(B) and 41(C) are illustrations each showing by way of example a display image having a display area in which a plurality of measures are coupled with each other.
Figure 41C:
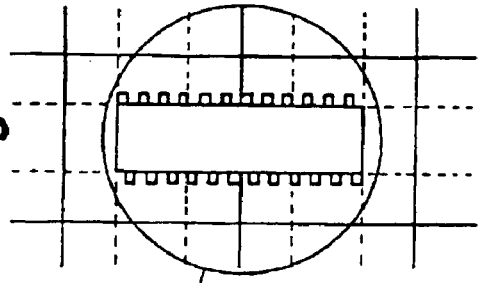
Figure 41A:
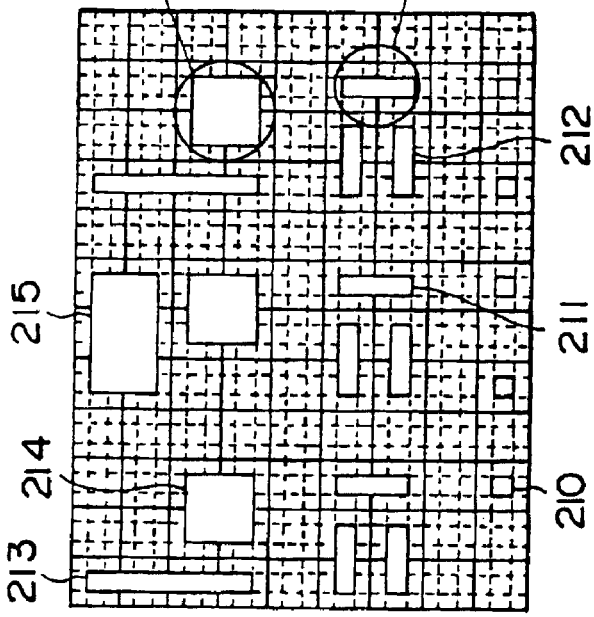

FIGS. 41(A),(B) and (C) are illustrations each showing by way of example a display image having a display area in which a plurality of measures are coupled together. FIG. 41(A) shows the display image in its entirety, and FIGS. 41(B) and (C) show partial images enlarged.

In the display image, there are shown various sizes of object 210-215. The object 210 of these object 210-215 is disposed in an display area partitioned with a measure of domain, and the remaining objects 211-215 each having another size are disposed in enlarged display areas in which a plurality of adjacent measures are coupled together to form a single display area. As shown in FIGS. 41(B) and (C), the objects are standardized in their figure and size in accordance with the figure and size of the associated display areas, respectively.

An adoption of the above-mentioned display method makes it possible to display various sizes of objects with sizes easy to see, and in addition possible to display a display screen easier to see through a standardization.

Next, there will be described a display method of wiring for connecting object-to-object with each other.

Figure 42:
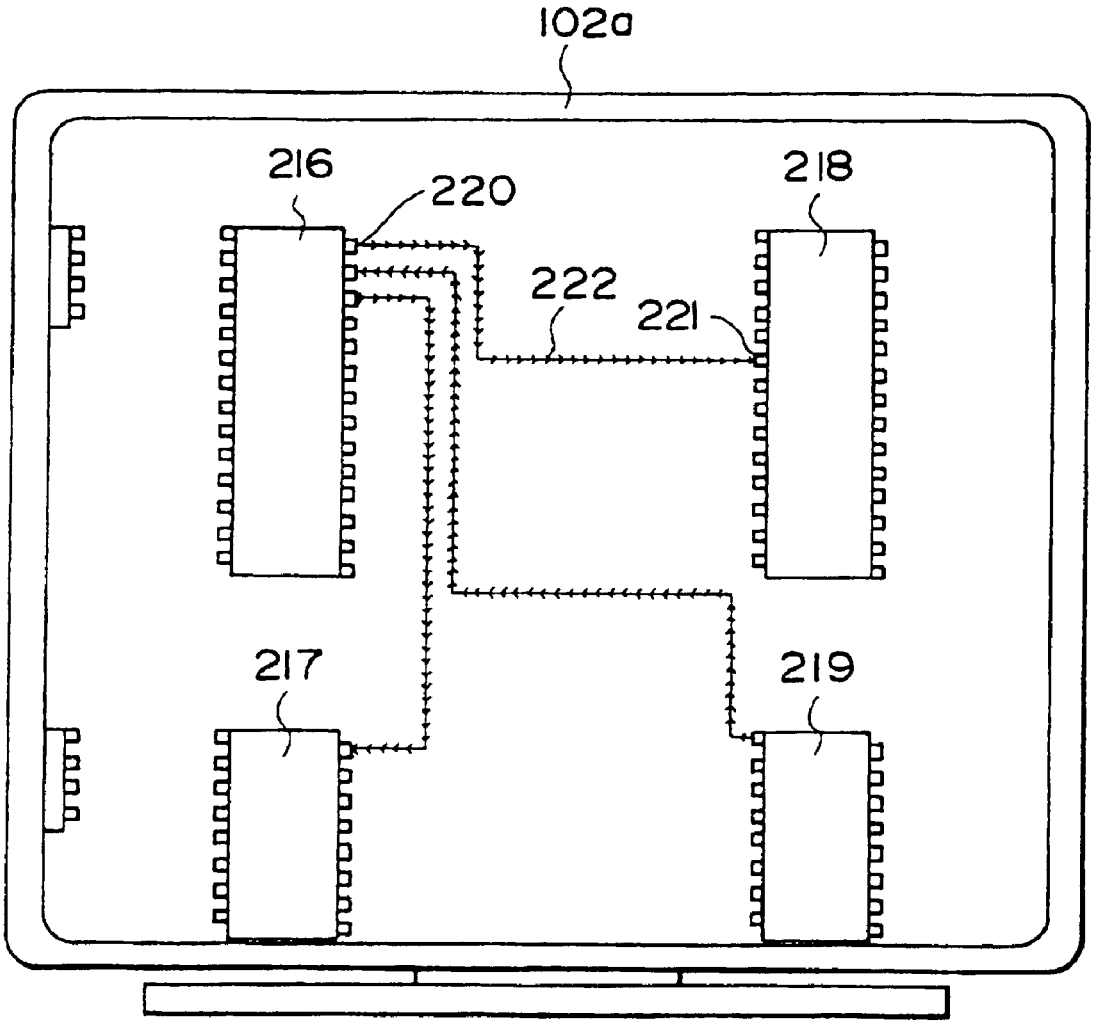
FIG. 42 is an illustration showing by way of example a display image characterized by a display method of wiring.

FIG. 42 is an illustration showing by way of example a display image characterized by a display method of wiring.

Displayed on a display screen 102a are objects 216 to 219. An output terminal 220 is connected to an input terminal 221 by a wire 222. An output terminal implies that data or instructions (messages) of the associated object are outputted to another object. An input terminal implies that data or instructions (messages) of another object are received thereat.

The wire 222 has information of a direction directed from the output terminal 220 to the input terminal 221, in which directions of data or instruction flows are repeatedly indicated for each short segment constituting the wire.

An adoption of the above-mentioned display method makes it possible to readily grasp directions of data or instruction flows even in the event that one or both of the objects to be connected together by the wire are located out of the display screen 102a.

Figure 43A:
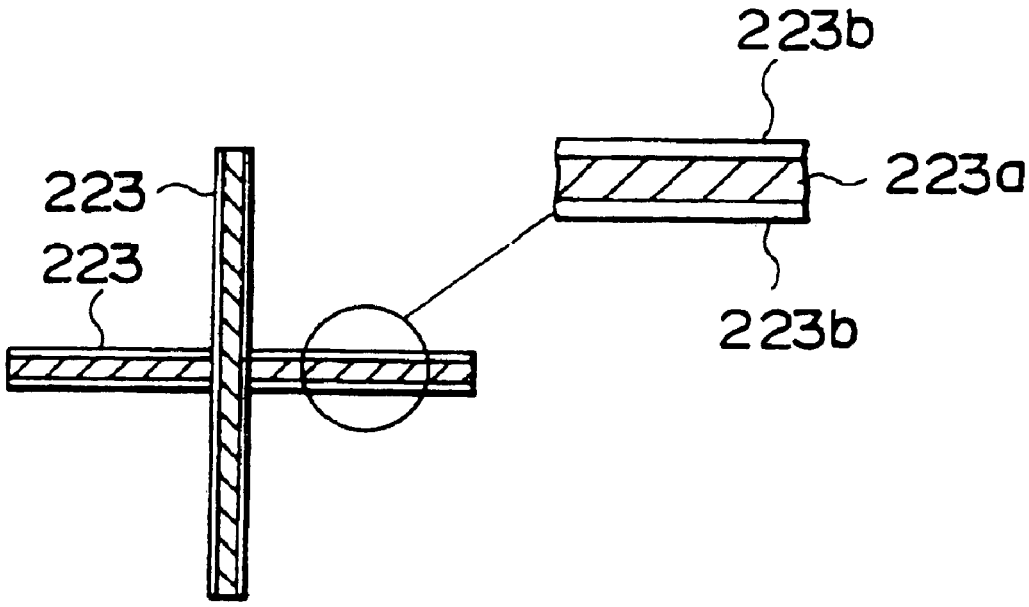
FIGS. 43(A) and 43(B) are illustrations each showing an alternative embodiment of the display method of the wiring.

FIGS. 43(A) and (B) are illustrations each showing an alternative embodiment of the display method of the wiring.

A wire 223 comprises a central wire 223a and edge wires 223b along both ends of the central wire 223a. The central wire 223a and edge wire 223b are representative of mutually different display aspects, for example, hue, lightness and saturation.

Figure 43B:
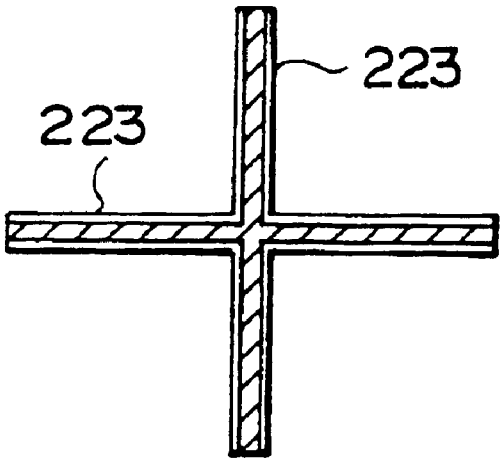

In the event that the wire 223 comprising the central wire 223a and the edge wires 223b is adopted and such two wires 223 intersect, if those two wires are representative of mutually different data or control flows, as shown in FIG. 43(A), there is provided such a display that one of the two wires is divided into parts at the position that its central wire is in contact with the edge wires of the other wire or at the position that its central wire comes close to the edge wires of the other wire (according to the present embodiment, the former) so as to form a crossing with an overpass. On the other hand, if the two wires are representative of the same data or control flows, as shown in FIG. 43(B), there is provided such a display that the central wires 223a of both the wires are continued. An adoption of the above-mentioned display method makes it possible to readily determine as to whether the crossing wires are interconnected or simply cross each other.

The above is an explanation of the fundamental embodiment of the object-between-network display method according to the present invention. Next, hereinafter, there will be described more specific embodiments of the object-between-network display method according to the present invention.

Figure 44:
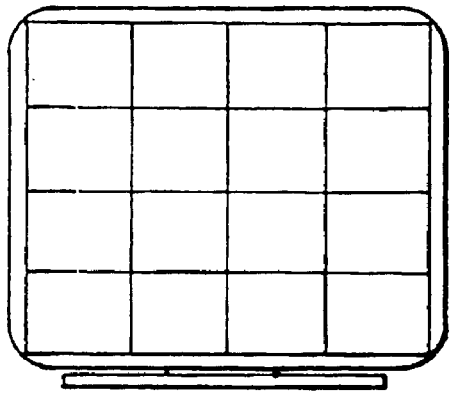
FIGS. 44(A), 44(B) and 44(C) are illustrations useful for understanding a procedure for producing a display area for displaying a network of an object.
Figure 44:
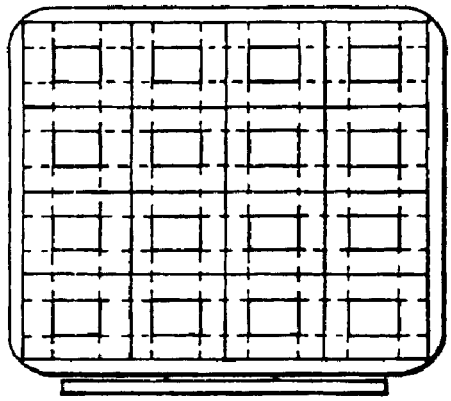
Figure 44:
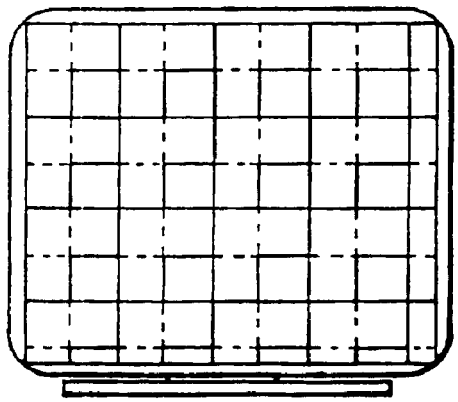

FIGS. 44(A),(B) and (C) are illustrations useful for understanding a procedure for producing a display area for displaying a network of an object. In FIG. 44(A), the display screen is divided vertically and horizontally into four parts to form lattices. In FIG. 44(B), there is provided such an arrangement that for each measure of the produced lattices, a domain formed with length of 50% of the measure in length and breadth is given for an area for disposing an object, and the domain is located at the center of the measure. In FIG. 44(B), the screen is divided on an equal basis, and the area for the object is located at the center of the measure. However, it is acceptable to designate a width of the measure, and as shown in FIG. 44(B), it is acceptable that the area for the object is located at the corner of the measure.

Figure 45:
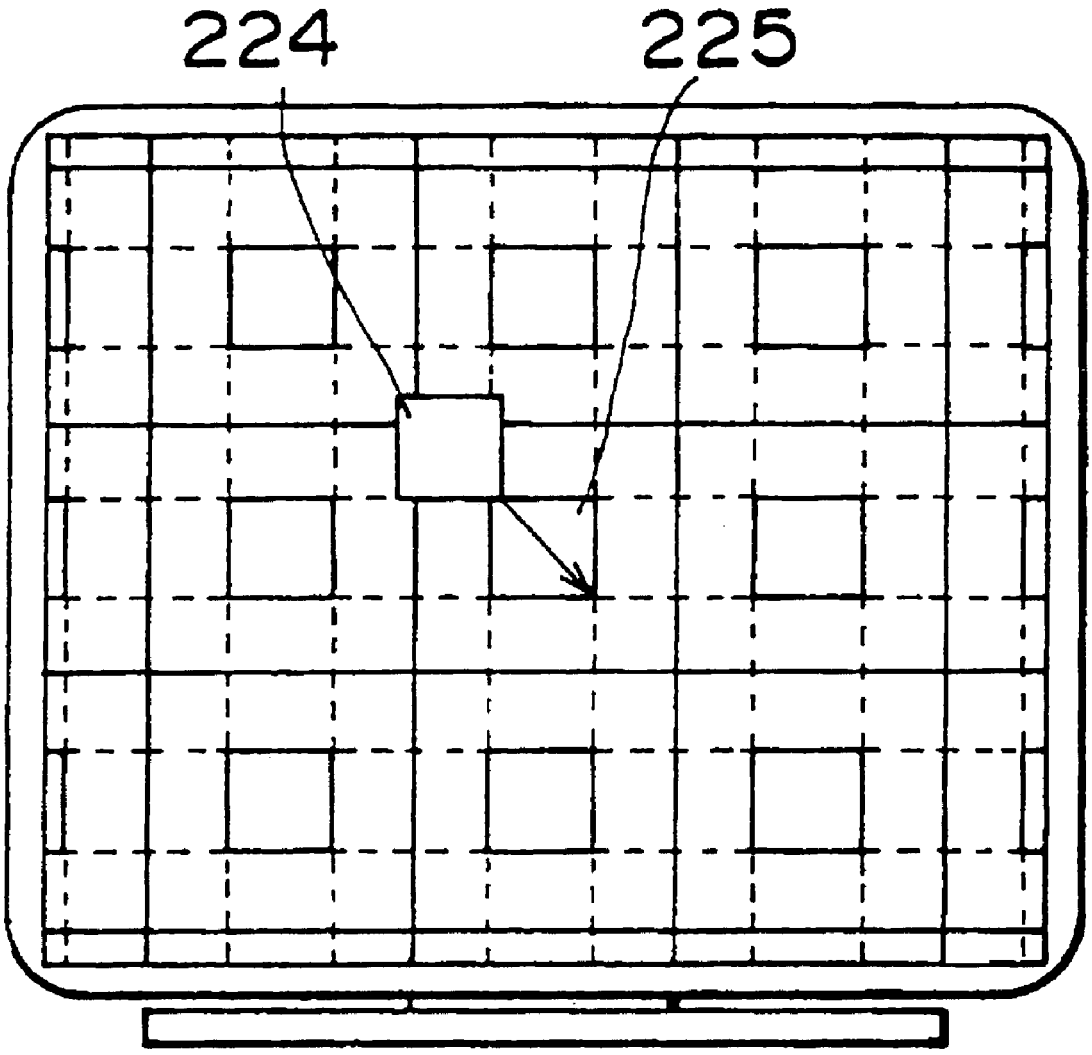
FIG. 45 is an illustration showing a state in which an object is disposed on a display screen by users.
Figure 46A:
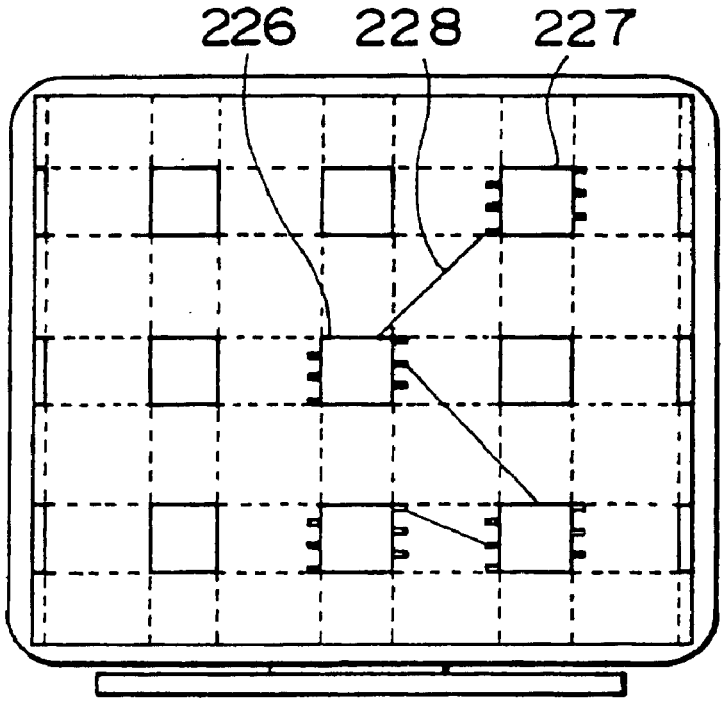
FIGS. 46(A) and 46(B) are illustrations each showing a state in which a wiring among objects disposed on a display screen is performed by users.

FIG. 45 is an illustration showing a state in which an object is disposed on a display screen by users. FIGS. 46(A) and (B) are illustrations each showing a state in which a wiring among objects disposed on a display screen is performed by users.

Figure 46B:
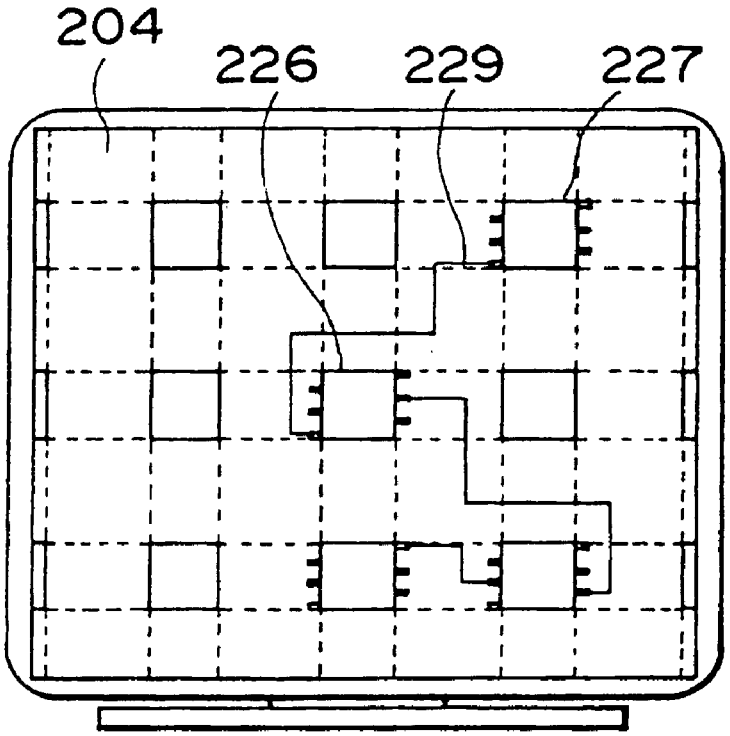

As shown in FIG. 45, according to the present embodiment, when a user sets up an object 224, the object 224 set up by the user is automatically positioned at an area 225 specifically designed for an object disposition, which is located closest to the set up position. Accordingly, it is possible to obtain an arrangement of objects in which objects are arranged in good order simply through users taking it easy to arrange objects. Further, according to the present embodiment, it is possible to automatically display wire 229 in an area 204 for displaying wirings of a network, as shown in FIG. 46(B), simply through users performing an operation of connecting terminals of object 226 and object 227 together with a straight line directly, as shown in FIG. 46(A). Consequently, it does not happen that the objects and the wirings overlap with each other. Thus, it is possible to display a network easy to see for users.

Figure 47:
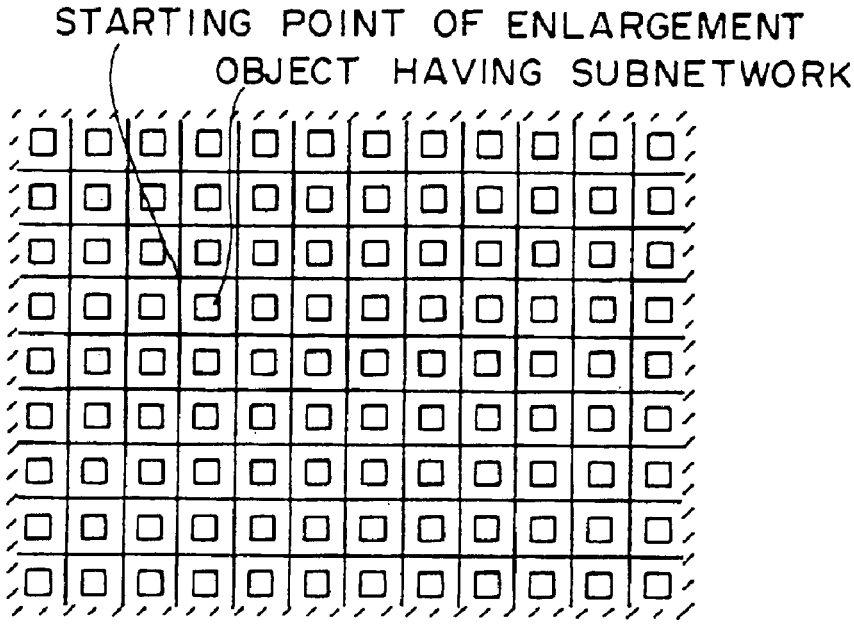
FIGS. 47(A) and 47(B) are illustrations showing by way of example display screens of an object-between-network before and after display of the subnetwork, respectively.
Figure 47:
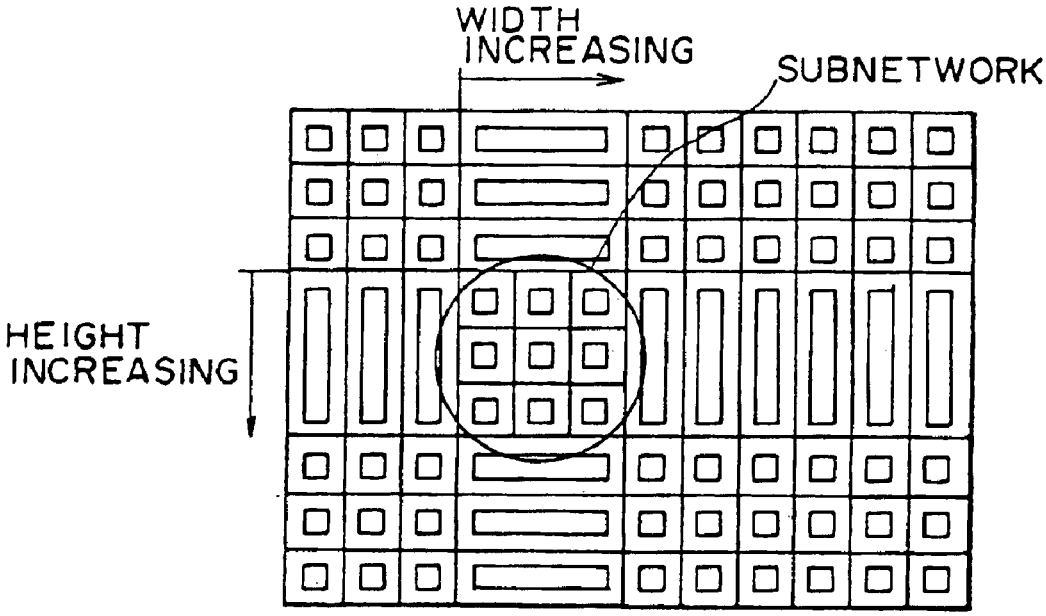
Figure 48:
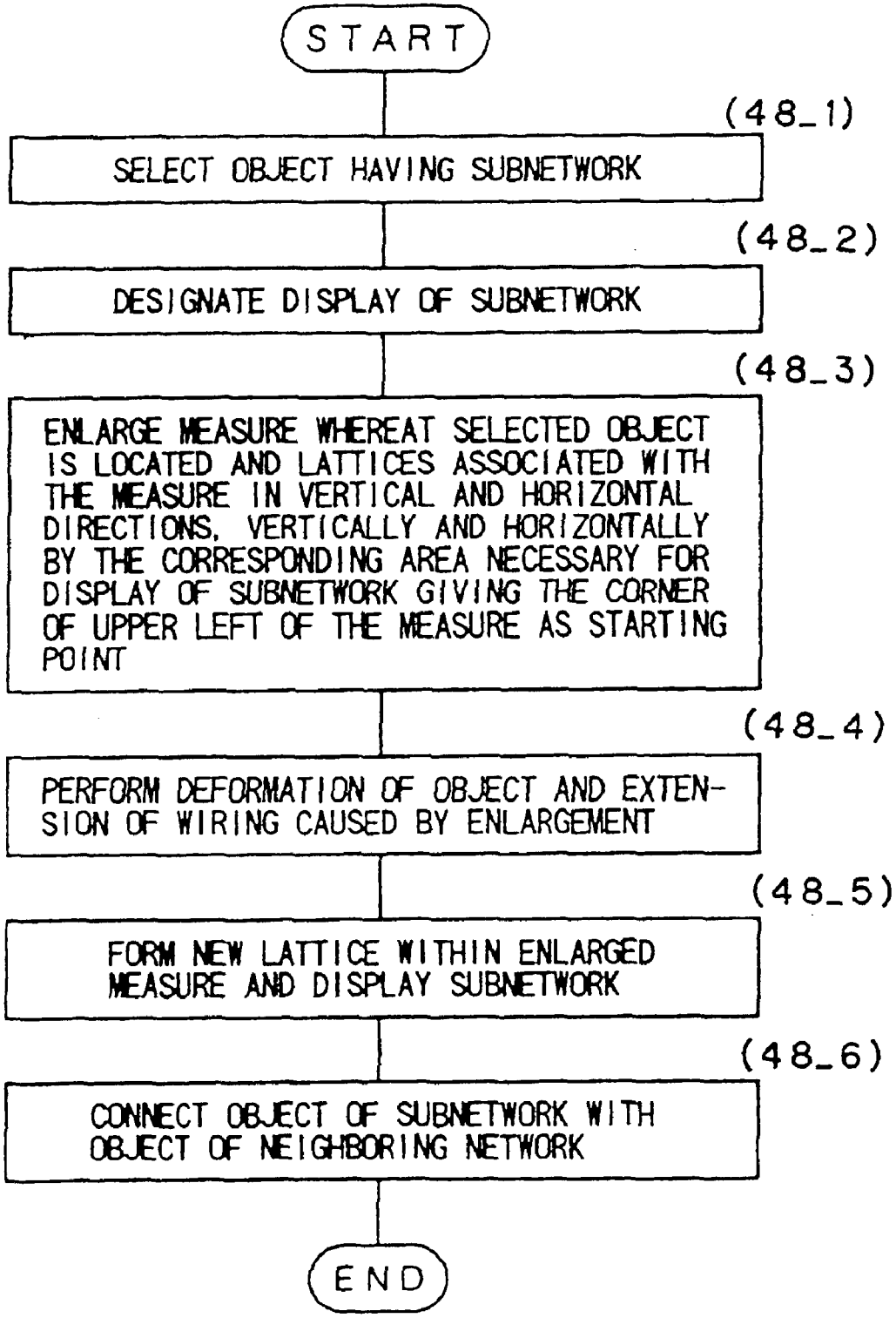
FIG. 48 is a flowchart useful for understanding a procedure for switching from the display of FIG. 47(A) to the display of FIG. 47(B)

FIGS. 47(A) and (B) are illustrations showing by way of example display screens of an object-between-network before and after display of the subnetwork, respectively. FIG. 48 is a flowchart useful for understanding a procedure for switching from the display of FIG. 47(A) to the display of FIG. 47(B).

At the stage that an image shown in FIG. 47(A) is displayed on a display screen, an object having a subnetwork is designated through an operation of, for example, a mouse not illustrated or the like (step 48_1), and it is instructed that the designated subnetwork is displayed (step 48_2). In an image display apparatus, a measure whereat the selected object is located and lattices associated with the measure in vertical and horizontal directions are enlarged by the corresponding area necessary for a display of the subnetwork giving the corner of upper left of the measure as a starting point (step 48_3). In step 48_4, with the enlargement, a deformation of the objects arranged in vertical and horizontal directions and an extension of wirings are performed. In step 48_5, a new lattice is formed within a measure enlarged for a display of the subnetwork and display the subnetwork on the lattice thus formed. In step 48_6, the object of the subnetwork and the object of the neighboring network are connected together.

In this manner, a transfer of images from that shown in FIG. 47(A) to that shown in FIG. 47(B) is performed. Incidentally, according to the present embodiment, the starting point of the measure for an enlargement is given with the corner of upper left of the measure. However, it is acceptable that the enlargement starting point of the measure is given with another corner, or the center of the measure.

Figure 49A:
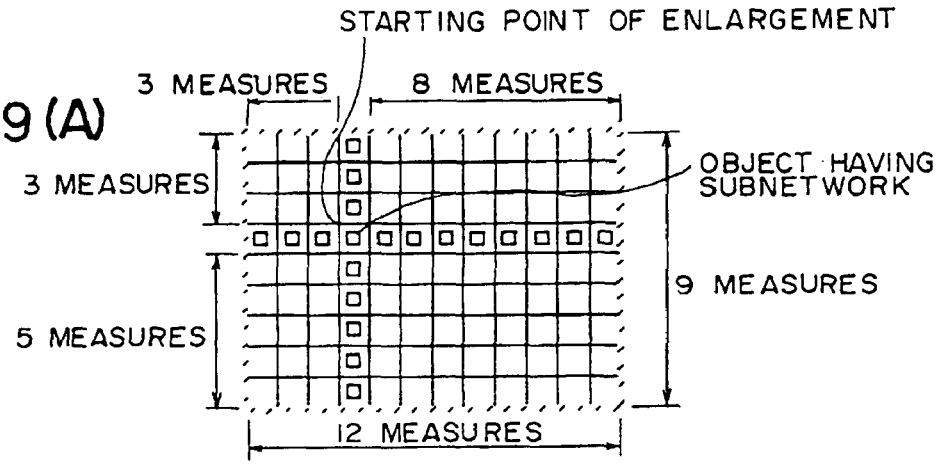
FIGS. 49(A), 49(B) and 49(C) are explanatory views useful for understanding a procedure of a subnetwork display.
Figure 49B:
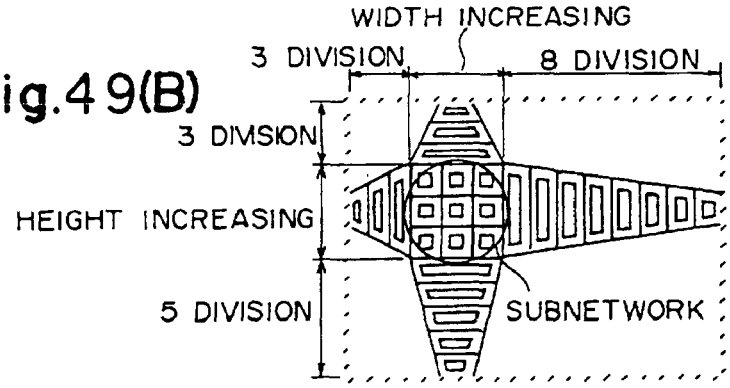
Figure 49C:
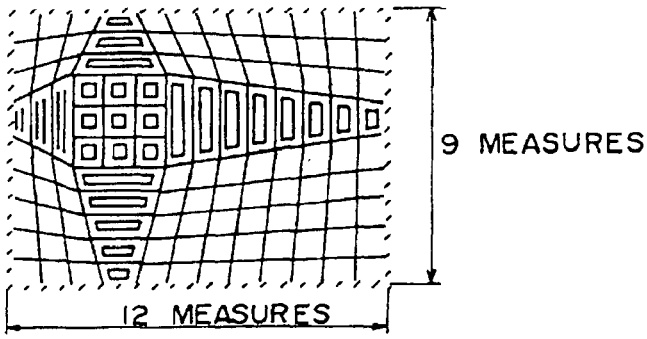

FIGS. 50(A),(B) and (C) are explanatory views useful for understanding a procedure of a subnetwork display. FIG. 49(A) shows an object-between-network before a display of a subnetwork, FIG. 49(B) shows a state in which the subnetwork is displayed with an enlargement and trapezoid of measures are formed on the upper and lower sides and the left and right sides of the enlarged measure, and FIG. 49(C) shows a state in which the subnetwork is displayed with an enlargement, and measures of the neighbor objects are deformed so that the whole network may be displayed within the screen.

Figure 50:
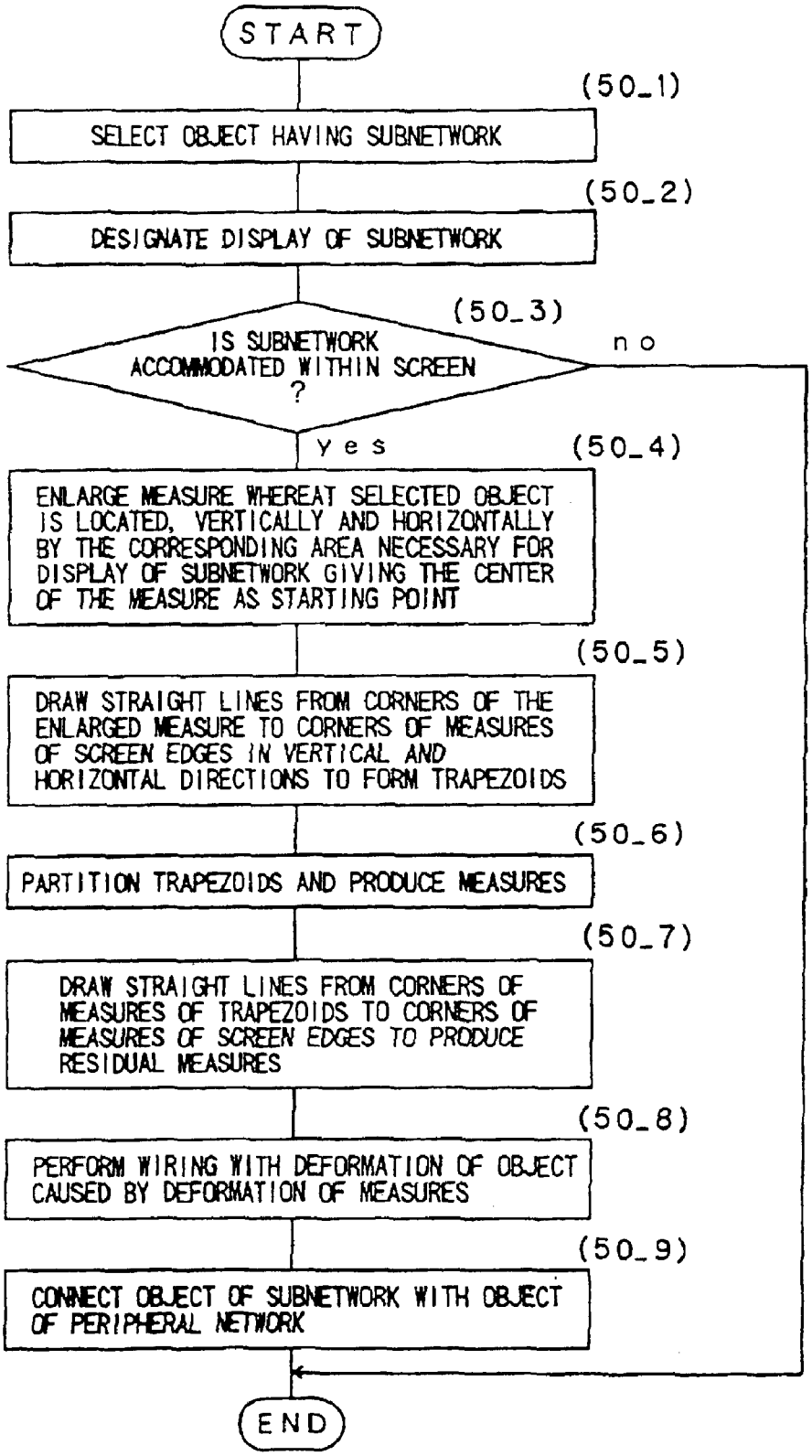
FIG. 50 is a flowchart useful for understanding a procedure of the subnetwork display.

FIG. 50 is a flowchart useful for understanding a procedure of the subnetwork display.

As shown in FIG. 50, an object having a subnetwork is selected through an operation of, for example, a mouse of the like (step 50_1), and it is instructed that the selected subnetwork is displayed (step 50_2). In an image display apparatus, a transfer of images from that shown in FIG. 49(A) to that shown in FIG. 49(C) is performed in accordance with the following procedure.

First, in step 50_3, it is determined as to whether the subnetwork is accommodated within the display screen. If it is decided that the subnetwork is not accommodated within the display screen, a transfer of images from that shown in FIG. 49(A) to that shown in FIG. 49(B) is not performed. If it is decided that the subnetwork is accommodated within the display screen, the process goes to step 50_4 in which a measure whereat the selected object is located is enlarged by the corresponding area necessary for a display of the subnetwork giving the center of the measure as a starting point (cf. FIG. 49(A)).

In step 50_5, as shown in FIG. 49(B), straight lines are drawn from corners of the enlarged measure to corners of the measures of the screen edges in vertical and horizontal directions to form trapezoids. In step $50_6$, each of the trapezoids is partitioned into necessary parts to produce trapezoid of measures. In step 50_7, straight lines are drawn from corners of the measures of trapezoid to corners of the measures of the screen edges to produce residual measures. In step 50_8, with a deformation of the measures, a deformation of the object and wirings are performed. Finally, in step 50_9, the object of the subnetwork and the object of the neighboring network are connected together.

In this manner, a transfer of images from that shown in FIG. 49(A) to that shown in FIG. 49(C) is performed.

Incidentally, according to the present embodiment, the measures formed on the upper and lower sides and the left and right sides of the subnetwork are given with a figure of trapezoid. However, it is acceptable that such measures are given with a figure of curve.

Figure 51A:
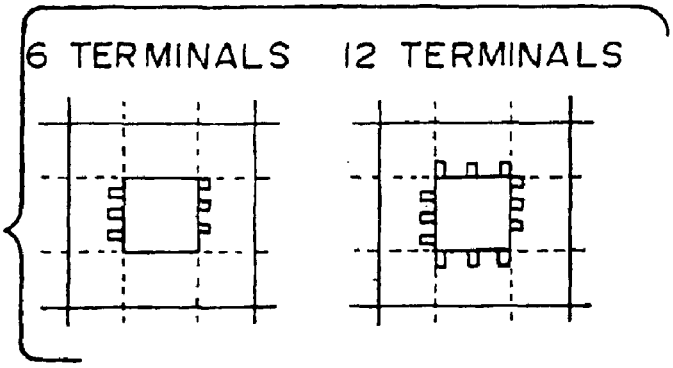
FIGS. 51(A), 51(B) and 51(C) are typical illustrations each showing an embodiment in which a display area representative of an object is formed with a single measure or a plurality of measures coupled with one another.
Figure 51B:
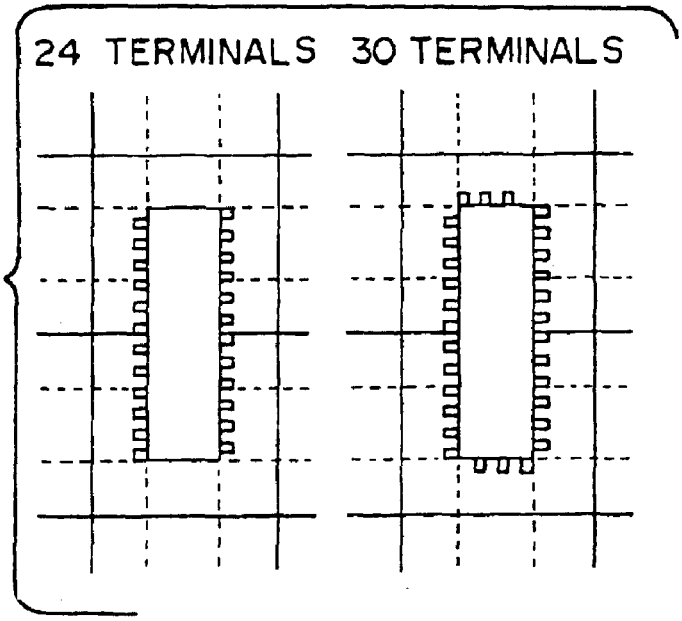
Figure 51C:
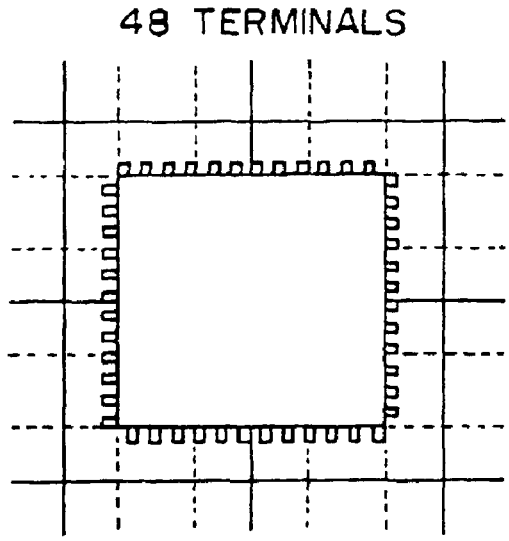

FIGS. 51(A),(B) and (C) are typical illustrations each showing an embodiment in which a display area representative of an object is formed with a single measure or a plurality of measures coupled with one another. According to the present embodiments, a number of measures to be used is altered in accordance with a number of terminals of an object. FIG. 51(A) shows a case where one measure is used by one and an object has the maximum 12 terminals. FIG. 50(B) shows a case where two measures are used by two and an object has the maximum 30 terminals. FIG. 51(C) shows a case where four measures are used by four and an object has the maximum 48 terminals. As a number of terminals of the object is increased, a number of measures may be increased.

Figure 52A:
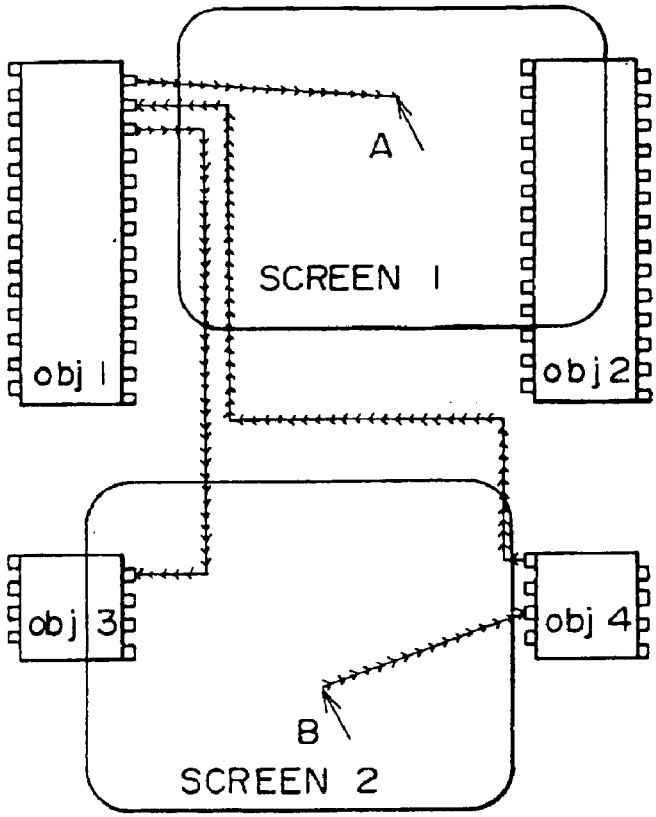
FIGS. 52(A) and 52(B) are illustrations useful for understanding by way of example a display method of wiring.
Figure 52B:
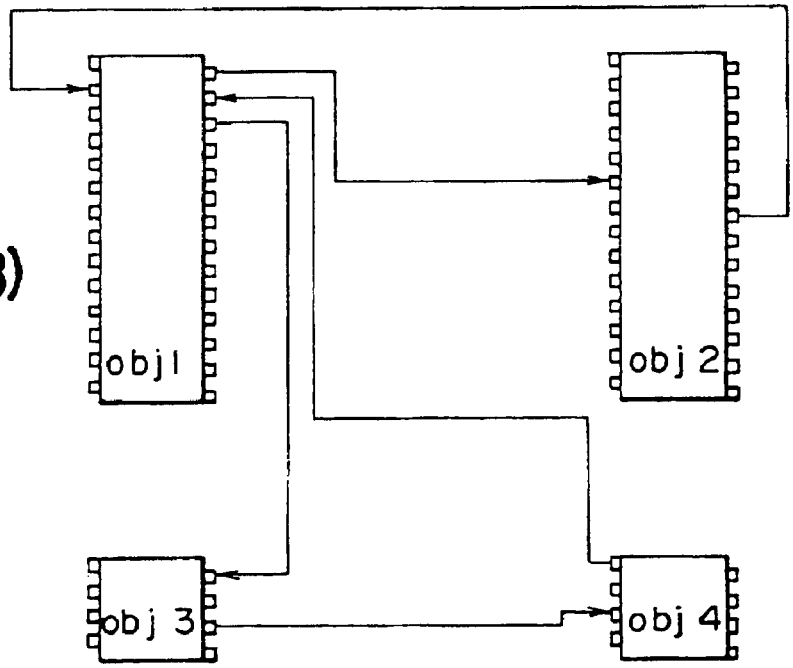

FIGS. 52(A) and (B) are illustrations useful for understating by way of example a display method of wiring. In FIG. 52(A), a screen 1 shows a state of halfway in which a wiring from an output terminal of an object 1 (obj 1) to an input terminal of an object 2 (obj 2) is conducted. While the object 1 disappears from the screen 1, it will be understood from a figure of the line drawn out that a terminal to be connected is an input terminal. Likewise, with respect to a screen 2, in the event that a wiring from an input terminal of an object 4 (obj 4) to an output terminal of an object 3 (obj 3) is conducted, even if the object 4 disappears from the screen 2, it will be understood from a figure of the line that a terminal to be connected is an output terminal. FIG. 52(B) shows a network after a completion of wiring in which wires have been changed to the usual solid lines. According to the present embodiment, while the wires are changed to the usual solid lines at the time when all of the wirings have been completed, it is acceptable that a wire is changed to the usual solid line whenever one wiring is completed.

Figure 53:
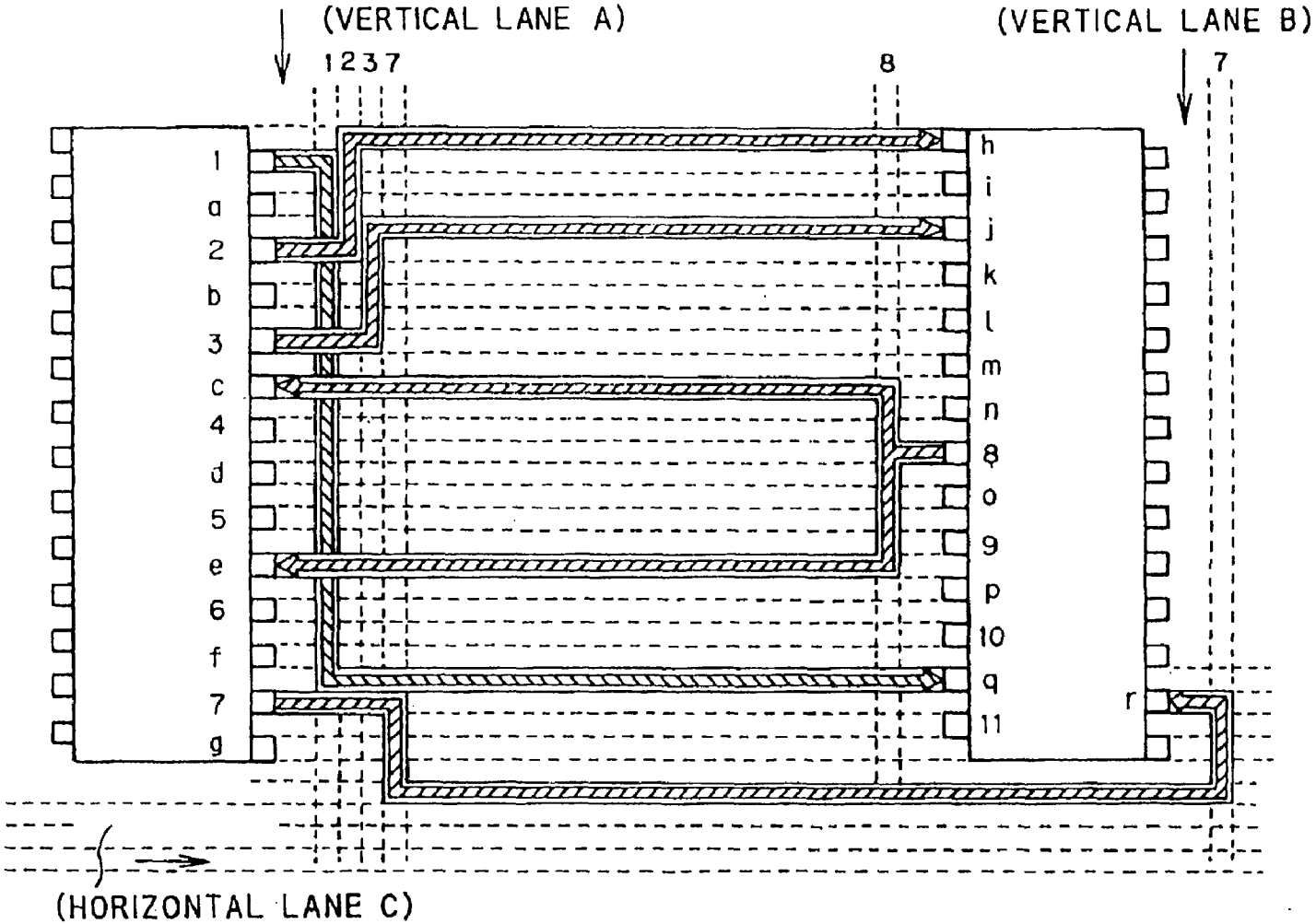
FIG. 53 is a typical illustration showing by way of example a display of wiring.
Figure 54:
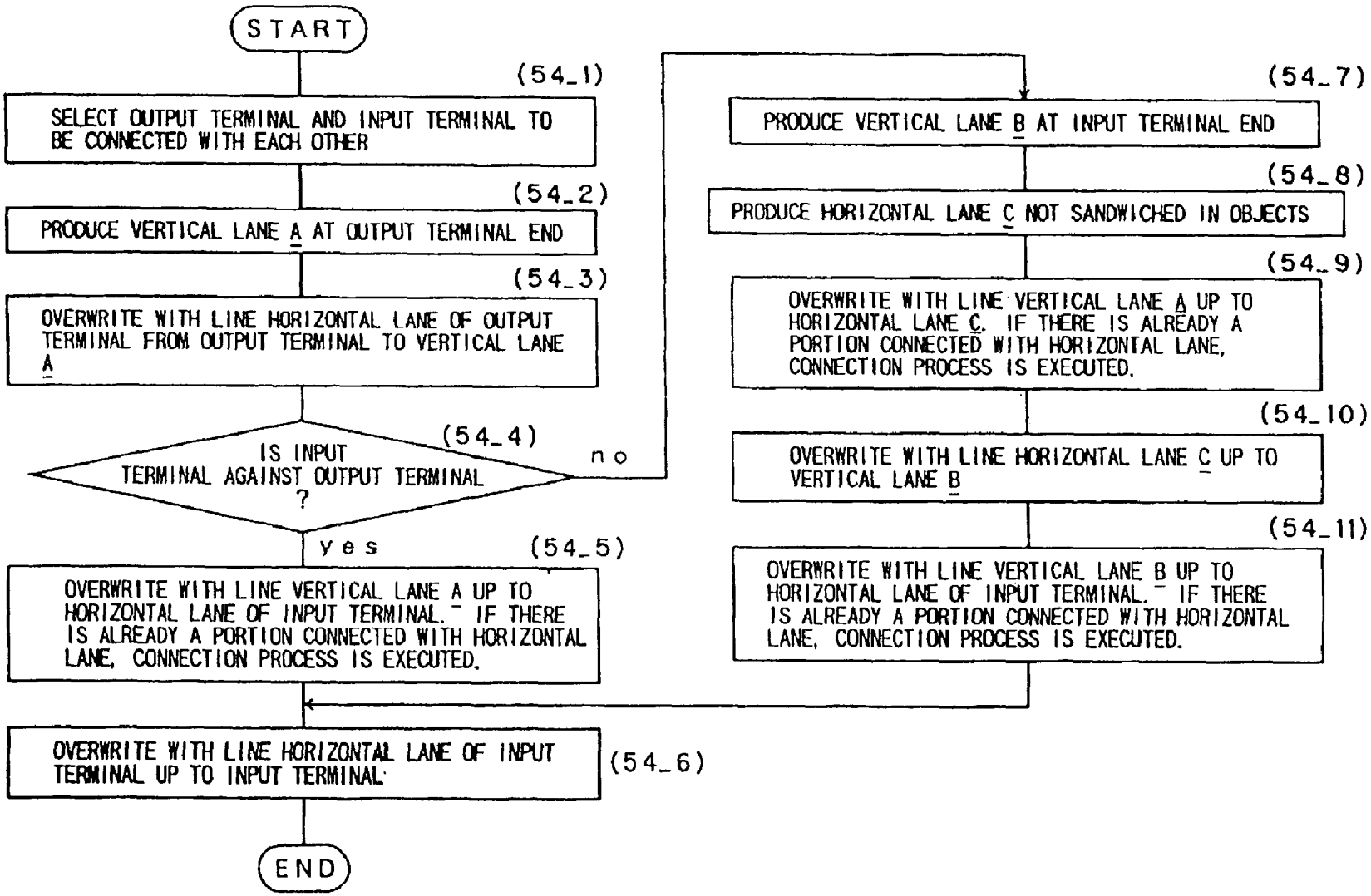
FIG. 54 is a flowchart useful for understanding a procedure of executing the wiring shown in FIG. 53.

FIG. 53 is a typical illustration showing by way of example a display of wiring. FIG. 54 is a flowchart useful for understanding a procedure of executing the wiring shown in FIG. 53.

According to the present embodiment, there is adapted a wiring consisting of the central wires and the edge wires, as described referring to FIGS. 43(A) and (B), and when a user selects the output terminal and input terminal which are connected together, an automatic wiring is conducted in accordance with a procedure shown in FIG. 54.

In step 54_1, a user selects the output terminal and input terminal which are connected together. In step 54_2, a vertical lane A is produced at the output terminal end. In step 54_3, overwritten with a line is a horizontal lane of the output terminal from the output terminal to the vertical lane A, so that a wiring on the overwritten portion is displayed on the display screen. In step 54_4, it is determined whether the input terminal is over against the output terminal. What is meant by that the input terminal is over against the output terminal is that for example, as in the relation between an output terminal 1 and an input terminal q, the output terminal and the input terminal are located so as to be opposite to each other. On the other hand, in case of the relation between an output terminal 7 and an input terminal r, it is determined that they are not over against each other.

In a case where it is determined that the input terminal is over against the output terminal, the process goes to step 54_5 in which the vertical lane A is overwritten with a line up to the horizontal lane of the input terminal. If there is already a portion connected with the horizontal lane, for example, as in a case where a wiring between an output terminal 8 and an input terminal c is already conducted, and in addition a wiring between the output terminal 8 and an input terminal e is newly conducted, a coupling process as shown in FIG. 43(B) is performed. In step 54_6, the horizontal lane of the input terminal is overwritten with a line up to the input terminal.

In a case where in step 54_4, it is determined that the input terminal is not over against the output terminal, the process goes to step 54_7 in which the vertical lane is produced at the input terminal end. In step 54_8, a horizontal lane C not sandwiched in objects is produced. In step 54_9, the vertical lane A is overwritten with a line up to the horizontal lane C. If there is already a portion connected with the horizontal lane, a coupling process is performed.

In step 54_10, the horizontal lane C is overwritten with a line up to the vertical lane B. In step 54_11, the vertical lane B is overwritten with a line up to the horizontal lane of the input terminal. If there is already a portion connected with the horizontal lane, a coupling process is performed.

Thereafter, the process goes to step 54_6 in which the horizontal lane of the input terminal is overwritten with a line up to the input terminal.

Figure 55:
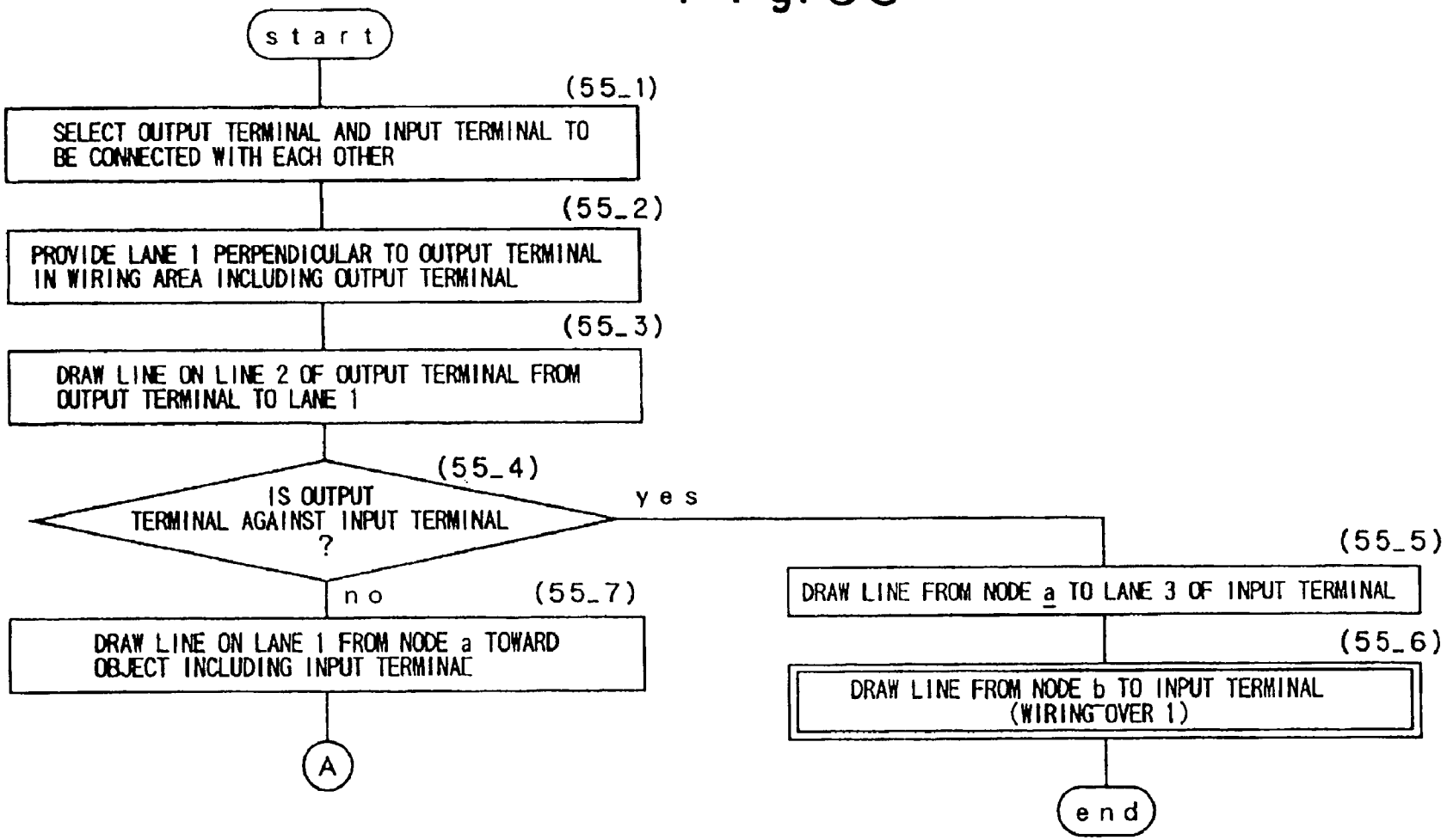
FIG. 55 is a flowchart useful for understanding an alternative embodiment of a procedure of executing the wiring.
Figure 56:
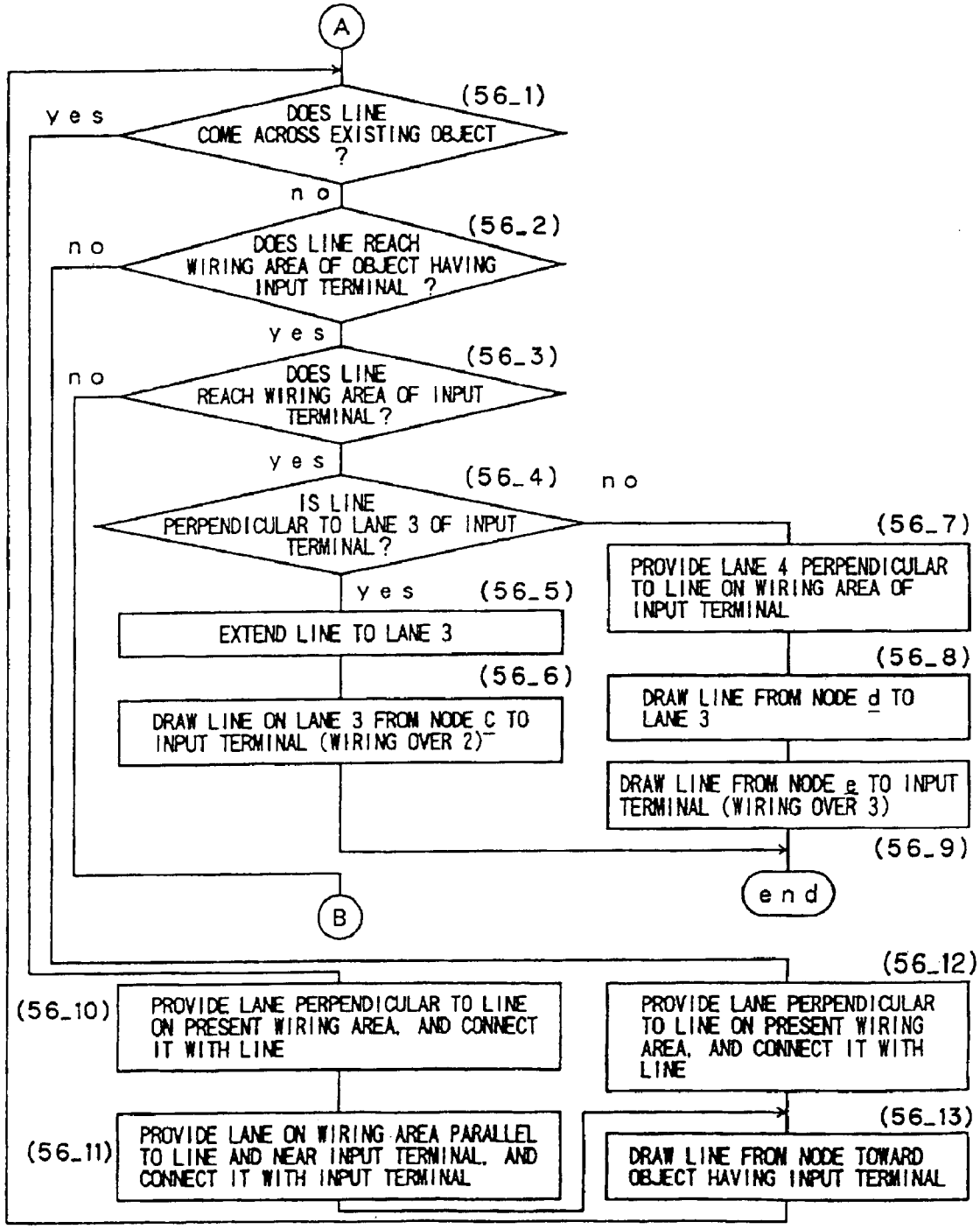
FIG. 56 is a flowchart useful for understanding a further alternative embodiment of a procedure of executing the wiring.
Figure 57:
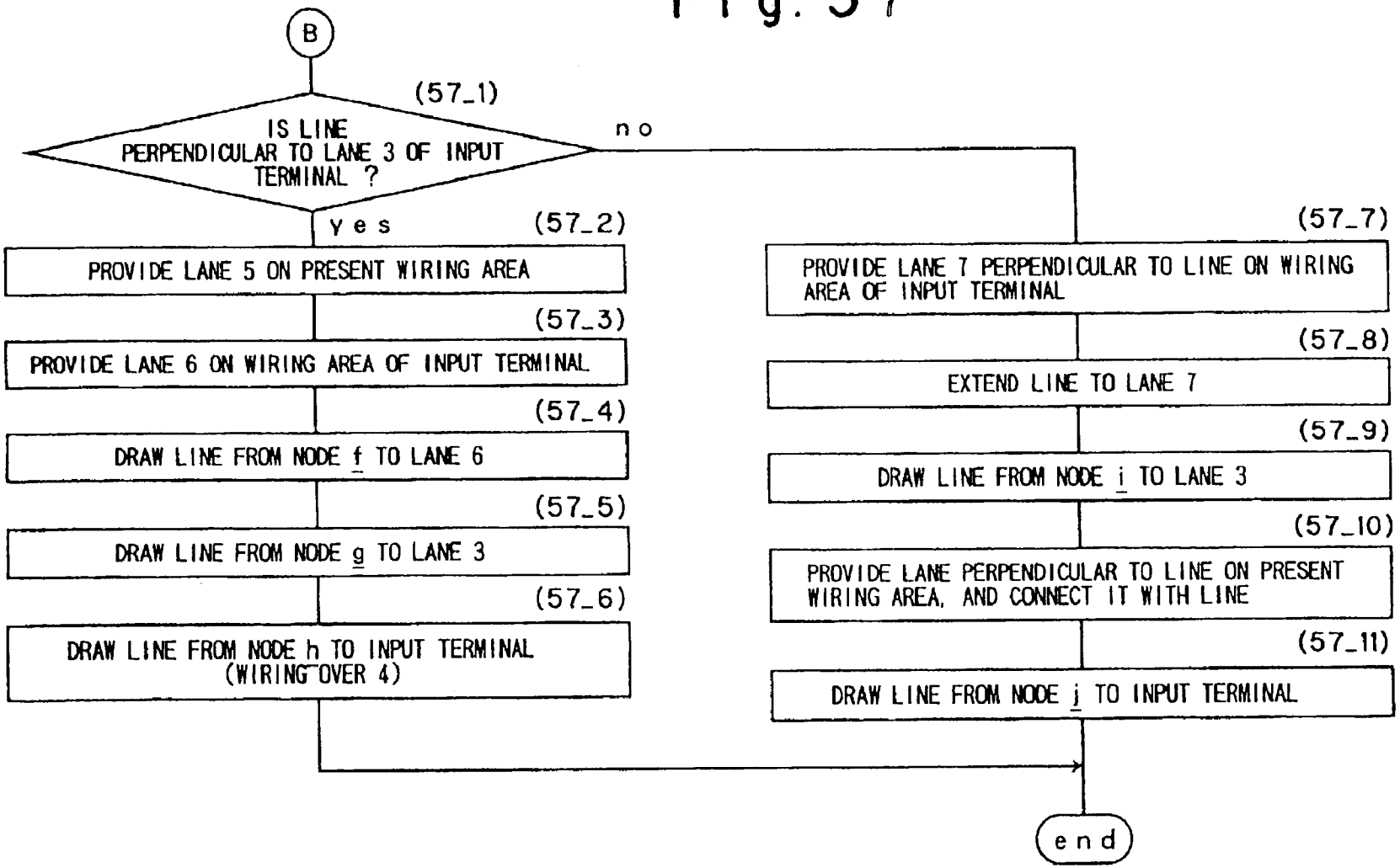
FIG. 57 is a flowchart useful for understanding a still further alternative embodiment of a procedure of executing the wiring.

Each of FIGS. 55-57 are a flowchart useful for understanding an alternative embodiment of a procedure of executing the wiring. FIGS. 58-62 are typical illustrations each showing a result obtained from an execution of wiring according to the wiring procedures shown in FIGS. 55-57. FIGS. 63(A),(B) and (C) are typical illustrations each showing a result obtained from an execution of wiring according to the wiring procedures shown in FIGS. 55-57. An adoption of the wiring procedures according to the present embodiment makes it possible to perform an automatic wiring, even if there exist objects which are not uniform in figure, different from the case in which the wiring procedure shown in FIG. 54 is adopted.

Figure 58:
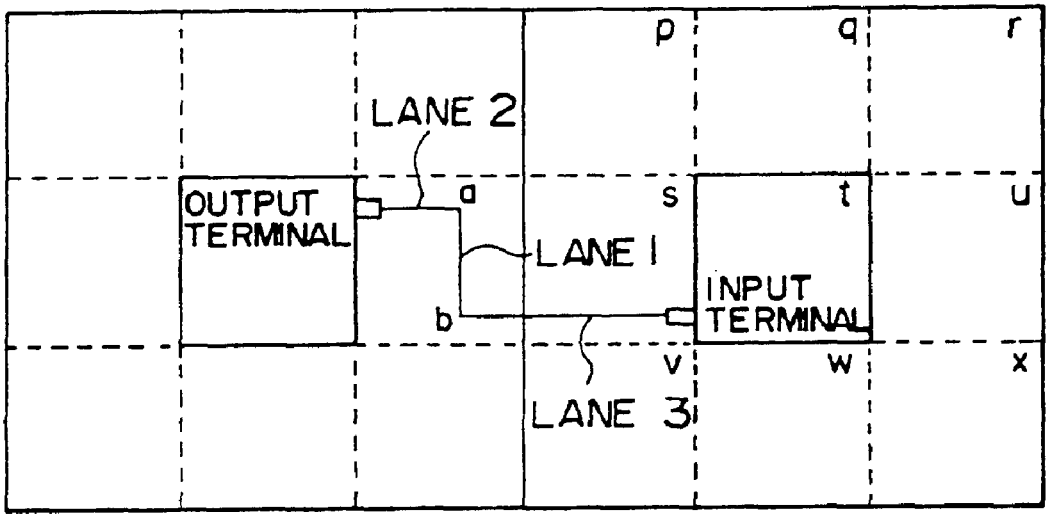
FIGS. 58-62 are typical illustrations each showing a result obtained from an execution of wiring according to the wiring procedures shown in FIGS. 54-56.

As shown in FIG. 55, in step 55_1, a user selects the output terminal and input terminal which are connected together. In step 55_2, a lane 1 (cf. FIGS. 58-62) perpendicular to the output terminal is provided in an wiring area having the output terminal. In step 55_3, a line is drawn on a lane 2 (cf. FIGS. 58-61) of the output terminal from the output terminal to the lane 1. In step 55_4, it is determined whether the input terminal is over against the output terminal. In a case where the input terminal is over against the output terminal, as shown in FIG. 58 of FIGS. 58-61, the process goes to step 55_5 in which a line is drawn from a node a of the lane 1 and lane 2 to a lane 3 of the input terminal. In step 55_6, a line is drawn from a node b, which is a cross point of the lane 1 and lane 3, to the input terminal. Thus, the wiring is completed, in the event that the input terminal is over against the output terminal, as shown in FIG. 58.

In a case where in step $\mathbf{55}_4$, it is determined that the input terminal is not over against the output terminal, the process goes to step 55_7 in which a line is drawn from the node a of the lane 1 and lane 2 twoard an object having the input terminal. While the line is drawn, it is determined as to whether the line comes across an existing object (step 56_1 in FIG. 56), whether the line reaches an wiring area an object having the input terminal (step 56_2), whether the line reaches an wiring area of the input terminal (step 56_3), and whether the line reaches a position perpendicular to the lane 3 of the input terminal (step 56_4).

In step 56_1, where it is determined that the line comes across the existing object, the process goes to step 56_10 in which, as shown in FIG. 63(A), a lane A perpendicular to the line is provided on a wiring area of a position whereat the tip of the line is located now, and the lane A thus provided is connected to the line. In step 56_11, a lane B parallel to the line is provided on a wiring area near the input terminal, and the line is connected along the lane A from the lane 1 to the lane B. In step 56_13, a line is drawn along the lane B from a node k or cross point of lane A and lane B toward the object having the input terminal.

Figure 63A:
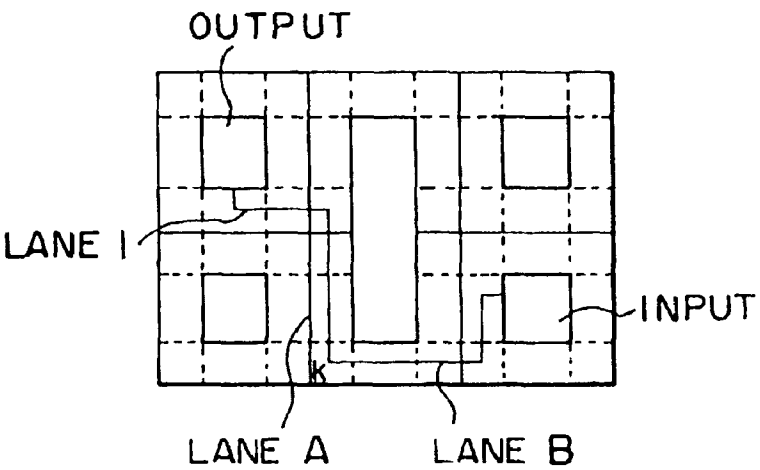
FIGS. 63(A), 63(B) 63(C) and 63(D) are typical illustrations each showing a result obtained from an execution of wiring according to the wiring procedures shown in FIGS. 55-57.
Figure 63B:
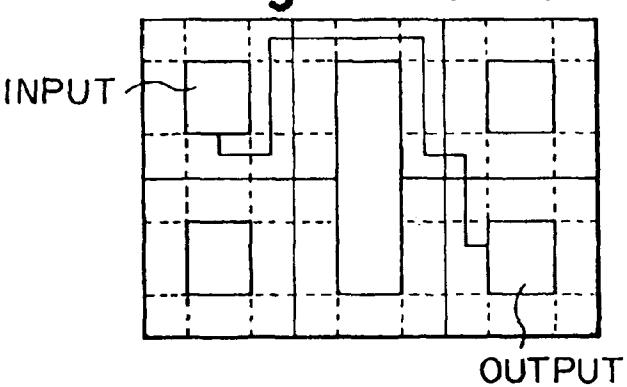
Figure 63C:
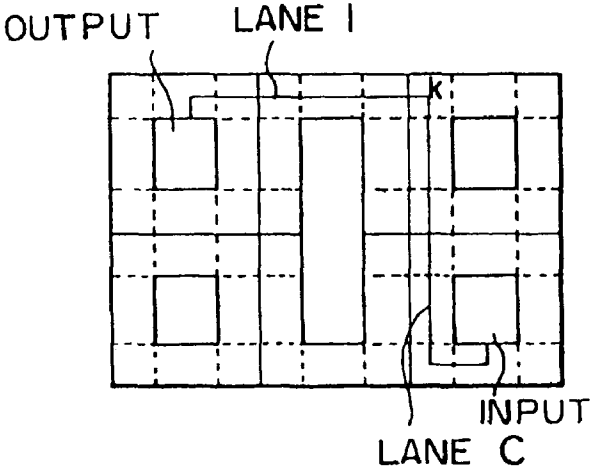
Figure 63D:
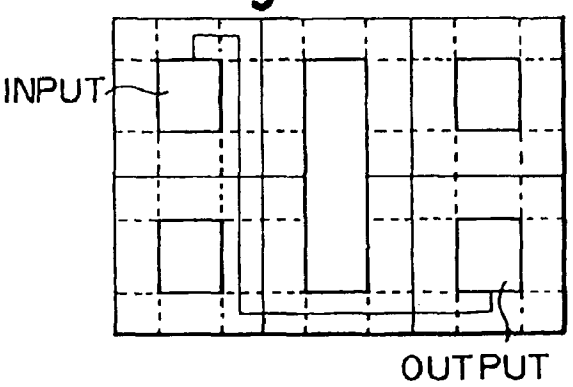

In step 56_2, the determination is made at the stage that a line is drawn along the lane 1 up to a cross of area in which the area of the object having the input terminal (including not only the disposing area of the object itself, but also the neighbor wiring areas, for example, in case of FIG. 58, the area of the object having the input terminal implies all of the partial areas p, q, r, s, u, v, w and y) is extended vertically and horizontally. In step 56_2, when it is determined that the line does not reach the area of the object having the input terminal (for example, in case of FIG. 58, all of the partial areas p, q, r, s, u, v, w and y), the process goes to step 56_12 in which as shown in FIG. 63(C), a lane C perpendicular to the line is provided on a wiring area of a position whereat the tip of the line is located now, and the lane C thus provided is connected to the line. In step 56_13, a line is drawn along the lane C from the node k toward the object having the input terminal.

In a case where in step 56_3, when it is determined that the line does not reach the wiring are of the input terminal (for example, in case of FIG. 58, the partial areas p, s and v), the process goes to step 57_1. This case will be described latter.

Figure 59:
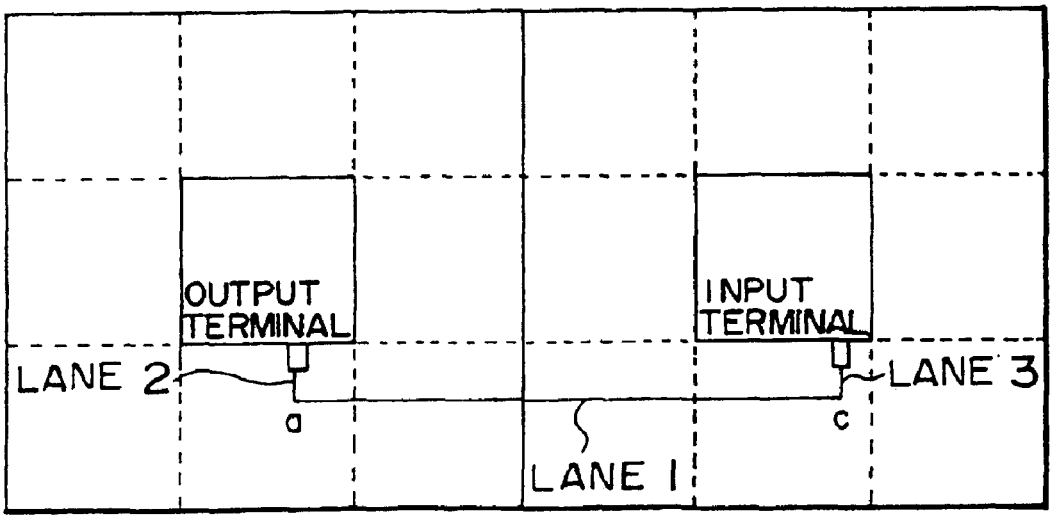

In step 56_4, it is determined as to whether the line reaches a position perpendicular to the lane 3 of the input terminal, and when it is decided that the line is perpendicular to the lane 3, the process goes to step 56_5 in which as shown in FIG. 59, the line is extended to the lane3. In step 56_6, the line is drawn on the lane 3 from the noise C crossing to the lane 3 to the input terminal. Thus, the wiring shown in FIG. 59, for example, is completed.

Figure 60:
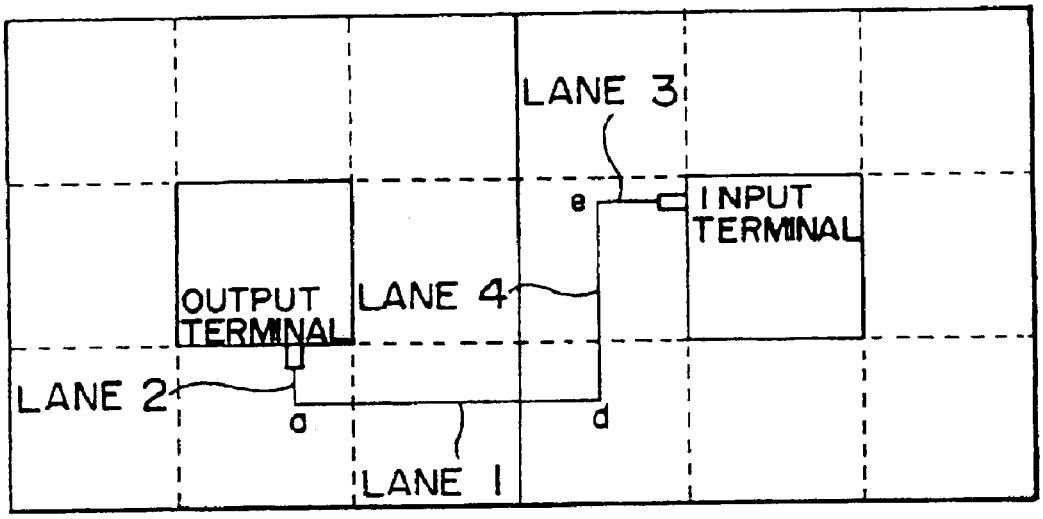

On the other hand, in step 56_4, when it is decided that the line is not perpendicular to the lane 3 of the input terminal, the process goes to step 56_7 in which as shown in FIG. 60, a lane 4 perpendicular to the line is provided on the wiring area of the input terminal. In step 56_8, the line is drawn from a node d to the lane 3. In step 56_9, the line is drawn from a node e to the input terminal. Thus, the wiring shown in FIG. 60, for example, is completed.

Figure 61:
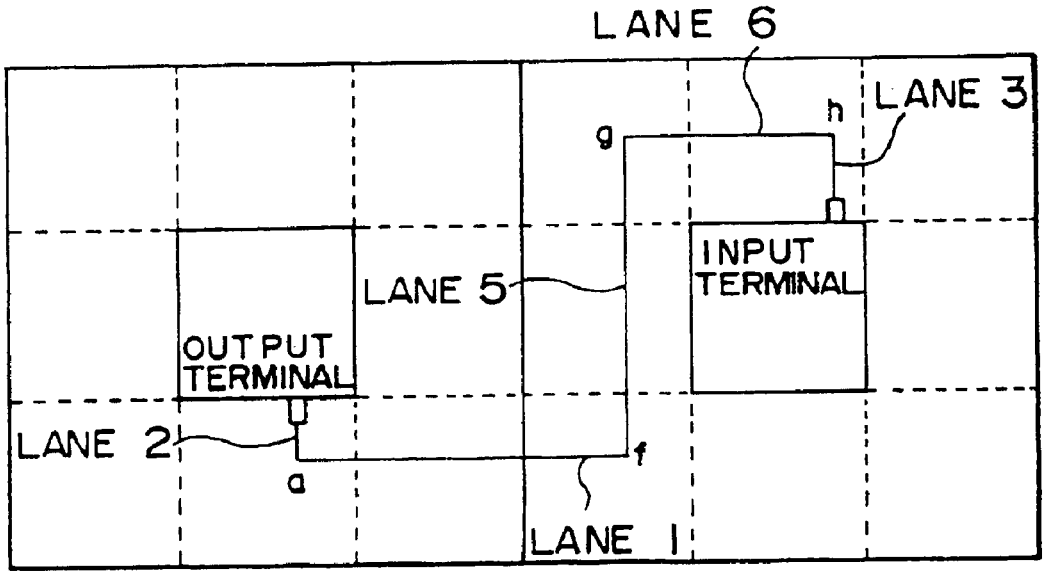

In step 56_3, when it is determined that the line does not reach the wiring area of the input terminal, the process goes to step 57_1 of FIG. 57 in which it is determined as to whether the line reaches a position perpendicular to the lane 3 of the input terminal. When it is decided that the line is perpendicular to the lane 3, the process goes to step 57_2 in which as shown in FIG. 61, a lane 5 is provided on the present wiring area. In step 57_3, a lane 6 is provided on the wiring area of the input terminal. In step 57_4, the line is drawn from a node f along the lane 5 to the lane 6. In step 57_5, the line is drawn from a node g to the lane 3. In step 57_6, the line is drawn from a node h to the input terminal. Thus, the wiring shown in FIG. 61, for example, is completed.

Figure 62:
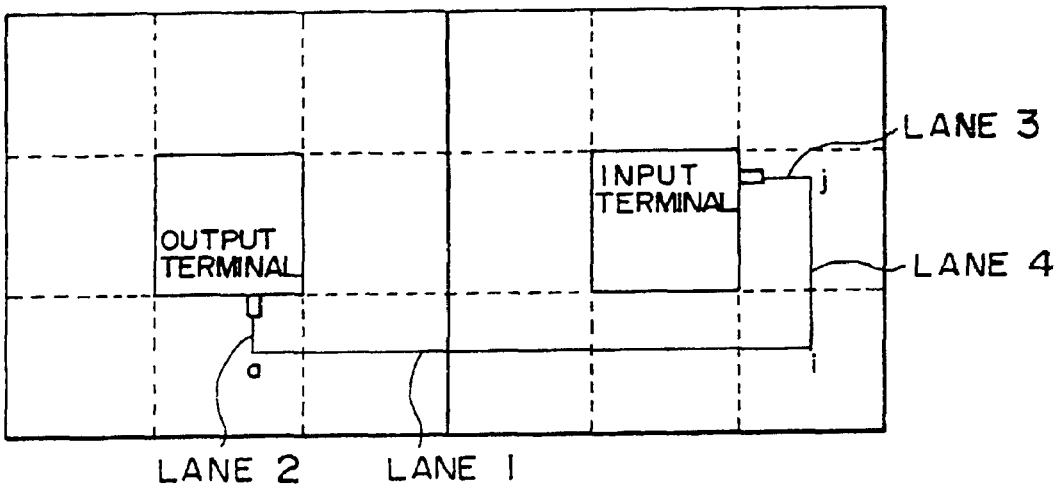

In step 57_1, when it is decided that the line is not perpendicular to the lane 3 of the input terminal, the process goes to step 57_7 in which as shown in FIG. 62, a lane 7 perpendicular to the line is provided on the wiring area of the input terminal. In step 57_8, the line is extended from the node a to a lane 7. In step 57_9, the line is drawn from a node i to the lane 3. In step 57_19, a lane perpendicular to the line is provided on the present wiring area, and the lane thus provided is connected to the line. In step 57_11, the line is drawn from a node j to the input terminal. Thus, the wiring shown in FIG. 62, for example, is completed.

Practicing the wiring procedures shown in FIGS. 55-57 makes it possible to complete the wirings in case of a disposing state of each of the objects of FIGS. 63(A) to (D) as well.

As described above, according to the object-oriented programming apparatus and an object-oriented program storage medium of the present invention, there is implemented a higher speed of transfer of information among a plurality of objects in an object-oriented programming. Thus, it is possible to realize a software system wherein a lot of small objects are gathered, without decreasing a processing speed, thereby dramatically improving reuse of the objects.

Further, according to the case where the object-oriented programming apparatus of the present invention is provided with an object display unit, and the object-between-network display method according to the present invention, it is possible to display an object-between-network easy to be understood thereby contributing to an improvement of a working efficiency for users.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

As described above, according to the object-between-network display method according to the embodiment of the present invention, it is possible to display an object-between-network easy to be understood thereby contributing to an improvement of a working efficiency for users.

The above is an explanation concerning an embodiment of an object-between-network display method on the display screen 102a of he display unit 102 of the computer system 100 shown in FIG. 1, of embodiments concerning the interobject wiring editor unit 122 and the associated periphery of the object ware programming system 120. Next, there will be described an embodiment concerning a programming in the interobject wiring editor unit 122 and the associated periphery. The programming in the interobject wiring editor unit 122 is performed in such a manner that the object-between-network as mentioned above is displayed on the display screen, an operator "wire" among objects through his observation of the display.

As mentioned above, hitherto, there exists a concept of an object-oriented programming, remaining problems as to resume of a software and a running speed, wherein objects are typically displayed on a display screen and "wired", so that a connecting relation among the objects is described. Such a "wiring" has been associated with the following problems.

In the event that objects are of a hierarchical structure, it is impossible to directly connect objects, which belong mutually different hierarchies, with one another. Thus, in case of a scheme wherein a wiring is permitted only in the same hierarchy via a one stage higher-order hierarchy of objects (this is referred to as "parent object") including a higher-order hierarchy of objects (this is referred to as "child object"), there is a need to prepare a large number of terminals for a relay use for the purpose of connection of objects, when objects to be connected are mutually far hierarchies. Thus, it takes a lot of procedure for a wiring, and thus it is troublesome.

On the other hand, in the event that objects are of a hierarchical structure, and in case of a scheme wherein it is permitted to directly connect objects, which belong mutually different hierarchies, with one another, there will be provided a wiring diagram which does not take into account of a hierarchy. Thus, this raises such a problem that the wiring diagram is not so easy to see and it is difficult to grasp the wiring structure in its entirety.

Further, when there is a need to replace the object once wired by another object, in order to implement the replacement, there is a need to remove the wiring of the previous object and do over again the wiring for the new object. Thus, it takes a lot of procedure for the replacement.

This is a similar as to the matter of that the object once wired on a certain hierarchy is shifted to another hierarchy, for example; a one stage lower order hierarchy. Also in this case, it takes a lot of procedure such that the wiring of the object before a shift is removed, a parent object is placed wired thereat, the removed object is placed as a child object of the parent object, and a wiring between the parent object and the child object is conducted.

Further, according to the conventional scheme, there has been associated with such a problem that as the interobject wiring is complicated, a connection relation among objects is hardly to be understood from an indication of the wiring diagram. Especially, in the event that a bus representative of a flow of request for processing, which bus referred to as a "instruction bus", is connected to a plurality of objects on a branching basis, it is difficult to graphs a running sequence of the processing among the plurality of objects from the indication of the wiring diagram. Accordingly, it is also difficult to alter the running sequence on the wiring diagram.

In view of problems involved in the above-mentioned interobject wiring, the embodiment, which will be described hereinafter, relate to a scheme of facilitating a wiring work.

Figure 64:
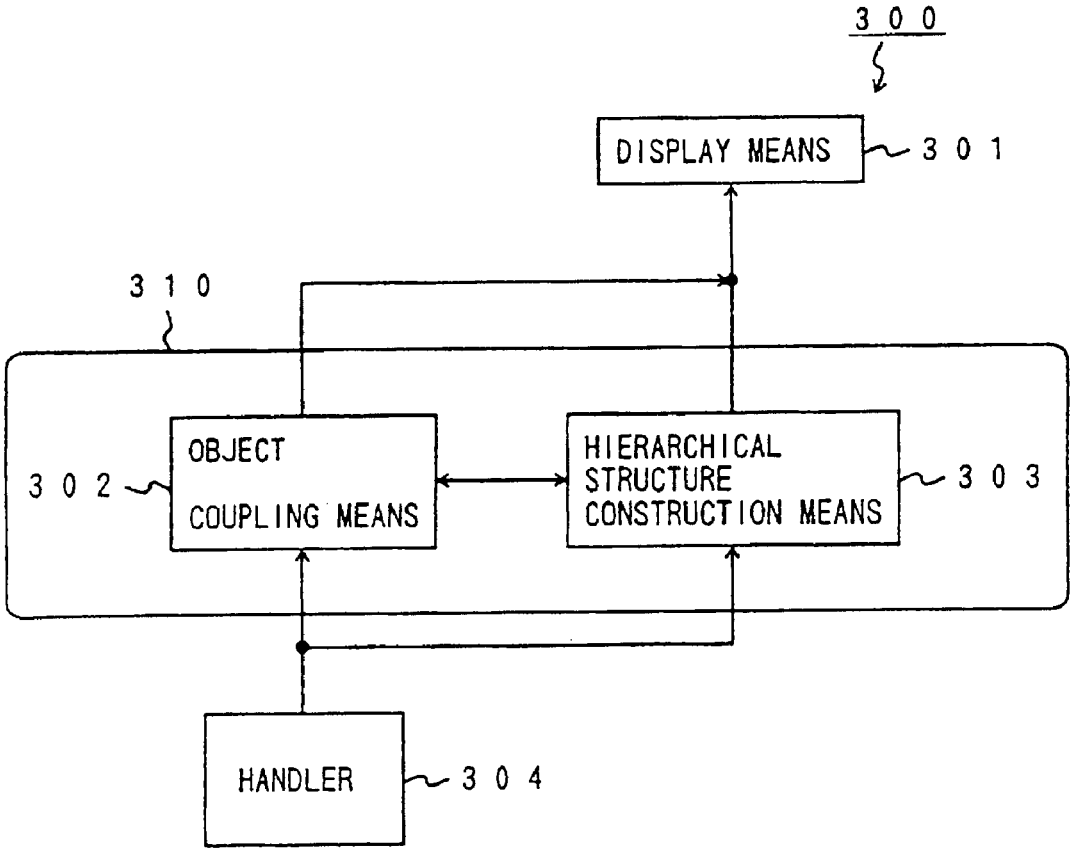
FIG. 64 is a schematic diagram showing a basic structure of an object-oriented programming supporting apparatus and a program storage medium for use in an object-oriented programming according to an embodiment of the present invention.

FIG. 64 is a schematic diagram showing a basic structure of an object-oriented programming supporting apparatus and a program storage medium for use in an object-oriented programming according to an embodiment of the present invention.

An object-oriented programming supporting apparatus 300 supports an object-oriented programming for coupling a plurality of objects each having data and operation with each other in accordance with an instruction. The object-oriented programming supporting apparatus 300 comprises a display means 301, an object coupling means 302, a hierarchical structure construction means 303 and a handler 304.

The display means 301 displays objects each represented by a block representative of a main frame of an object, a data output terminal for transferring data of the object to another object, a data input terminal for receiving data from another object, a message terminal for issuing a message to make a request for processing to another object, and a method terminal for receiving a processing request from another object to execute a method, the object being represented by a hierarchical structure which permits one or a plurality of objects to exist in a single object, and in addition displays a wiring for coupling terminals of a plurality of objects. On the computer system 100 shown in FIG. 1, the display means 301 is constituted of the image display unit 102, a software for displaying the above-mentioned objects and wirings on the display screen 102a of the image display unit 102, and a CPU for executing the software.

The object coupling means 302 constructs a coupling structure among a plurality of objects in accordance with an instruction for coupling terminals of the plurality of objects through a wiring. On the computer system 100 shown in FIG. 1, the object coupling means 302 is constituted of the software for constructing the coupling structure and a CPU for executing the software.

The hierarchical structure construction means 303 constructs a hierarchical structure of objects. On the computer system 100 shown in FIG. 1, the hierarchical structure construction means 303 is constituted of the software for constructing the hierarchical structure and a CPU for executing the software.

The handler 304 instructs a wiring for coupling among objects to the object coupling means 302 in accordance with an operation by an operator (or user), and in addition instructs a position of an object on the hierarchical structure to the hierarchical structure construction means 303. On the computer system 100 shown in FIG. 1, the handler 304 is constituted of the keyboard 103, the mouse 104 and the software for taking in operations of the keyboard 103 and the mouse 104 inside the computer system.

It is noted that the software itself for implementing the object coupling means 302 is also referred to as the object coupling means, and likewise the software itself for implementing the hierarchical structure construction means 303 is also referred to as the hierarchical structure construction means. A program, in which the object coupling means 302 and the hierarchical structure construction means 303 are combined in the form of software, corresponds to the object-oriented programming program referred to in the present invention. The recording medium 310, in which the object-oriented programming program is stored, corresponding to the program storage medium for use in an object-oriented programming referred to in the present invention. In the computer system 100 shown in FIG. 1, the storage unit 105, in which the object-oriented programming program has been stored, corresponds to the program storage medium for use in an object-oriented programming referred to in the present invention. When the object-oriented programming program is stored in the MO 110, the MO 110 also corresponds to the program storage medium for use in an object-oriented programming referred to in the present invention.

Figure 65:
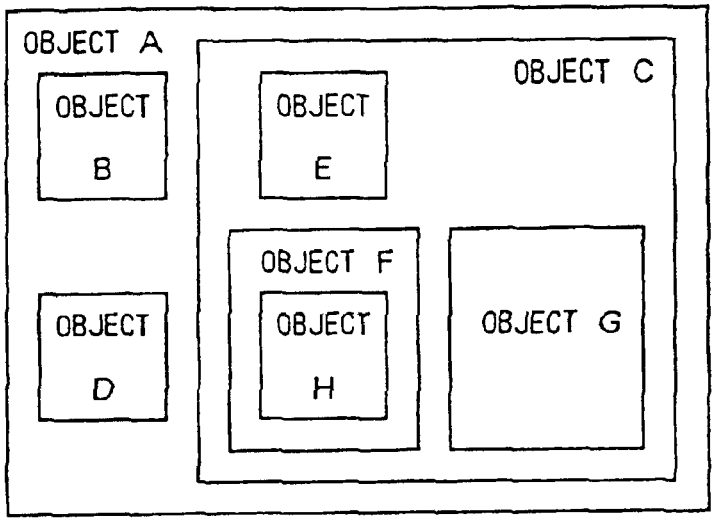
FIG. 65 is a conceptual view showing exemplarily an involving relation among objects.
Figure 66:
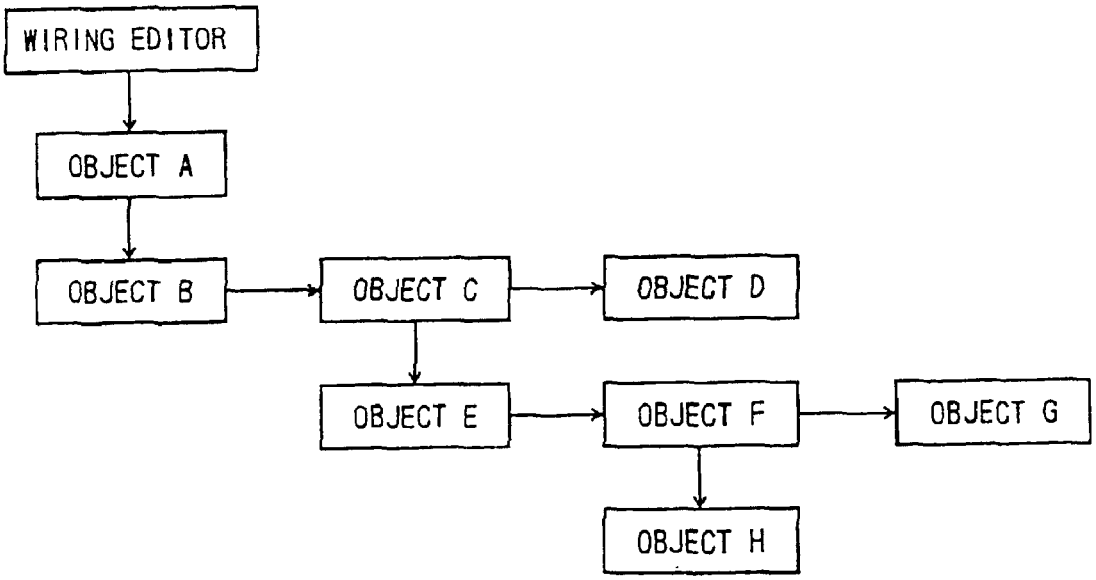
FIG. 66 is a typical illustration showing a connecting relation among objects for defining a hierarchical structure.

FIG. 65 is a conceptual view showing exemplarily an involving relation among objects. FIG. 66 is a typical illustration showing a connecting relation among objects for defining a hierarchical structure.

As shown in FIG. 65, the whole is considered as one object, and this is referred to as an object A. The object A includes three objects, that is, an object B, an object C and an object D. The object C includes an object E, and object F and an object G. The object F includes an object H.

If this is expressed with a hierarchical structure, the expression is given as shown in FIG. 66. The hierarchical structure of objects expressed in this manner is referred to as an "object tree".

In FIG. 66, the objects arranged in a horizontal direction implies that they are disposed to the same-order hierarchy. With respect to the objects connect with each other in a vertical direction, the object disposed at higher-order hierarchy implies a parent object, and the object disposed at lower-order hierarchy implies a child object of the parent object.

Figures 67, 68:
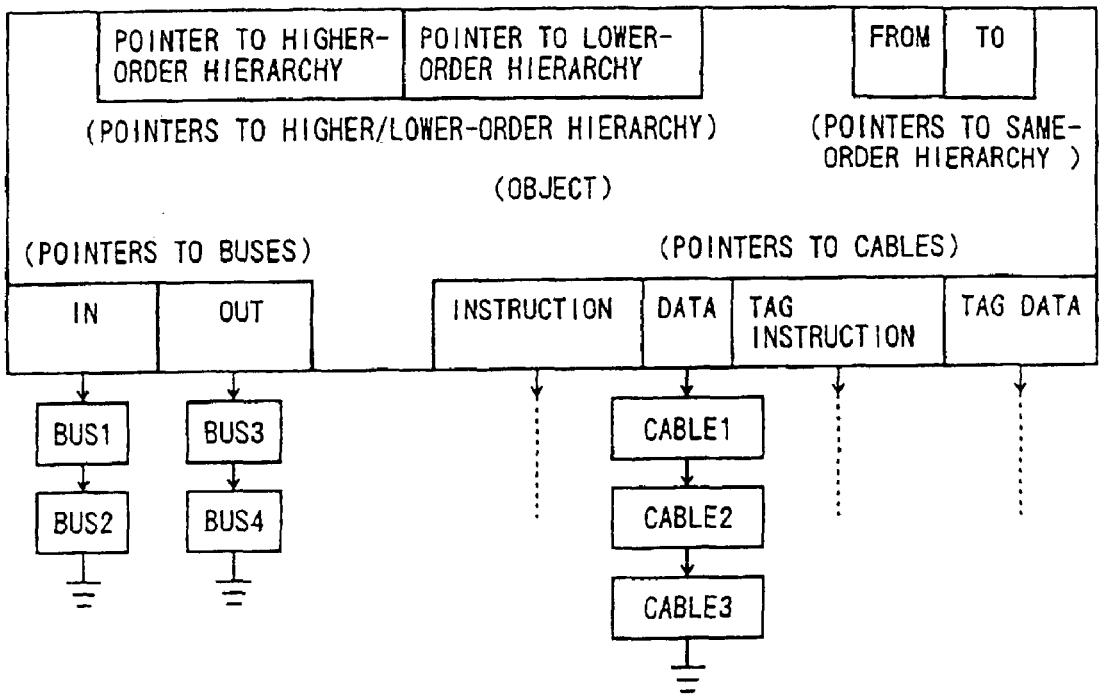
FIG. 67 is a typical illustration showing a pointer for determining a connecting relation of a certain object to another object.
FIG. 68 is a typical illustration showing one of the bus elements constituting the bus element list to be connected to the "pointers to buses" shown in FIG. 67.

FIG. 67 is a typical illustration showing a pointer for determining a connecting relation of a certain object to another object.

Each of the objects has, as pointers for defining a parent-child relationship, "pointers to higher/lower-order hierarchy" comprising a "pointer to higher-order hierarchy" and a "pointer to lower-order hierarchy", and as pointers for connecting objects arranged in the same-order hierarchy, "pointers to same-order hierarchy" comprising two pointers of a "FROM" and a "TO". Further, each of the objects has, pointers for use in wiring representative of a flow of data and instructions among objects, "pointers to buses" comprising two pointers of an "IN" and an "OUT", and "pointers to cables" comprising four pointers of an "instruction", a "data", a "tag instruction" and a "tag data".

The "pointer to higher-order hierarchy" and the "pointer to lower-order hierarchy", which constitute the "pointers to higher/lower-order hierarchy", are, for example, in case of the object A shown in FIG. 66, the pointer to the wiring editor and the pointer to the object B, respectively.

The two pointers of the "FROM" and the "TO", which constitute the "pointers to same-order hierarchy", are, for example, in case of the object C shown in FIG. 66, the pointer to the object B and the pointer to the object D, respectively.

In this manner, there is constructed a hierarchical structure, for example, as shown in FIG. 66, comprising the "pointer to lower-order hierarchy" and the "pointers to same-order hierarchy".

Figure 69:
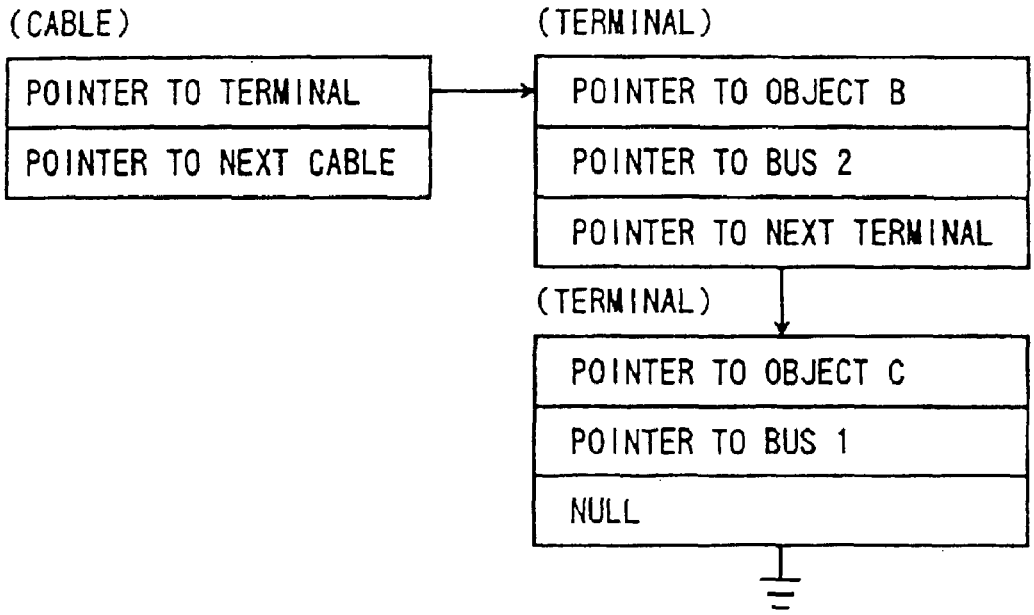
FIG. 69 is a typical illustration showing one of the cable elements constituting the cable element list to be connected to the "pointers to cables" shown in FIG. 67.
Figure 70:
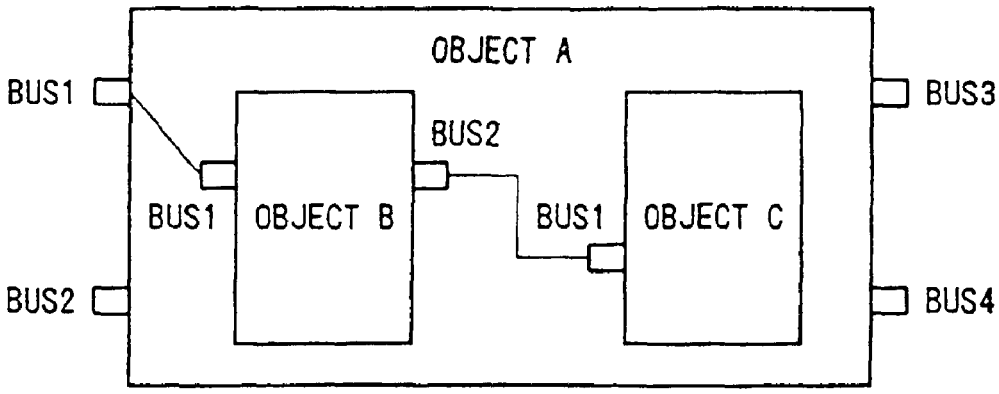
FIG. 70 is a typical illustration showing exemplarily a wiring among objects.

FIG. 68 is a typical illustration showing one of the bus elements constituting the bus element list to be connected to the "pointers to buses" shown in FIG. 67. FIG. 69 is a typical illustration showing one of the cable elements constituting the cable element list to be connected to the "pointers to cables" shown in FIG. 67. FIG. 70 is a typical illustration showing exemplarily a wiring among objects.

Each of the bus elements arranged on the bus element list defines a bus (terminal) to be connected to another object. Each of the cable elements arranged on the cable element list defines a coupling relation (wiring) between terminals of child object-to-child object when the associated object is given as a parent object.

FIG. 67 shows two pointers "IN" and "OUT" as pointers constituting pointers to the bus. Connected to the pointer "IN" is the bus element list defining a bus which feeds data or messages to the object shown in FIG. 67. Connected to the pointer "OUT" is the bus element list defining a bus which outputs data or messages from the object shown in FIG. 67 toward other object.

In FIG. 67, connected to the pointer "IN" is the bus element list comprising two bus elements BUS 1 and BUS 2. Specifically, the bus element BUS 1 is connected to the pointer "IN", and the bus element BUS 2 is connected to the bus element BUS 1. Connected to the pointer "OUT" is the bus element list comprising two bus elements BUS 3 and BUS 4. Specifically, the bus element BUS 3 is connected to the pointer "OUT", and the bus element BUS 4 is connected to the bus element BUS 3.

As shown in FIG. 68, each of the bus elements comprises a "pointer to substantial object", "pointer to bus of substantial object", "pointer to next bus element (BUS)" and "other data". It is noted that a terminal of an object is referred to as a "bus".

In the arrangement shown in FIG. 70, in the event that the object shown in FIG. 67 is object A shown in FIG. 70, the bus element BUS 1 corresponds to, for example, "BUS 1" of the object A shown in FIG. 70, and the "pointer to substantial object" corresponds to a pointer to an object (here object B) connected to BUS 1 of object A, of object B and object C included in object A shown in FIG. 70. The "pointer to bus of substantial object" of the bus element BUS 1 corresponds to a pointer to a bus (in case of FIG. 70, BUS 1 of object B) of object B as the substantial object, which bus is connected to "BUS 1" of the object A. The "pointer to next bus element (BUS)" constituting the bus element BUS 1 corresponds, in case of the bus element BUS 1 in FIG. 67, to a pointer to the bus element BUS 2. The "other data" constituting the bus element BUS 1 includes a distinction as to whether the bus (in this case, "BUS 1" of the object A shown in FIG. 70) associated with the bus element is a bus for transfer of data or a bus for transfer of a message (or instruction). Incidentally, as to an identification between a bus (IN) at the end of receiving data or instruction and a bus (OUT) at the end of transmitting data or instruction, as shown in FIG. 67, it is implemented by separating the "pointers to buses" into "IN" and "OUT".

In FIG. 67, "pointers to cables" comprises four pointers, that is, "instruction", "data", "tag instruction", and "tag data", to each of which a cable element list is connected. FIG. 67 exemplarily shows only a cable element list connected to the "data". Connected to the "data"]is directly a cable element CABLE 1. Connected to the cable element CABLE 1 is a cable element CABLE 2. And connected to the cable element CABLE 2 is a cable element CABLE 3.

The "pointers to cables" is used for management of a connecting state (wiring) of buses of child object-to-child object by a parent object. In the example shown in FIG. 70, the wiring of buses between the object B and the object C is managed. Incidentally, the wiring between the object A as a parent object and the object B as a child object, or the wiring between the parent object A and the object C as a child object is managed, as mentioned above, by the bus element list connected to the "pointers to buses".

The four pointers, that is, "instruction", "data", "tag instruction", and "tag data", which constitute the "pointers to cables", manage a wiring indicative of a flow of messages (instruction), a wiring indicative of a flow of data, a wiring indicative of a flow of an instruction, which is formed dynamically during an execution, as mentioned above, and a wiring indicative of a flow of data, which is formed dynamically during an execution, respectively.

As shown in FIG. 69, a cable element "CABLE" is associated with two terminal elements "TERMINAL". The cable element "CABLE" comprises a pointer to the first terminal element of the two terminal elements "TERMINAL", and a pointer to the next cable element. The terminal element "TERMINAL" comprises a "pointer to an object", a "pointer to a bus of the object", and a "pointer to the next terminal pointer".

FIG. 69 shows exemplarily a cable element for managing a wiring for connecting the bus 2 of the object B with the bus 1 of the object C, shown in FIG. 70, in which the first terminal element stores therein a pointer to an object B and a pointer to a bus 2 of the object B, and the second terminal element stores therein a pointer to an object C and a pointer to a bus 1 of the object C. In this manner, the bus 2 of the object B and the bus 1 of the object C are coupled with each other through the wiring. It is noted that the first terminal element of the two terminal elements is associated with the bus of the output end of data or instruction, and the second terminal element is associated with the bus of the input end of data or instruction.

The cable element shown in FIG. 69 is managed, as mentioned above, by the object A which is a common parent object for both the objects B and C.

The above are the general explanations of a management of pointers for determining a hierarchical structure of objects, a management of pointers for determining buses of objects, and a management of pointers for determining a wiring for connecting buses of objects. Next, there will be explained more specific embodiments of the object-oriented programming supporting apparatuses according to the present invention, and programs for an object-oriented programming, which are stored in a program storage mediums for use in an object-oriented programming according to the present invention.

According to the first object-oriented programming supporting apparatus of the object-oriented programming supporting apparatuses according to the present invention, and programs for an object-oriented programming, which are stored in the first program storage medium for use in an object-oriented programming, of the program storage medium for use in an object-oriented programming according to the present invention, the hierarchical structure construction means 303 shown in FIG. 64 has means for producing a duplicate object of a substantial object designated in accordance with an instruction from the handler 304, and for disposing the duplicate object at a hierarchy different from a hierarchy at which the substantial object is disposed, and the object coupling means 302 receives from the handler 304 an instruction as to a wiring between the duplicate object and another object in the wiring of the hierarchical structure in which the duplicate object is disposed, and constructs a coupling structure in which the duplicate object and the associated substantial object are provided in the form of a united object.

Figure 71:
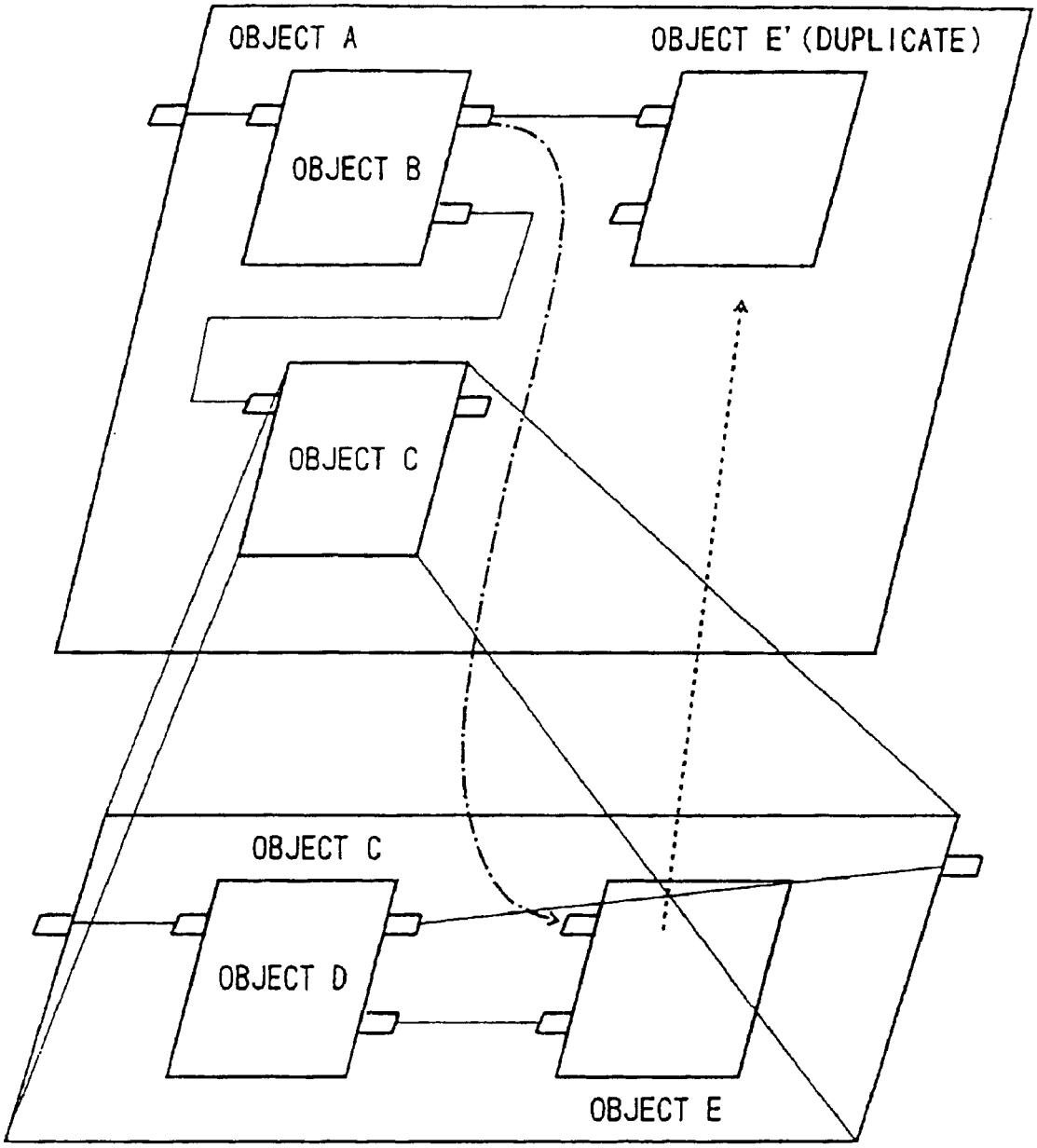
FIG. 71 is a conceptual view of a duplicate object.
Figure 72:
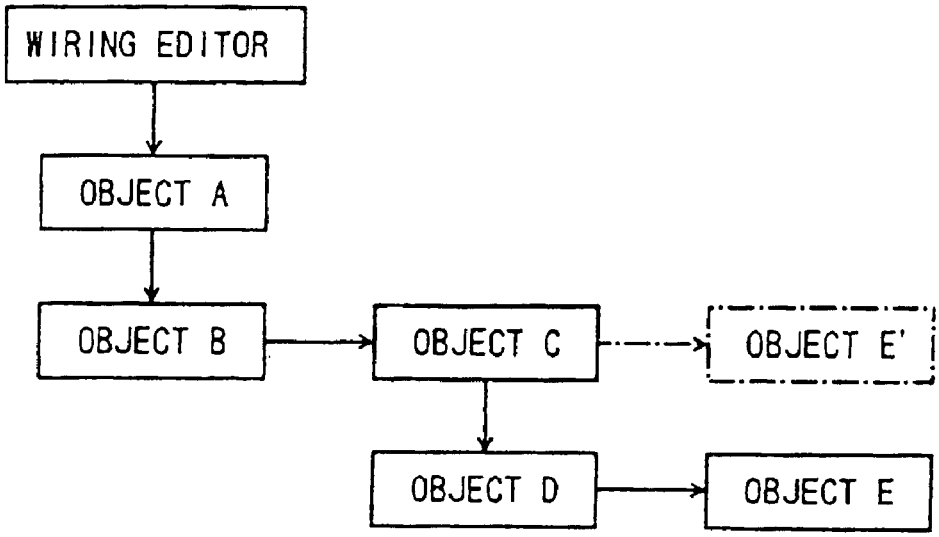
FIG. 72 is a typical illustration showing a hierarchical structure (object tree) of the objects shown in FIG. 71.

FIG. 71 is a conceptual view of a duplicate object. FIG. 72 is a typical illustration showing a hierarchical structure (object tree) of the objects shown in FIG. 71.

An object A is connected to an wiring editor. Connected to the object A is an object B in a lower-order hierarchy. Connected to the object B is an object C in the same-order hierarchy. Connected to the object C is an object D in a lower-order hierarchy. Connected to the object D is an object E in the same-order hierarchy.

In the event that the objects B and E, which are disposed at mutually different hierarchy, are connected with each other through a wiring, it is acceptable that a bus (terminal) is formed on the object C which is a parent object of the object E, and the terminal of the object C is connected to the bus of the object E, and in addition the terminal of the object C is connected to the terminal of the object B. However, this work takes a trouble for wiring. In order to avoid such a trouble, according to the present embodiment, a duplicate object E' of which the substantial object is the object E is disposed at the hierarchy at which the object B and D are disposed, and the bus of the duplicate object E' is connected to the bus of the object B through a wiring on the hierarchy at which the object B and the duplicate object E' are disposed.

Figure 73:
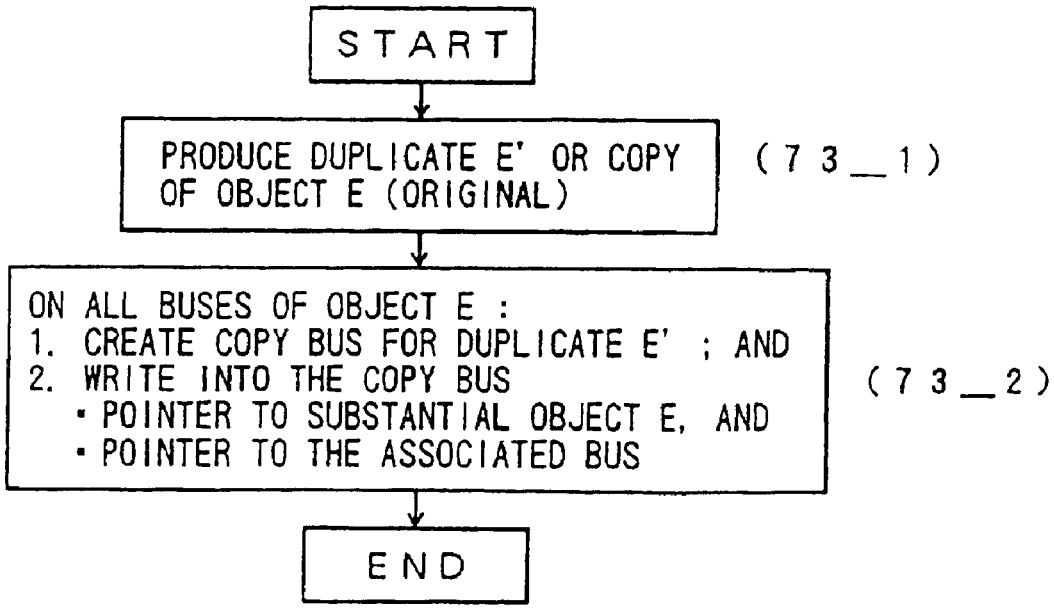
FIG. 73 is a flowchart useful for understanding a building process for the duplicate object.

FIG. 73 is a flowchart useful for understanding a building process for the duplicate object.

First, in step 73_1, with respect to the designated object (e.g. object E), a duplicate object E' is built through copying the object E. Here a wiring among objects is aimed. Thus, there is no need to copy even the substance of the program constituting the object E and only information necessary for a display and a wiring of objects is copied. In this meaning, the "copy" referred to as the present invention means a copy of information necessary for a display and a wiring of objects.

Next, in step 73_2, with respect to all buses of the object E, 1. a copy bus (copy bus element) is created on the duplicate object E', and
2. a pointer to the substantial object E and a pointer to the bus associated with the substantial object E, are written.

Figure 74:
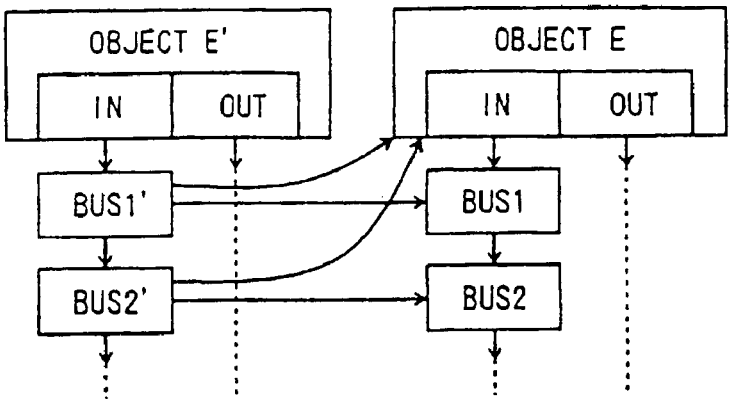
FIG. 74 is a typical illustration showing a connecting relation between the substantial object (original) and the duplicate object (copy)

FIG. 74 is a typical illustration showing a connection relation between the substantial object (original) and the duplicate object (copy).

Copied on the duplicate object E' are the bus elements BUS 1, BUS2, . . . arranged in the "pointers to buses" of the substantial object E in the form of an arrangement as it is. Each of the bus elements BUS 1', BUS 2', . . . of the duplicate object E' copied stores a pointer to the substantial object E and a pointer to the associated bus, of the substantial object E (cf. FIG. 68). After the duplicate object is built in this manner, when a wiring between the object B and the duplicate object E' is instructed, as shown in FIG. 71, the associated cable element and two terminal elements are arranged on the "pointers to cables" of the object A which is a parent object of the object B and the duplicate object E'(cf. FIG. 69).

After a wiring work, and when wiring data for interpreter use, which is stored in the wiring data for interpreter use shown in FIG. 2, is generated, the associated bus element of the substantial object E is found from the bus element list of the duplicate object E' to construct an interobject coupling structure in which the duplicate object E' and the substantial object E are formed in a united body as one object.

Next, there will be explained embodiments of the second object-oriented programming supporting apparatus of the object-oriented programming supporting apparatuses according to the present invention, and programs for an object-oriented programming, which are stored in the second program storage medium for use in an object-oriented programming, of the program storage mediums for use in an object-oriented programming according to the present invention.

According to the second object-oriented programming supporting apparatus of the object-oriented programming supporting apparatuses according to the present invention, and programs for an object-oriented programming, which are stored in the second program storage medium for use in an object-oriented programming, of the program storage mediums for use in an object-oriented programming according to the present invention, the object coupling means 302 shown in FIG. 64 releases a coupling structure of the object before a replacement with another object in accordance with an instruction from the handler 304, and causes the object after the replacement to succeed to the coupling structure of the object before the replacement with another object, and the hierarchical structure construction means 303 disposes the object after the replacement, instead of the object before the replacement, at a hierarchy at which the object before the replacement is disposed.

Figure 75:
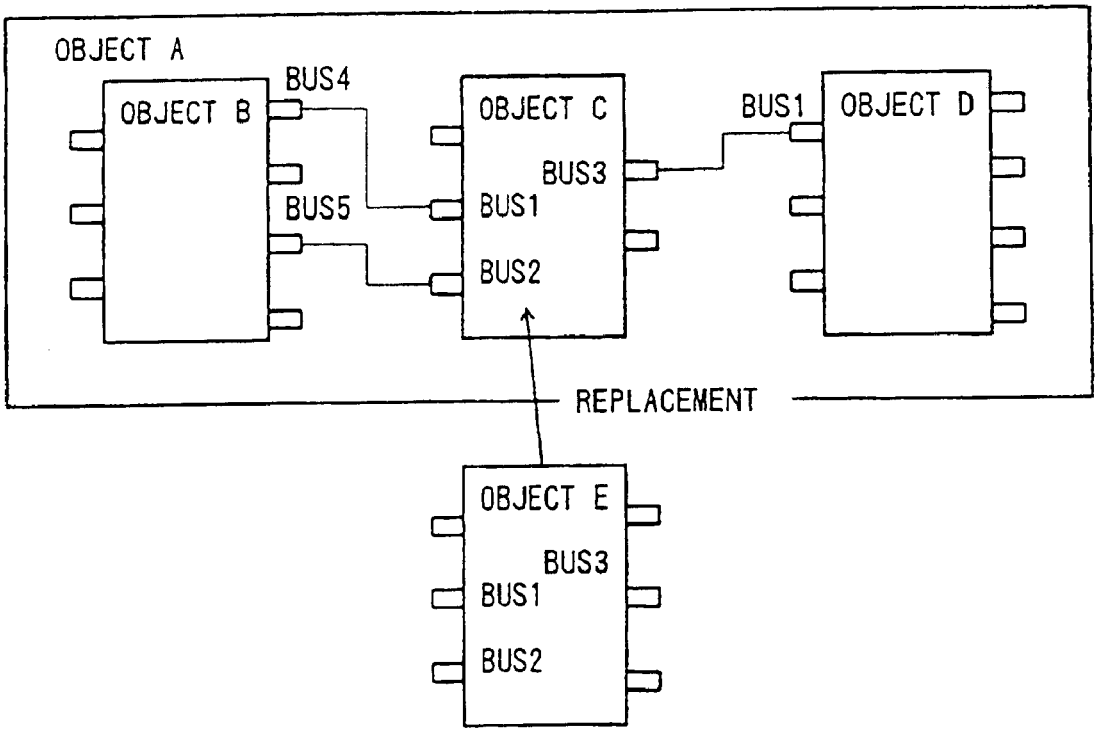
FIG. 75 is a conceptual view showing a coupling relation of objects before a replacement of objects.
Figure 76:
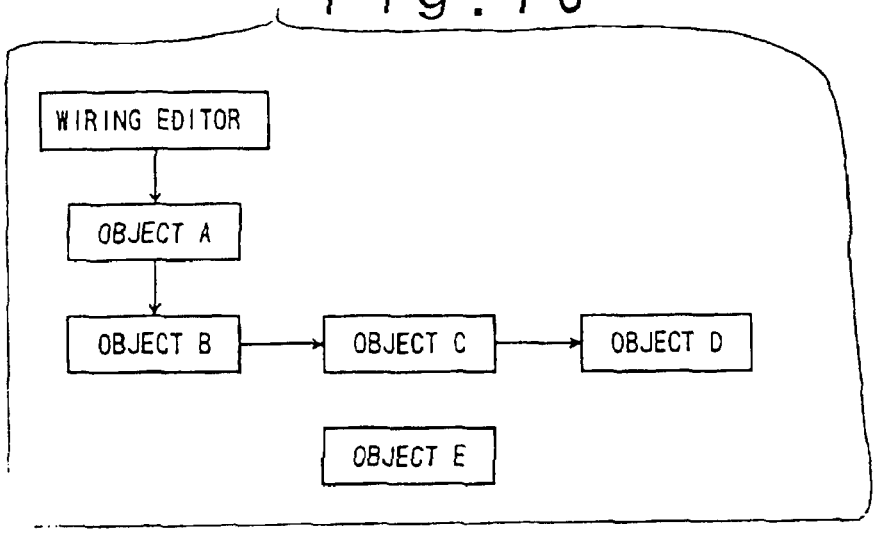
FIG. 76 is a typical illustration shown an object tree concerning the objects shown in FIG. 75.

FIG. 75 is a conceptual view showing a coupling relation of objects before a replacement of objects. FIG. 76 is a typical illustration showing an object tree concerning the objects shown in FIG. 75.

An object A is connected to an wiring editor. Connected to the object A is an object B in a lower-order hierarchy. Connected to the object B is an object C in the same-order hierarchy. Connected to the object C is an object D in the same-order hierarchy. There exists an object E which is not incorporated into the hierarchical structure. The object C is replaced by the object E.

Figure 77:
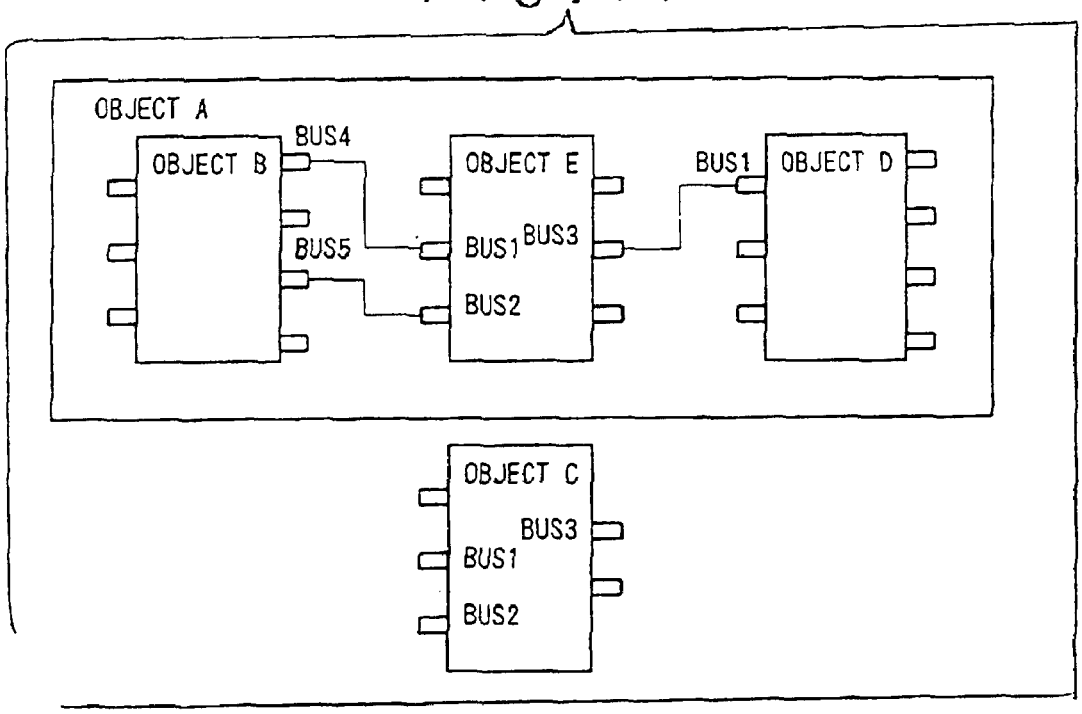
FIG. 77 is a conceptual view showing a coupling relation of objects after a replacement of objects.
Figure 78:
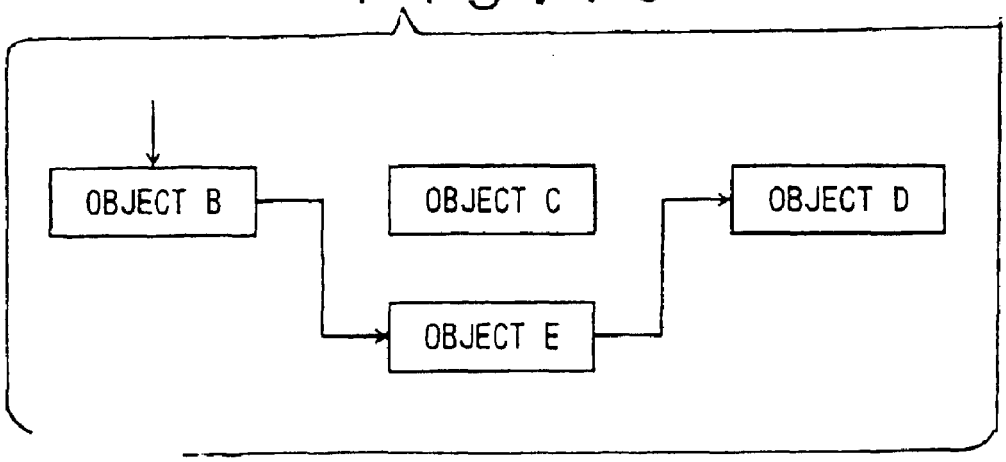
FIG. 78 is a typical illustration showing a part of the object tree after a replacement of objects.

FIG. 77 is a conceptual view showing a coupling relation of objects after a replacement of objects. FIG. 78 is a typical illustration showing a part of the object tree after a replacement of objects.

When the object C is replaced by the object E, the object E succeeds to the wiring of the object C as it is. Also in the hierarchical structure, the object is disposed at the hierarchy at which the object C was disposed.

Figure 79:
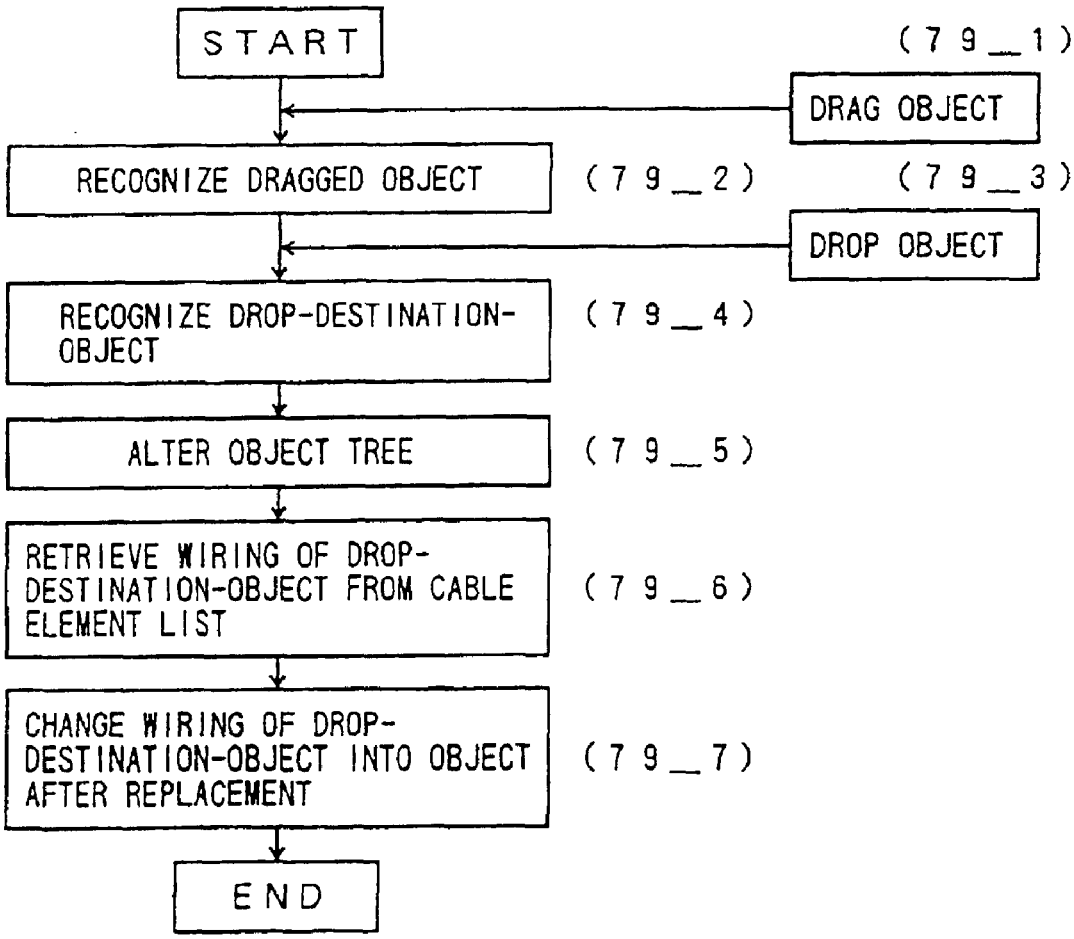
FIG. 79 is a flowchart useful for understanding an object replacing process.

FIG. 79 is a flowchart useful for understanding an object replacing process.

While an interobject network as shown in FIG. 75 is displayed on the display screen 102a (cf. FIG. 1), the mouse 104 is operated to drag an object after replacement (here, the object E) and superimpose the object E on the object C. Where the term "drag" means such an operation that a mouse cursor is placed on the object E displayed on the display screen 102a and a mouse button is depressed, and then a mouse is moved keeping depression of the mouse button. When the the object E is dragged, the object coupling means 302 shown in FIG. 64 identifies that the dragged object is the object E (step 79_2).

When the dragged object E is superimposed on the object C and then dropped, that is, the mouse button is released, in step 79_3, the object coupling means 302 identifies that the object concerned in drop is the object C (step 79_4). In this manner, when it is identified that the dragged object is the object E and the object concerned in drop is the object C, the object tree is altered from the state shown in FIG. 76 to the state shown in FIG. 78.

This change is implemented in which a manner that, of the pointers of the object shown in FIG. 76, the pointer to the object E is written, instead of the pointer to the object C, into "TO" of the object B; the pointer to the object B and the object E are written into "FROM" and "TO" of the object E, respectively; and the pointer to the object E is written, instead of the pointer to the object C, into "FROM" of the object D.

Next, the wiring of the object C concerned in drop is retrieved from the cable element list of the object A which is a parent of the object C concerned in drop (step 79_6).

Figure 80:
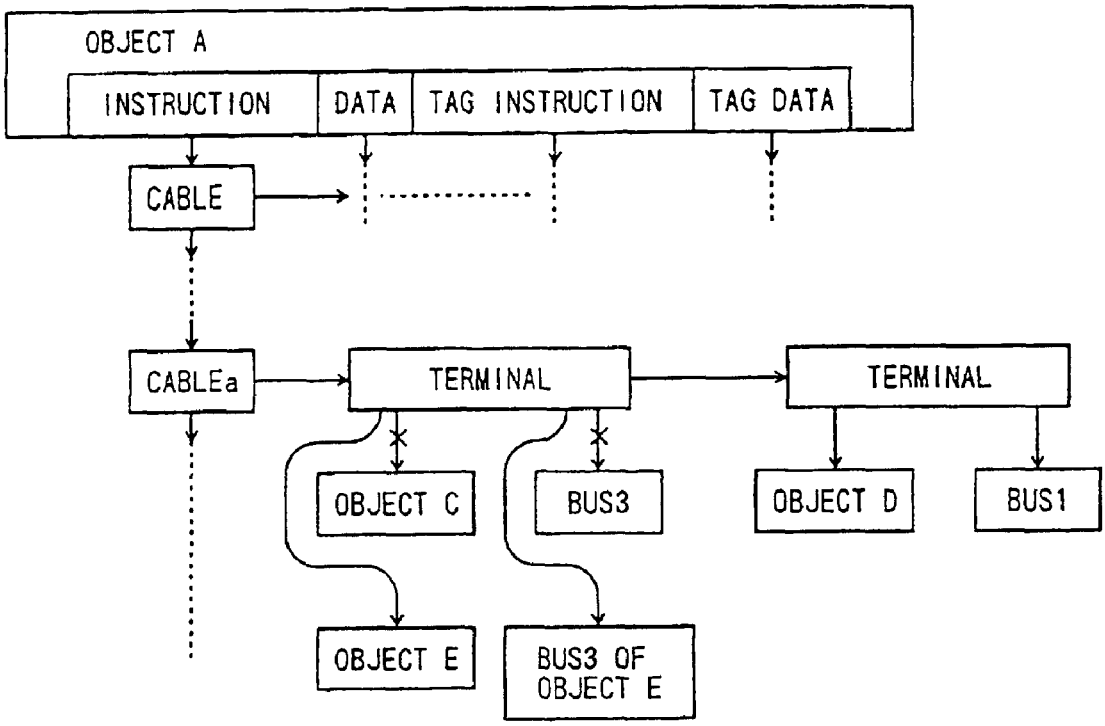
FIG. 80 is a typical illustration showing a part of the cable element list connected to an object A.

FIG. 80 is a typical illustration showing a part of the cable element list connected to an object A.

It is recorded in this part that the bus 3 of the object C and the bus 4 of the object D are connected to the terminals indicated by the cable element CABLEa. In this manner, the cable elements are sequentially retrieved to identify the wiring connected to the object concerned in drop.

When the wiring connected to the object concerned in drop is identified, as shown in FIG. 80, the wiring is released and connected to the associated bus of the object E after replacement (step 79_7). When the associated bus of the object E after replacement does not exist and the wire cannot be altered, it is displayed on the display screen 102a and the wiring is cancelled.

Next, there will be explained embodiments of the third object-oriented programming supporting apparatus of the object-oriented programing supporting apparatuses according to the present invention, and programs for an object-oriented programing, which are stored in the third program storage medium for use in an object-oriented programming, of the program storage mediums for use in an object-oriented programming according to the present invention.

According to the third object-oriented programming supporting apparatus of the object-oriented programming supporting apparatuses according to the present invention, and programs for an object-oriented programming, which are stored in the third program storage medium for use in an object-oriented programming, of the program storage mediums for use in an object-oriented programming according to the present invention, the hierarchical structure construction means 303 is in response to an instruction from the handler 304 such that a plurality of objects from among the objects disposed at a predetermined hierarchy are designated and the plurality of objects are rearranged on the lower-order hierarchy by one stage, and rearranges the plurality of objects on the lower-order hierarchy by one stage, and produces and arranges an object including the plurality of objects on the predetermined hierarchy in such a manner that a coupling structure among the plurality of objects and a coupling structure among the plurality of objects and objects other than the plurality of objects are maintained.

Figure 81:
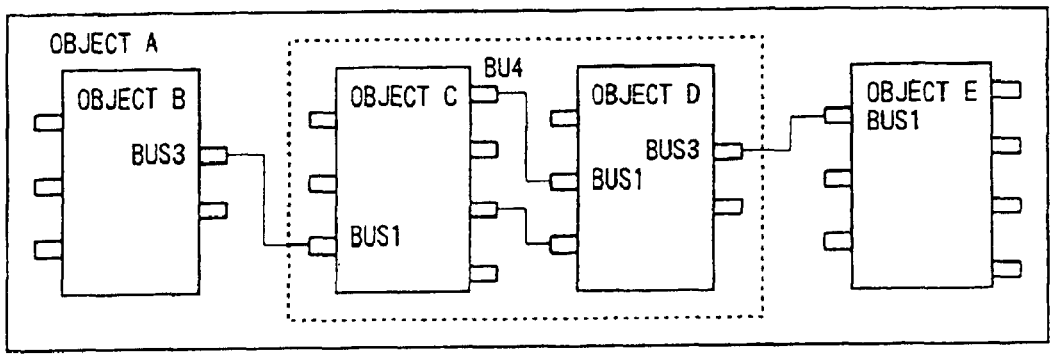
FIG. 81 is a conceptual view showing a coupling relation among objects before a movement of objects.
Figure 82:
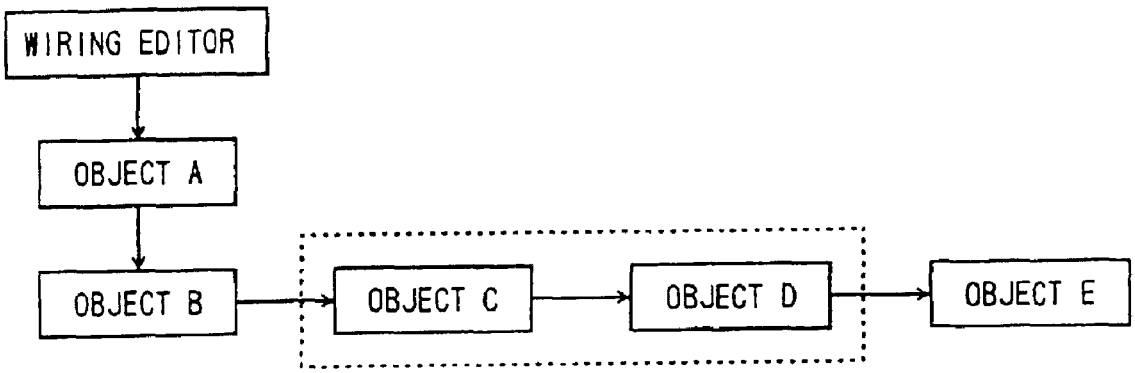
FIG. 82 is a typical illustration showing an object tree concerning the objects shown in FIG. 81.

FIG. 81 is a conceptual view showing a coupling relation among objects before a movement of objects. FIG. 82 is a typical illustration showing an object tree concerning the objects shown in FIG. 81.

As shown in FIG. 82, an object A is connected to an wiring editor. Connected to the object A is an object B in a lower-order hierarchy. Connected to the object B is an object C in the same-order hierarchy. Connected to the object C is an object D in the same-order hierarchy. Connected to the object D is an object E in the same order hierarchy.

It is assumed that the interobject network as shown in FIG. 81 is displayed on the display screen 102a, and the mouse 104 is operated to select the object C and the object D as the objects to be moved to the lower-order hierarchy by one stage.

Figure 83:
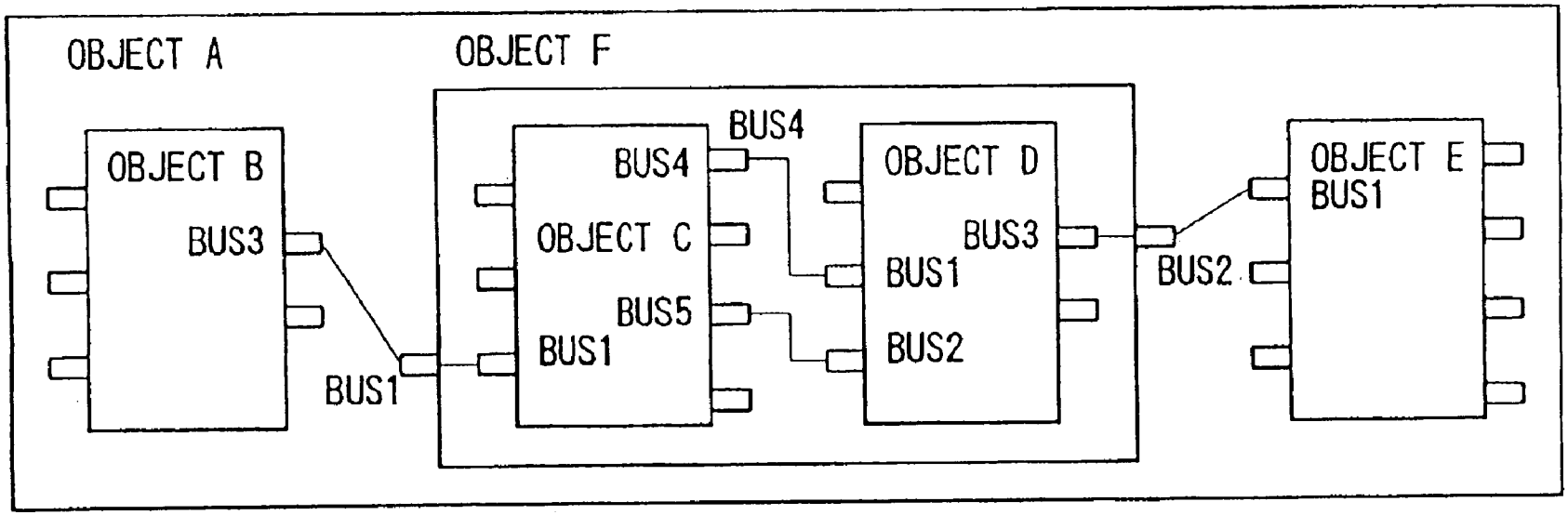
FIG. 83 is a conceptual view showing a coupling relation of objects after a movement of objects.
Figure 84:
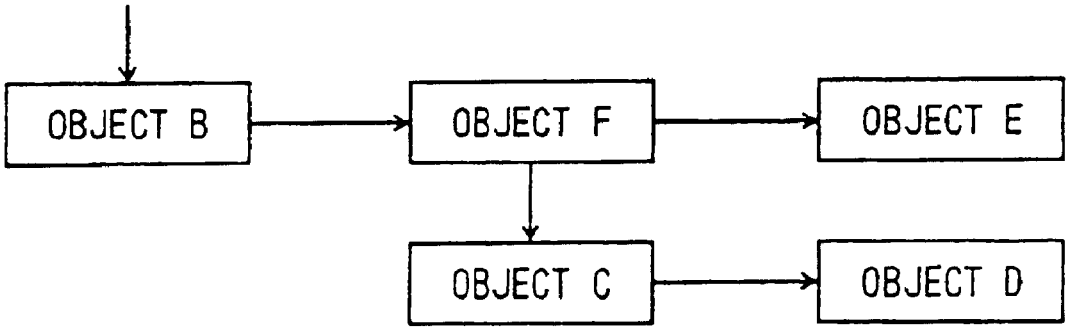
FIG. 84 is a typical illustration showing an object tree concerning the objects shown in FIG. 83.

FIG. 83 is a conceptual view showing a coupling relation of objects after a movement of objects. FIG. 84 is a typical illustration showing an object tree concerning the objects shown in FIG. 83.

An object F is built on the same hierarchy as that of an object B. An object C and an object E are arranged on a lower-order hierarchy of the object F in the form of children objects of which a parent is the object F.

Before a movement, as shown in FIG. 81, the bus 3 of the object B is directly connected to the bus 1 of the object C. After a movement, however, as shown in FIG. 83, the bus 3 of the object B is connected to the bus 1 of the object F, and the bus 1 of the object F is connected to the bus 1 of the object C. And with respect to a connection of the object D with the object E, the bus 3 of the object D is connected to the bus 2 of the object F, and the bus 2 of the object F is connected to the bus 1 of the object E.

Figure 85:
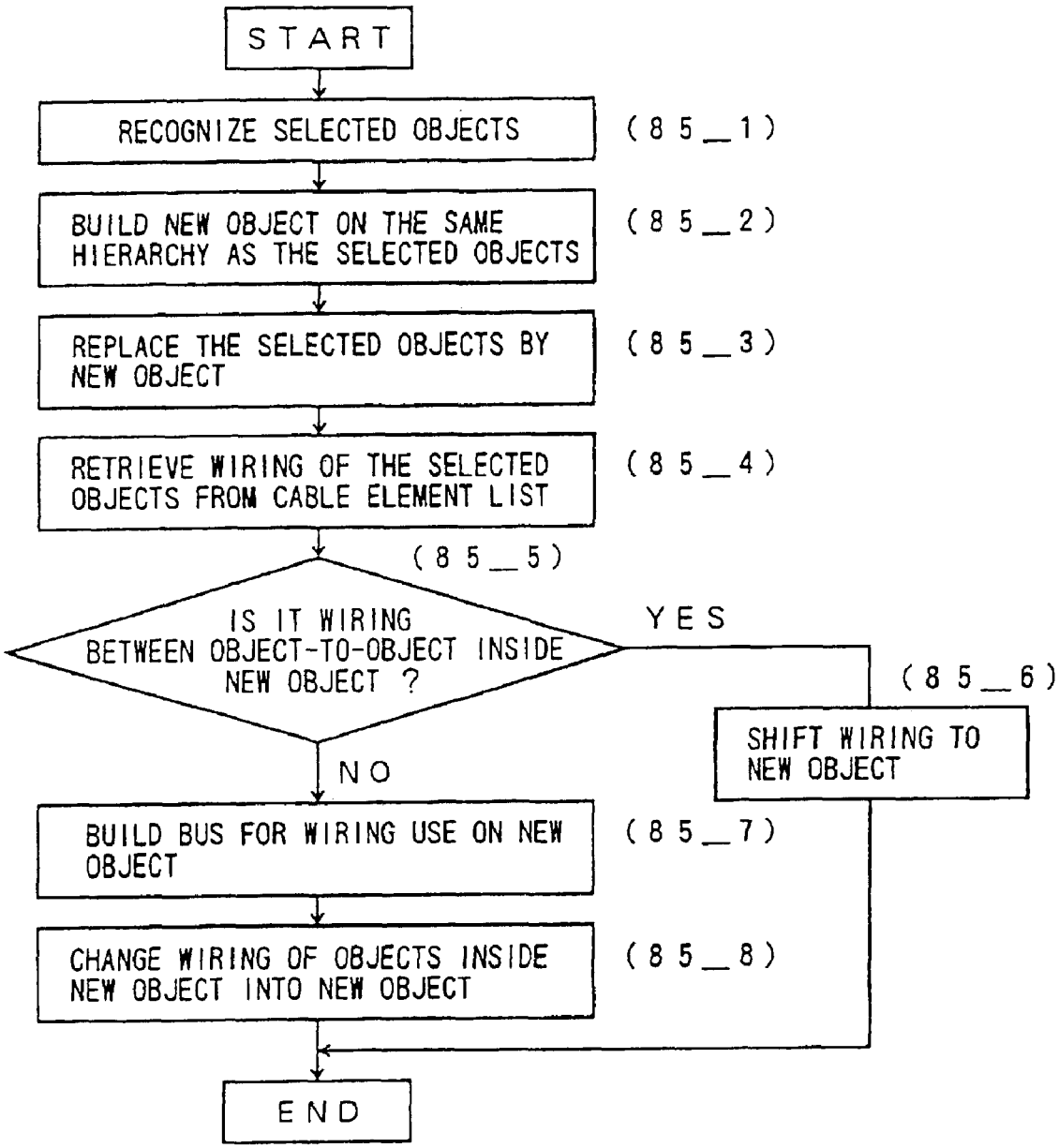
FIG. 85 is a flowchart useful for understanding a processing for a movement of objects and a change of wiring of objects.

FIG. 85 is a flowchart useful for understanding a processing for a movement of objects and a change of wiring of objects.

When the object, which is to be moved to a lower-order hierarchy by one stage, is selected, it is identified as to what objects (here, objects C and D shown in FIG. 82) have been selected (step 85_1). And a new object (here, object F) is built on the same hierarchy as the selected objects (step 85_2). In step 85_3, the selected objects (here, objects C and D) are replaced by the new object (object F).

Figure 86:
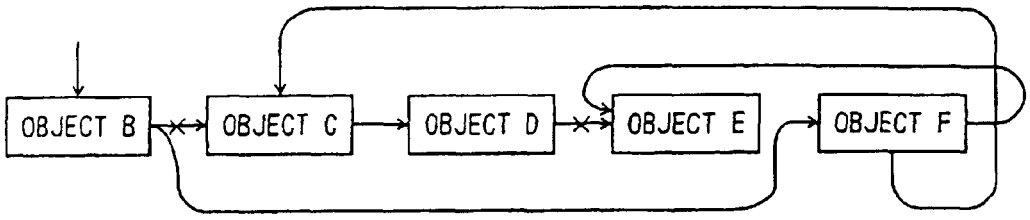
FIG. 86 is a typical illustration showing a state of an alteration of an object tree.

FIG. 86 is a typical illustration showing a state of an alteration of an object tree.

In step 85_2, wherein the object F is built, the connection between the object B and the object C is cancelled, and the object B is connected to the object F in the same-order hierarchy. And the connection between the object D and the object E is cancelled, and the object F is connected to the object E in the same hierarchy. And the object C is connected to the object F in the lower-order hierarchy. In this manner, the object tree after an object movement, as shown in FIG. 84, is completed.

Incidentally, it is noted that the alternation of the pointer for the alternation of the object tree can be performed in a similar fashion to that of the explanation made referring to FIG. 78, and thus the redundant explanation will be omitted.

Next, as shown in step 85_4 of FIG. 85, the wiring connected to the selected objects (objects B and C) is retrieved from the cable element list connected to the parent object (object A) of the selected objects (objects B and C).

Figure 87:
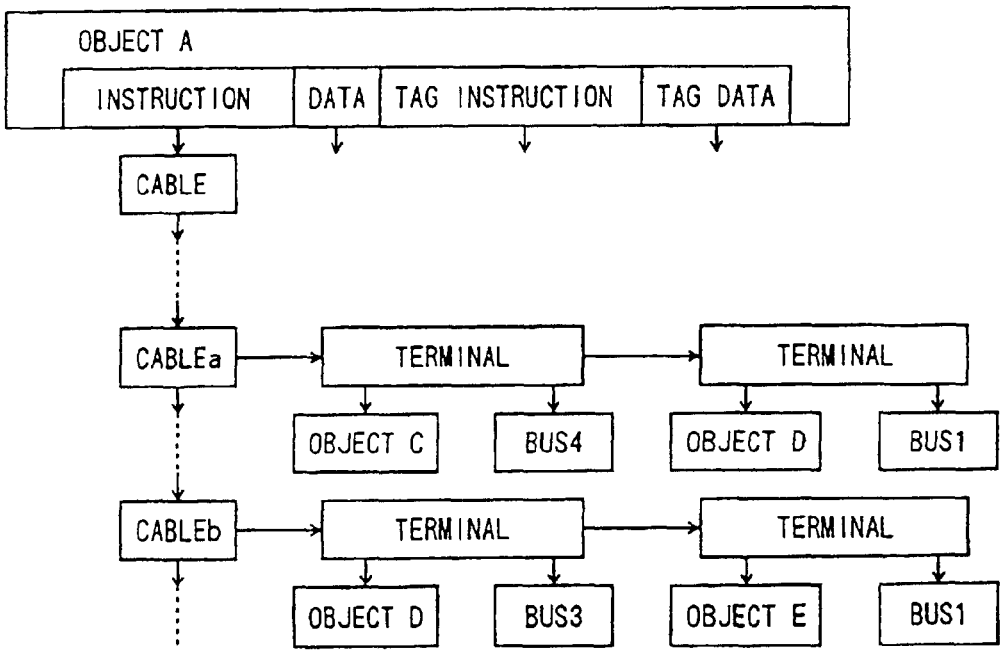
FIG. 87 is a typical illustration showing a part of the cable element list connected to an object A.

FIG. 87 is a typical illustration showing a part of the cable element list connected to the object A.

In FIG. 87, there are shown that the wiring of the bus 4 of the object C and the bus 1 of the object D are made on the cable element CABLEa, and that the wiring of the bus 3 of the object D and the bus 1 of the object E are made on the cable element CABLEb. Here, it is noted that the wiring of the bus 4 of the object C and the bus 1 of the object D shown on the cable element CABLEa is typically representative of the wiring between the objects (objects B and C) selected to be moved to the lower-order hierarchy by one stage, as shown in FIG. 81, and the wiring of the bus 3 of the object D and the bus 1 of the object E shown on the cable element CABLEb is typically representative of the wiring between the object (object D) to be moved to the lower-order hierarchy by one stage and the object (object E) not to be moved and to stay at the same-order hierarchy.

In the step 85_4 of FIG. 85, when the retrieval of the cable element list is carried out as mentioned above, the process goes to step 85_5 in which it is determined whether the wiring connected to the selected objects (here objects B and C) located through the retrieval is the wiring between the objects (objects B and C) inside of the new object (object F), or the wiring between the internal object and the external object with respect to the the new object (object F). In this determination, when it is determined that the wiring of interest is the wiring (corresponding to the wiring of the cable element CABLEa shown in FIG. 87) between the objects inside of the new object (object F), the process goes to step 85_6 in which the wiring is moved from the parent object (object A) to the new object (object F).

Figure 88:
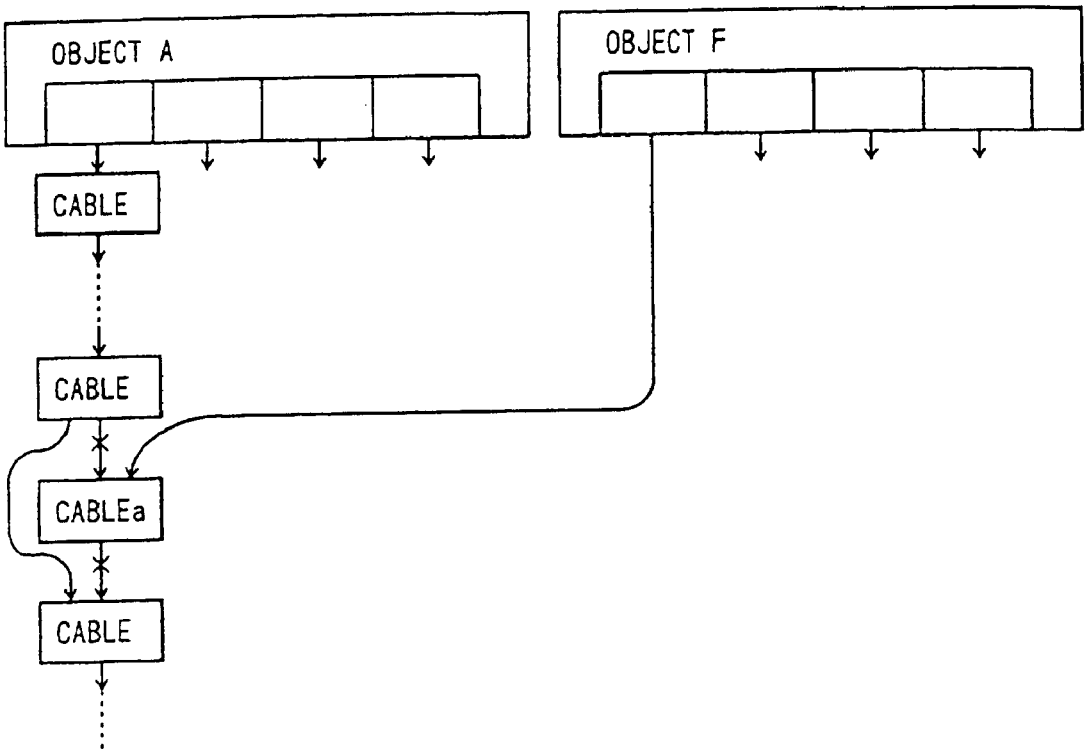
FIG. 88 is an explanatory view useful for understanding a movement of wiring to a new object.

FIG. 88 is an explanatory view useful for understanding a movement of wiring to a new object.

The cable element CABLEa is removed from among the cable element list connected to the object A, and is incorporated into the cable element list connected to the object F.

In the step 85_5 of FIG. 85, when it is determined that the wiring of interest is the wiring (corresponding to the wiring of the cable element CABLEb shown in FIG. 87) between the internal object and the external object with respect to the the new object (object F), the process goes to step 85_7 in which a wiring bus is produced on the new object (object F).

Figure 89:
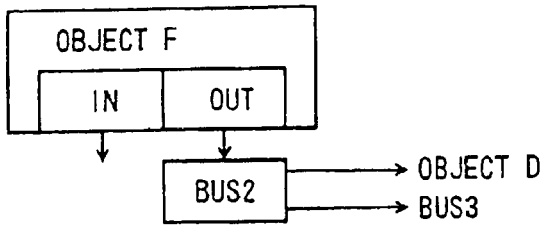
FIG. 89 is a typical illustration of a bus for use in wiring, the bus being built on an object F.

FIG. 89 is a typical illustration of a bus for use in wiring, the bus being built on an object F.

In FIG. 89, a bus element BUS 2 is connected to "OUT" (cf. FIG. 67) of the object F. The bus element BUS 2 corresponds to the bus 2 of the object F shown in FIG. 83, and has a pointer to the object D and a pointer to the bus 3 of the object D. That is, the bus element BUS 2 forms, as shown in FIG. 83, a wiring between the bus 2 of the object F and the bus 3 of the object D. It is to be noted that the bus element BUS 2 shown in FIG. 89 is exemplarily shown, and in case of the wiring shown in FIG. 83, a connecting bus element is disposed also in "IN" of the object F so that a wiring between the bus 1 of the object F and the bus 1 of the object C is implemented.

In step 85_8 of FIG. 85, a wiring connected to the object inside a new object (object F) is changed in connection to the new object (object F).

Figure 90:
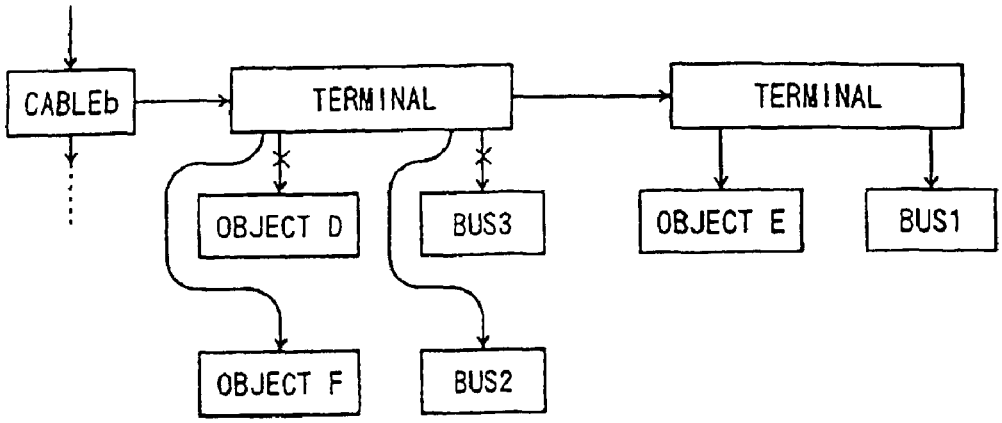
FIG. 90 is a typical illustration showing a state of a change of an object in wiring from an object (object D) inside a new object (object F) to the object F.

FIG. 90 is a typical illustration showing a state of a change of an object in wiring from an object (object D) inside a new object (object F) to the object F.

The cable element CABLEb of the object A shown in FIG. 87 is indicative of a wiring between the bus 3 of the object D inside the object F and a wiring between the bus 1 of the object E outside the object F. As shown in FIG. 90, the bus 3 of the object D is changed to the bus 2 of the object F thereby forming a wiring between the bus 2 of the object F and the bus 1 of the object E.

Incidentally, the step 85_4 in FIG. 85 is repeatedly performed by a necessary number of times.

Next, there will be explained embodiments of the fourth object-oriented programming supporting apparatus of the object-oriented programming supporting apparatuses according to the present invention, and programs for an object-oriented programming, which are stored in the fourth program storage medium for use in an object-oriented programing, of the program storage mediums for use in an object-oriented programming according to the present invention.

According to the fourth object-oriented programming supporting apparatus of the object-oriented programming supporting apparatus according to the present invention, the display means 301 shown in FIG. 64 has, in case of existence of a plurality of method terminals (messages or instructions) connected to one message terminal (a bus for outputting a message or an instruction) designated in accordance with an instruction through the handler 304, means for displaying a list indicative of an execution sequence of a plurality of methods associated with the plurality of method terminals, and the object coupling means 302 has means for reconstructing a coupling structure in which the execution sequence of the plurality of methods appearing at the list displayed on the display means 301 are altered.

Further, according to programs for an object-oriented programming, which are stored in the fourth program storage medium for use in an object-oriented programming, of the program storage mediums for use in an object-oriented programming according to the present invention, the object coupling means 302 has, in case of existence of a plurality of method terminal connected to a designated one message terminal, means for making up a list indicative of an execution sequence of a plurality of methods associated with the plurality of method terminals, and means for reconstructing a coupling structure in which the execution sequence of the plurality of methods are altered in accordance with an alteration instruction of the execution sequence of the plurality of methods appearing at the list.

Figure 91:
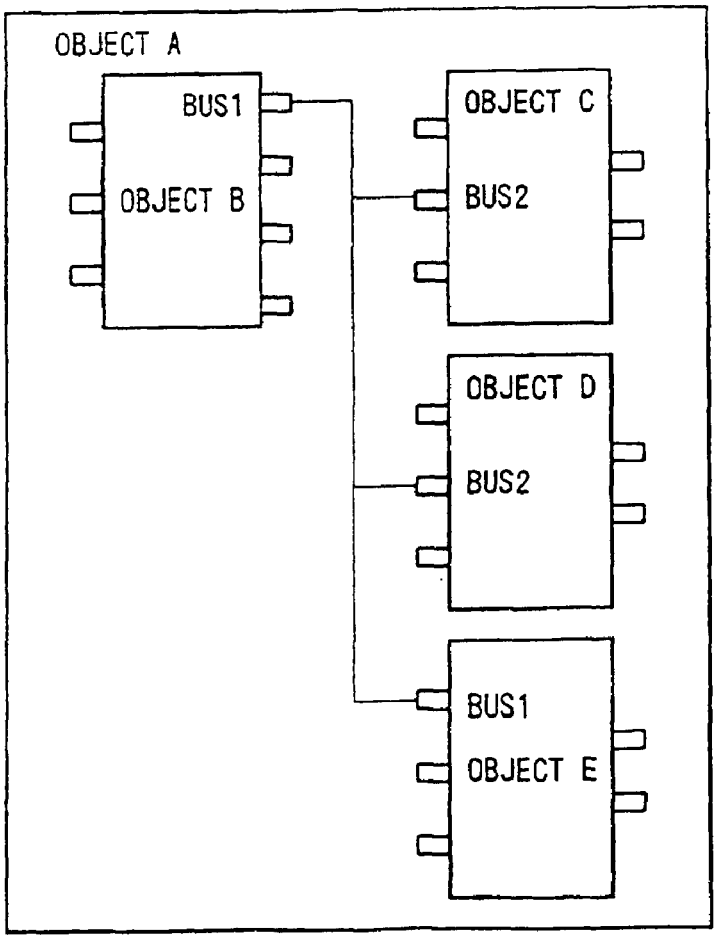
FIG. 91 is a typical illustration showing exemplarily a wiring among objects.
Figure 92:
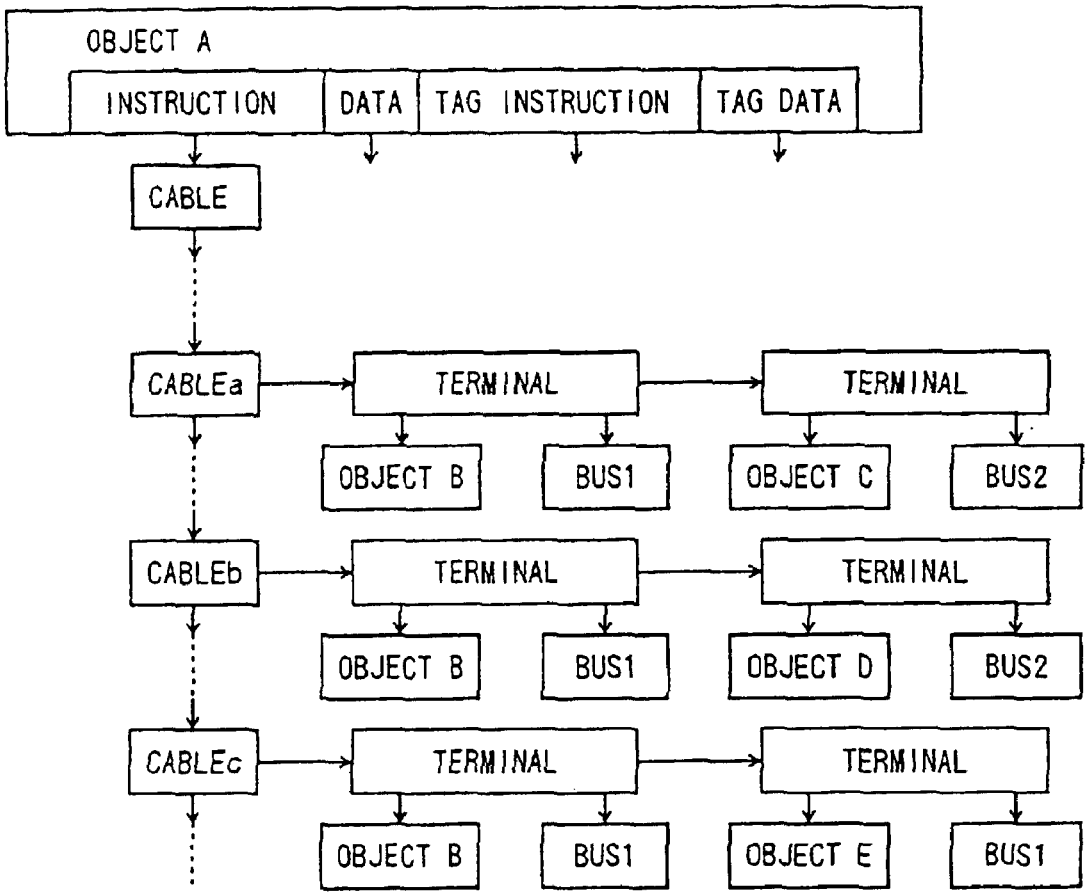
FIG. 92 is a typical illustration showing a cable element list giving a definition of the wiring shown in FIG. 91.

FIG. 91 is a typical illustration showing exemplarily a wiring among objects. FIG. 92 is a typical illustration showing a cable element list giving a definition of the wiring shown in FIG. 91.

According to the example shown in FIG. 91, an object A includes an object B, an object C, an object D and an object E. A bus 1 of the object B is connected to a bus 2 of the object C, a bus 2 of the object D and a bus 1 of the object E. Where the bus 1 of the object B serves as a bus (message terminal) for outputting an instruction, and each of the bus 2 of the object C, the bus 2 of the object D and the bus 1 of the object E serves as a bus (method terminal) for receiving an instruction.

A wiring among these elements is defined, as shown in FIG. 92, by a cable element list connected to the object A (parent object). A number of cable elements are listed on the cable element list shown in FIG. 92. Of those cable elements, a cable element CABLEa defines a wiring between the bus 1 of the object B and the bus 2 of the object C, a cable element CABLEb defines a wiring between the bus 1 of the object B and the bus 2 of the object D, and a cable element CABLEc defines a wiring between the bus 1 of the object B and the bus 1 of the object E.

An instruction (message) outputted from the object B is transmitted to three objects C, D and E in each of which the associated method is executed. In this case, however, it happens that a problem as to an execution sequence among those methods is raised. For example, assuming that the object B serves as an object for inputting data from the exterior, the object C serves as an object for performing an arithmetic operation based on the data inputted, the object D serves as an object for making a graph based on a result of the operation, and the object E serves as an object for displaying the graph, there is a need to execute the respective methods in the order named of the object C, the object D and the object E in accordance with an instruction indicative of that inputting of the data from the object B is completed.

Here, the wiring shown in FIG. 91 is unclear as to the execution sequence, and consequently, the execution sequence is displayed in the following manner and if necessary the execution sequence is altered.

Figure 93:
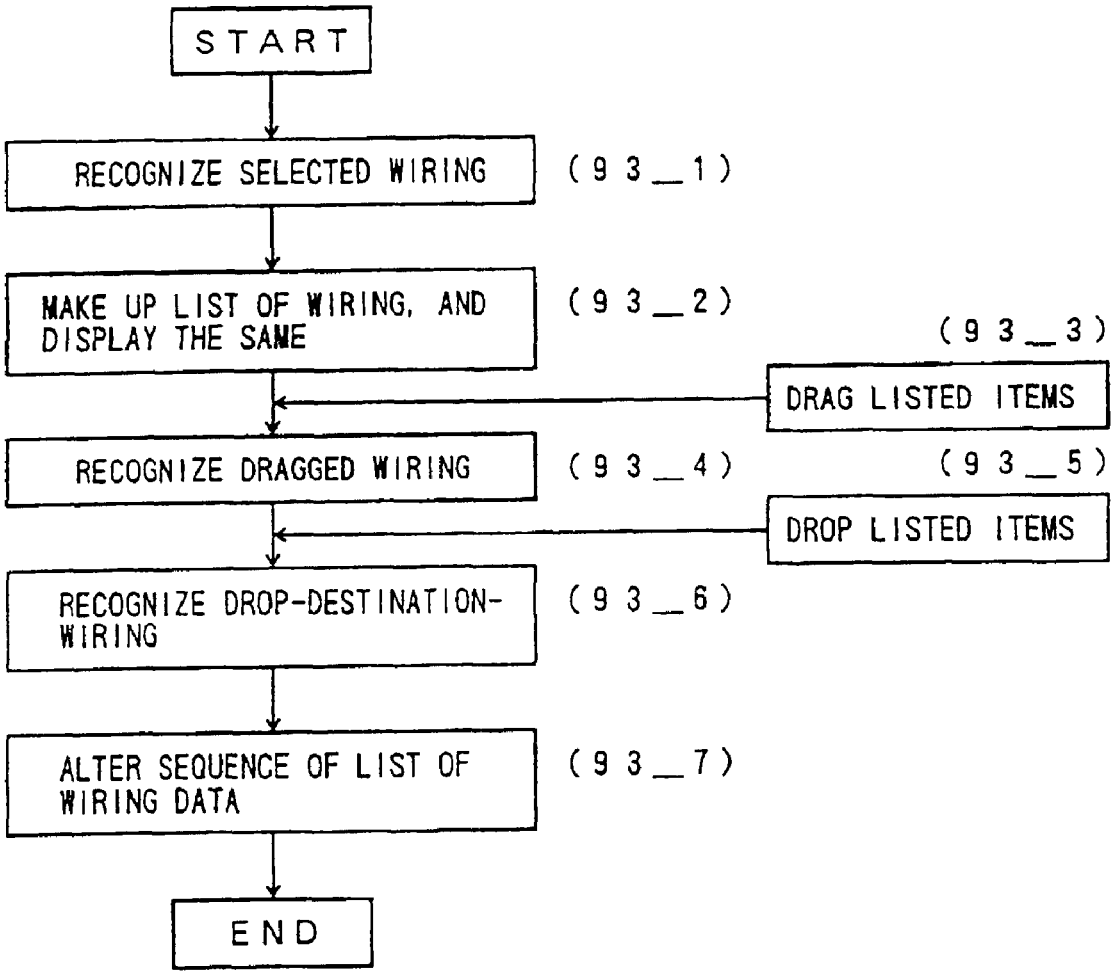
FIG. 93 is a flowchart useful for understanding processings for a display of an execution sequence for methods and an alteration of the execution sequence for the methods.

FIG. 93 is a flowchart useful for understanding processings for a display of an execution sequence for methods and for an alteration of the execution sequence for the methods.

First, for example, while an image as shown in FIG. 91 is displayed, a desired wiring (here, the wiring shown in FIG. 91) is clicked through the mouse 104 to select the wiring of interest. In step 93_1, the object coupling means 302 identifies the selected wiring. In step 93_2, a cable list as to the selected wiring (cable) thus identified is made up and displayed.

Figures 94, 95:
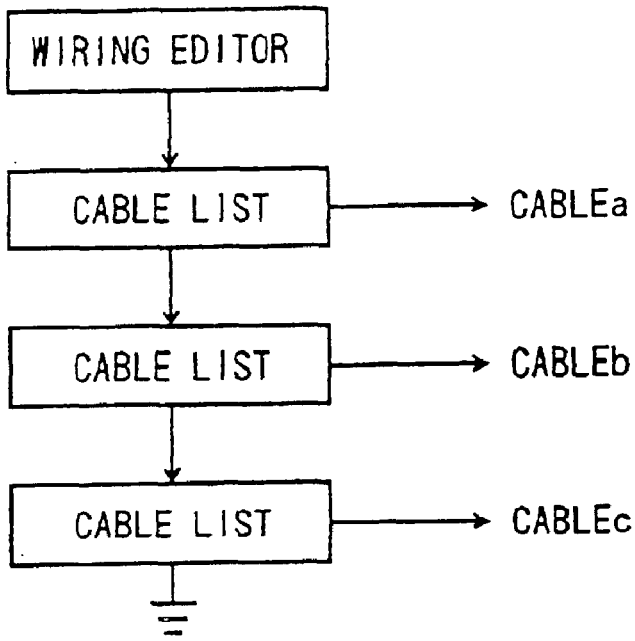

FIG. 94 is a typical illustration showing a cable list element list.

When the cable list is made up, a cable element list of the parent object (object A) shown in FIG. 92 is retrieved, the cable elements CABLEa, CABLEb and CABLEc, which constitute the selected wiring, are identified, and pointers to cable elements are stored in cable list elements constituting the cable list element list shown in FIG. 94 in the order listed in the able element list. That is, in case of the present example, the pointers to three cable elements CABLEa, CABLEb and CABLEc, which constitute the selected wiring, shown in FIG. 92, are stored in the order named in the respective associated cable list elements arranged in the cable list element list shown in FIG. 94.

FIG. 95 is a view exemplarily showing a cable list displayed on a display screen 102a.

When the cable list element list as shown in FIG. 94 is made up, a state of the respective wiring for coupling two objects with each other is displayed with an arrangement according to the order listed in the cable list element list. Specifically, according to the example shown in FIG. 95, it is displayed on the first line that the bus 1 of the object B is connected to the bus 2 of the object C; it is displayed on the second line that the bus 1 of the object B is connected to the bus 2 of the object D; and it is displayed on the third line that the bus 1 of the object B is connected to the bus 1 of the object E. Where the line is referred to as a "list item". The left side of the cable list denote a bus of the end for generating an message (instruction), and the right side of the cable list denotes a bus of the end for receiving and executing the message (instruction) generated. In the practical operation, when the bus 1 of the object B issues the associated message (instruction), the receptive methods are executed in accordance with the sequence shown in the cable list.

In step 93_3 in FIG. 93, it is assumed that a line of list item indicated in the display list is dragged. Here it is assumed that the list item "object B: bus 1 object E bus 1" appearing on the third line of the cable list shown in FIG. 95. In step 93_4, the object coupling means 302 (cf. FIG. 64) identifies that a wiring for connecting the bus 1 of the object B to the bus 1 of the object E, that is, the wiring defined by the cable element CABLEc shown in FIG. 92 is dragged. In step 93_5, the dragged list item is dropped. Where it is assumed that the dragged list item is dropped on the second list item "object B: bus 1 object D: bus 2" of the cable list shown in FIG. 95. In step 93_6, the object coupling means 302 identifies that the wiring concerned in drop is a wiring for connecting the bus 1 of the object B to the bus 2 of the object D, that is, the wiring defined by the cable element CABLEb shown in FIG. 92.

Thus, when the dragged wiring and the wiring concerned in drop are identified, an arrangement sequence or the execution sequence is altered in such a manner that the dragged wiring is arranged before the wiring concerned in drop on the cable list shown in FIG. 95 (step 93_7).

Figure 96:
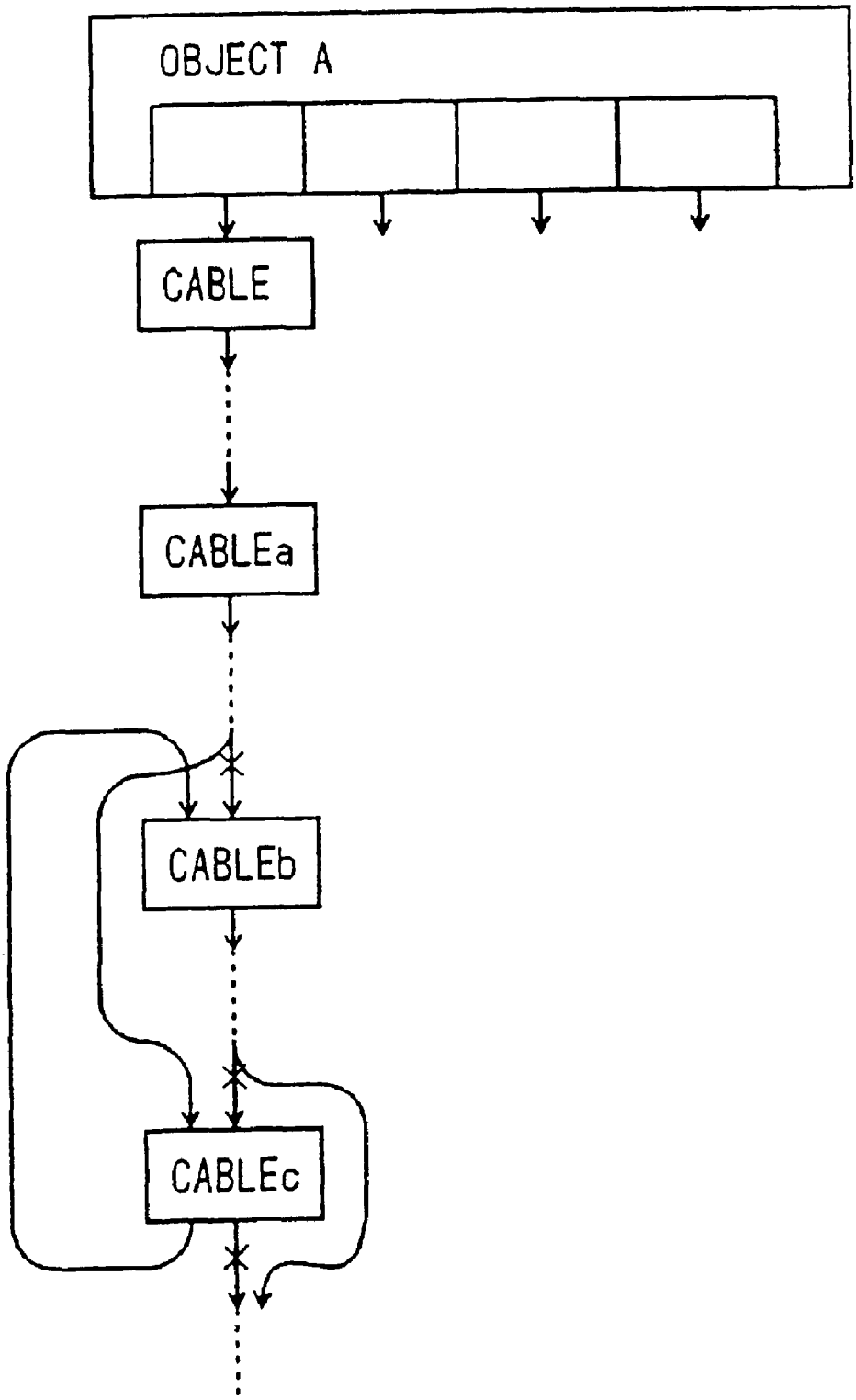
FIG. 96 is a typical illustration showing a state in which an arrangement sequence of the cable elements arranged on the cable element list is altered.
Figure 97:
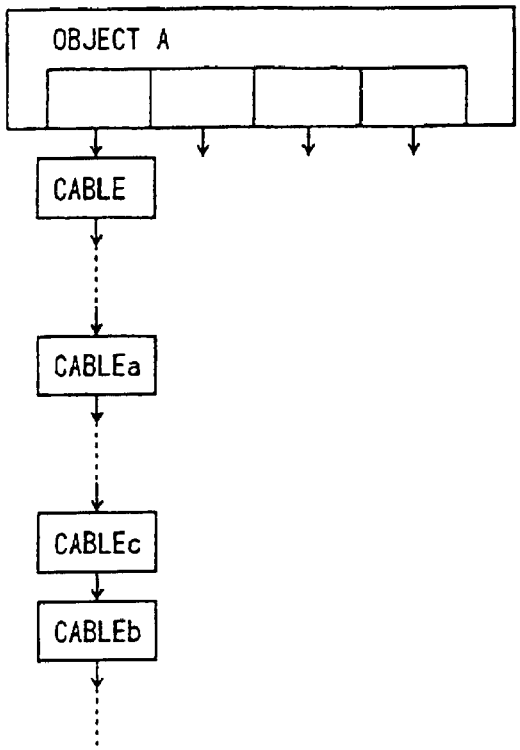
FIG. 97 is a typical illustration showing a cable element list in which an arrangement sequence of the cable elements has been altered.

FIG. 96 is a typical illustration showing a state in which an arrangement sequence of the cable element arranged on the cable element list is altered. FIG. 97 is a typical illustration showing a cable element list in which an arrangement sequence of the cable elements has been altered.

As shown in FIG. 69, each of the cable elements CABLE has a pointer to the next cable element. Thus, when the drag and drop operations for the list item are performed in the manner as mentioned above, the pointer is rewritten. In this example, as shown in FIG. 96, an arrangement sequence of the cable elements is altered in such a manner that the cable element CABLEc is arranged before the cable element CABLEb, and thus the cable element list, in which the cable elements are arranged as shown in FIG. 97, is made up.

Figure 98:
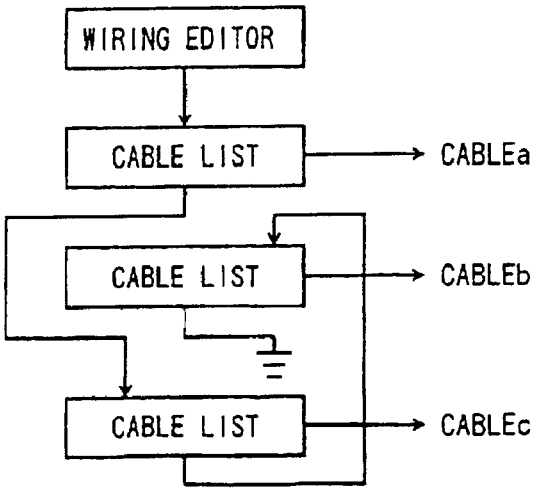
FIG. 98 is a typical illustration showing a state in which an arrangement sequence of the cable list elements arranged on the cable list element list is altered.
Figures 99, 100:
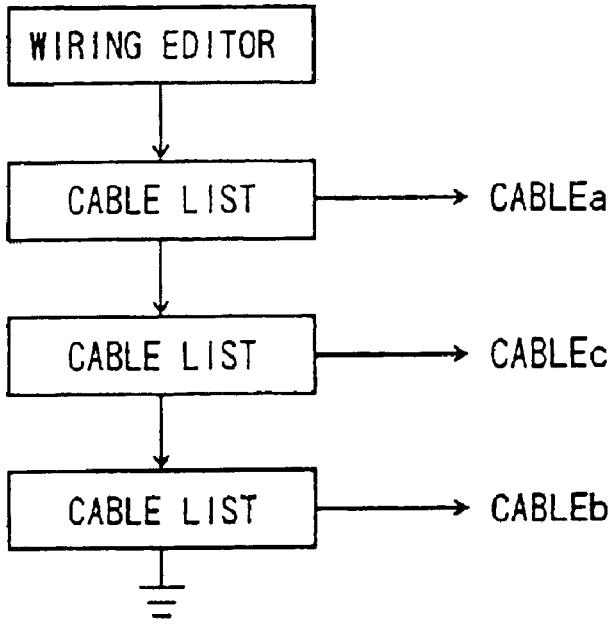
FIG. 99 is a typical illustration showing a cable list element list in which an arrangement sequence of the cable list elements has been altered.
FIG. 100 is a view showing a cable list in which an arrangement sequence has been altered.

FIG. 98 is a typical illustration showing a state in which an arrangement sequence of the cable list elements arranged on the cable list element list is altered. FIG. 99 is a typical illustration showing a cable list element list in which an arrangement sequence of the cable list elements has been altered.

When the drag and drop operations for the list item are performed in the manner as mentioned above, an arrangement sequence of the cable elements, in which the cable elements are arranged in the cable element list as shown in FIG. 96, is altered. Following this, an arrangement sequence of the cable list elements, in which the cable list elements are arranged in the cable list element list as shown in FIG. 98, is altered. According to this example, an arrangement sequence of the cable list elements is altered in such a manner that the cable list element storing therein the pointer to the cable element CABLEc is arranged before the cable list element storing therein the pointer to the cable element CABLEb, so that the cable list element list shown in FIG. 99 is made up.

FIG. 100 is a view showing a cable list in which an arrangement sequence has been altered.

As a result of alterations of the arrangement sequences of the cable elements and the cable list elements as mentioned above, the cable list for a display is also altered in a sequence of the list item, as shown in FIG. 100.

The above is an explanation of the embodiments of the interobject wiring editor unit 122 and its periphery. Next, there will be explained an explanation of the embodiments of the object builder unit 121 and its periphery.

The object ware programming system aims to perform an efficient programming through replacing programs by objects. For this reason, it is very important as to whether the existing software can be readily replaced by an object. Particularly, if it is possible to directly replace the existing software by an object, the number of the available objects is dramatically increased all at once, and as a result, a program development efficiency is extremely improved. Hitherto, there have been proposed several types of methods in which the existing software is replaced by an object. An OLE and a DDE in Windows are raised by way of example. However, according to those methods, it is needed to estimate before-hand at the existing software end that the existing software is replaced by an object. And thus, it is difficult to replace all of the existing softwares by objects. Further, even if the associated exiting softwares are concerned, many of those softwares are involved in one which is very few in number of messages to be acceptable as compared with, for example, that of the graphical user interface. Accordingly, it is impossible to handle the existing softwares in a similar fashion to that of the graphical user interface.

With respect to a continuous operation for the existing softwares, hitherto, there is known a method in which a description is performed by the shell script. However, according to the earlier technolgy, it is difficult to perform an operation for the software after the actuation in a similar fashion to that of the graphical user interface. Further, with respect to the description of the shell script, it must be performed by a user self and thus it will be difficult for a beginner user poor in experience of a programming to do so.

In view of the problems on building the objects as mentioned above, the embodiments, which will be described hereinafter, relate to a scheme of replacing the existing software by an object independently of types of the exiting software, and a component which serves as an object in combination with the existing software. Here, there will be described, with the existing software having the graphical user interface as a main software, a scheme of replacing the exists software by an object, and a component which serves as an object in combination with the existing software.

A corresponding relation between the component described hereinafter and the present invention is as follows.

When the component, which will be described hereinafter, is stored in the storage unit 105 of the computer system 100 shown in FIG. 1, the storage unit 105 storing the component corresponds to one example of the component storage medium referred to in the present invention. In a case where the component is stored in the MO 110 shown in FIG. 1, the MO 110 storing the component corresponds to an alternative example of the component storage medium referred to in the present invention.

Figure 101:
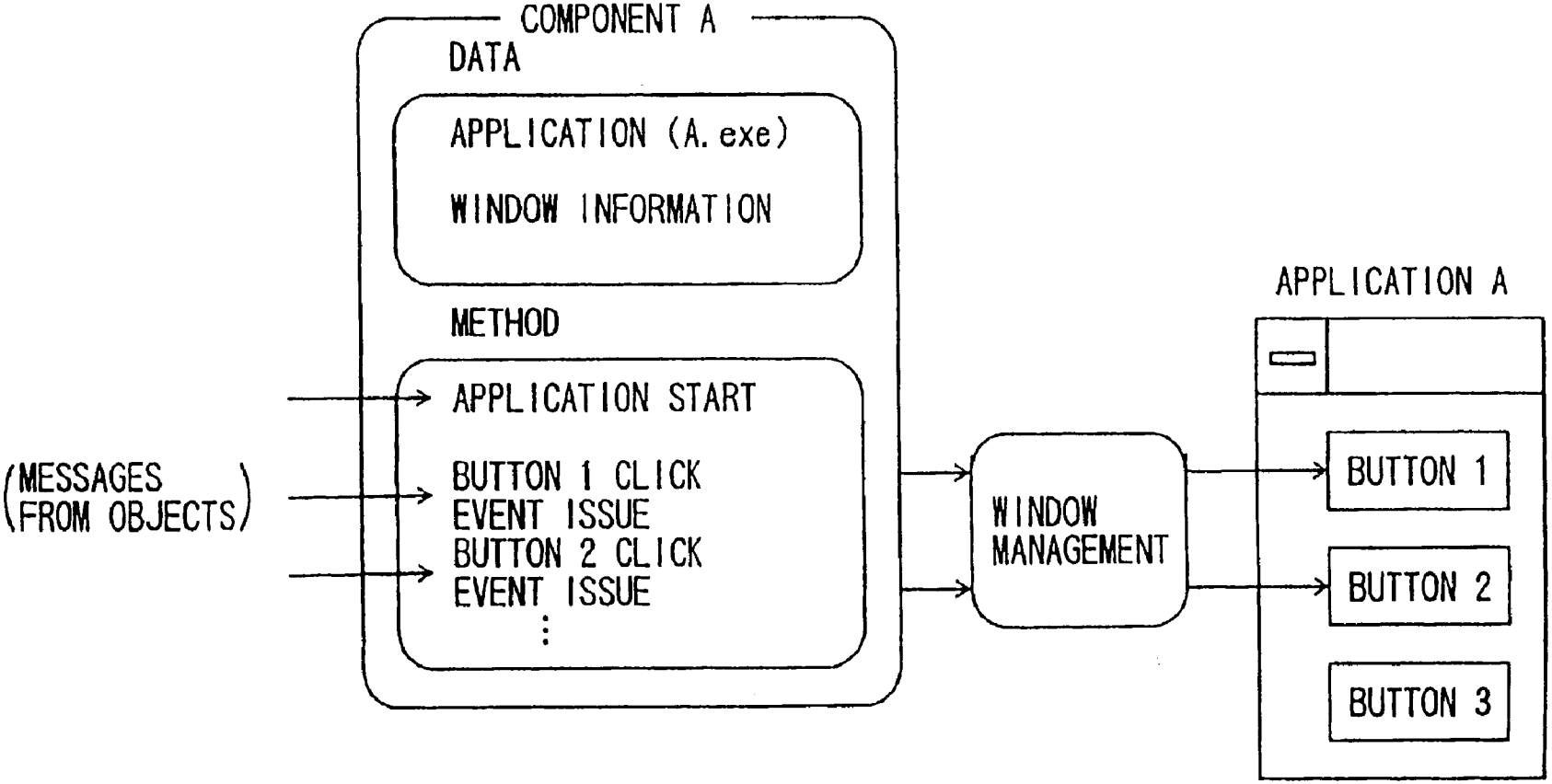
FIG. 101 is a typical illustration showing an embodiment of a component "including" an existing software having a graphical user interface.

FIG. 101 is a typical illustration showing an embodiment of a component "including" an existing software having a graphical user interface.

In FIG. 101, an application A is an existing software in which while icons such as "button 1", "button 2", and "button 3" are displayed on the display screen 102a (cf. FIG. 1), anyone of those icons is clicked through an operation of the mouse so that a processing associated with the clicked icon is executed.

A window management unit manages a graphical user interface of all appellations incorporated into the system, including the application A. For instance, if it is a Windows, the window management unit denotes a Windows system itself. A component A "including" the application A has a basic structure as an object, for connecting with other objects, and in addition data related to the application A. The component A has further as a method an application drive program and a window event generation program (e.g. a button 1 click event issue program for executing the equivalence to such a matter that a user clicks the button 1 through an operation of the mouse 104). When a message is transmitted from another object to an application A drive method of the component A, the method is executed to drive the application A so that information (e.g. ID information and the like) related to the window is read and the component A maintains the window information.

Further, when a message is transmitted from another object (or one's own self) to a method which issues an event such as a button click or the like, the associated event is issued through the window management unit to the window of the application A in accordance with the event issue program described in the method which received the message.

In this case, it is possible to replace the existing application by an object by means of simply adding the component A, maintaining the existing application A as it is.

Figure 102:
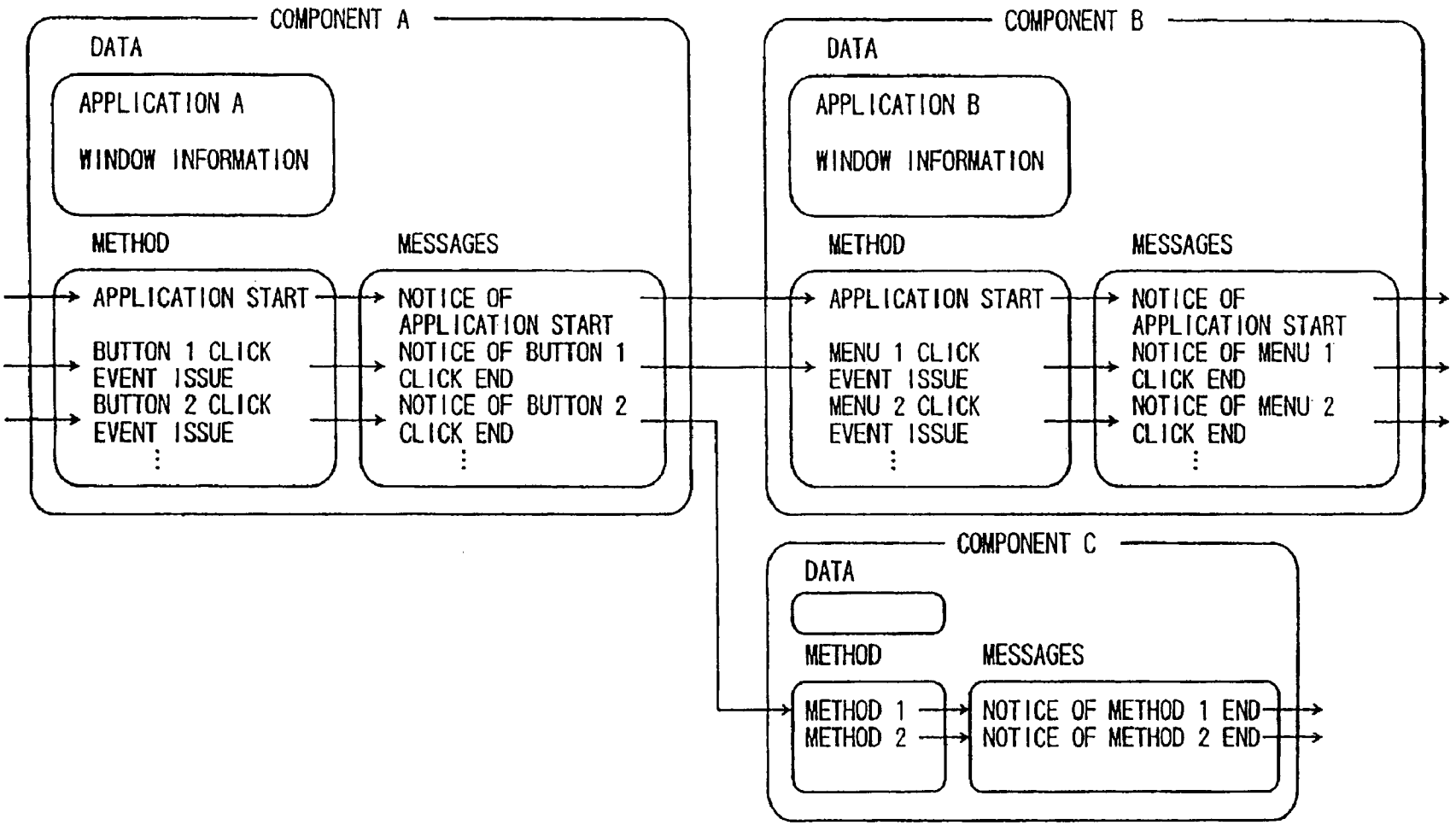
FIG. 102 is a typical illustration showing an alternative embodiment of a component "including" an existing software having a graphical user interface.

FIG. 102 is a typical illustration showing an alternative embodiment of a component "including" an existing software having a graphical user interface.

In the embodiment explained referring to FIG. 101, added to the last of the event generation program for the existing application A, the existing software and the like is a program for issuing a message to inform other object of that an execution of the method is finished. The message thus issued is connected to a method of other component or other object. Thus it is possible to execute a plurality of methods on a chain basis. In FIG. 102, the existing software is omitted, and there is shown the state that the messages of the component A are connected to the methods of the components B and C.

Figure 103:
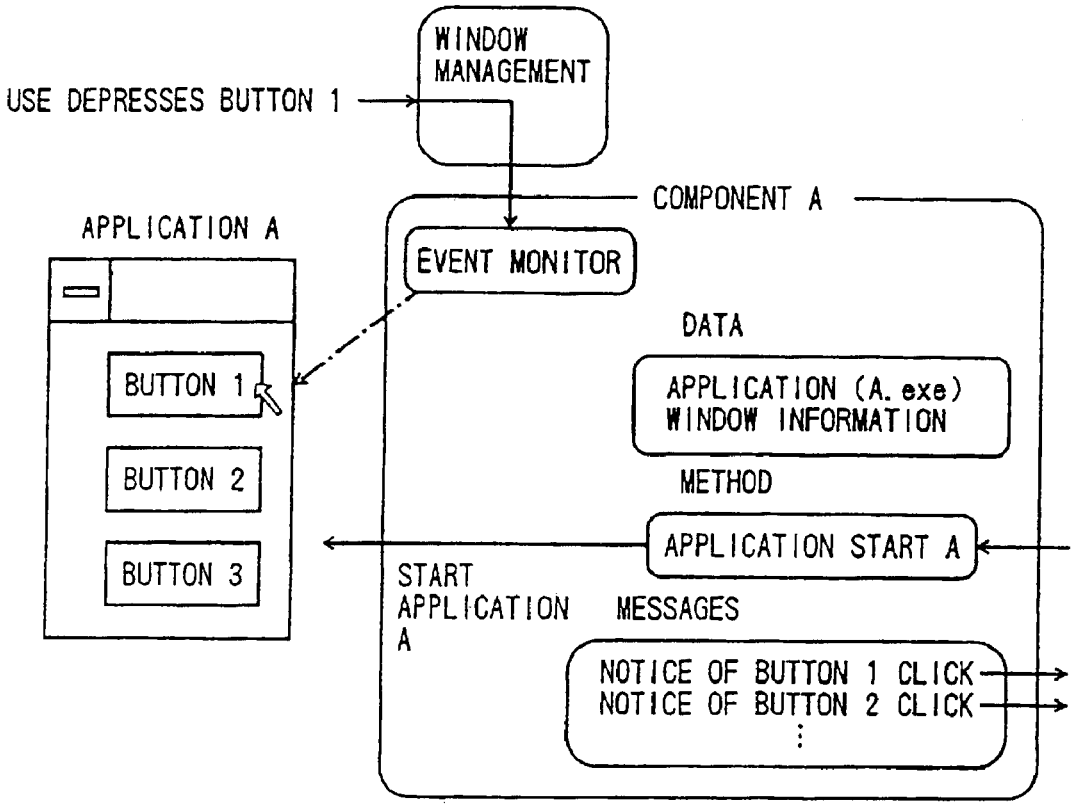
FIG. 103 is a typical illustration showing a further alternative embodiment of a component "including" an existing software having a graphical user interface.

FIG. 103 is a typical illustration showing a further alternative embodiment of a component including an existing software having a graphical user interface.

The component shown in FIG. 103 is an example of a component having such a function that events for the existing software are monitored and when a predetermined event is issued, the associated message is issued.

When a method for driving an application A of a component A being an exiting software receives a message, the method is executed to drive the application A. The component A has a function to monitor all window events and investigates as to whether the issued event is involved in the application A. When it is identified that the issued event is involved in the application A, the component A issues a message for informing another object (or one's own self) of the fact that the event was issued for the application A. For example, when the icon "button 1" of three icons "button 1", "button 2" and "button 3" related to the application A, which are displayed on the display screen 102a, is clicked through an operation of the mouse 104 by a user, the component A identifies that the icon "button 1" of the application A was clicked, and issues a message for informing that the button 1 was clicked.

In this manner, it is possible, upon receipt of an issue of the event of an existing software, to execute on a cooperative basis a method which does not appear on a specification of the existing software, without adding advanced functions to the existing software.

Figure 104:
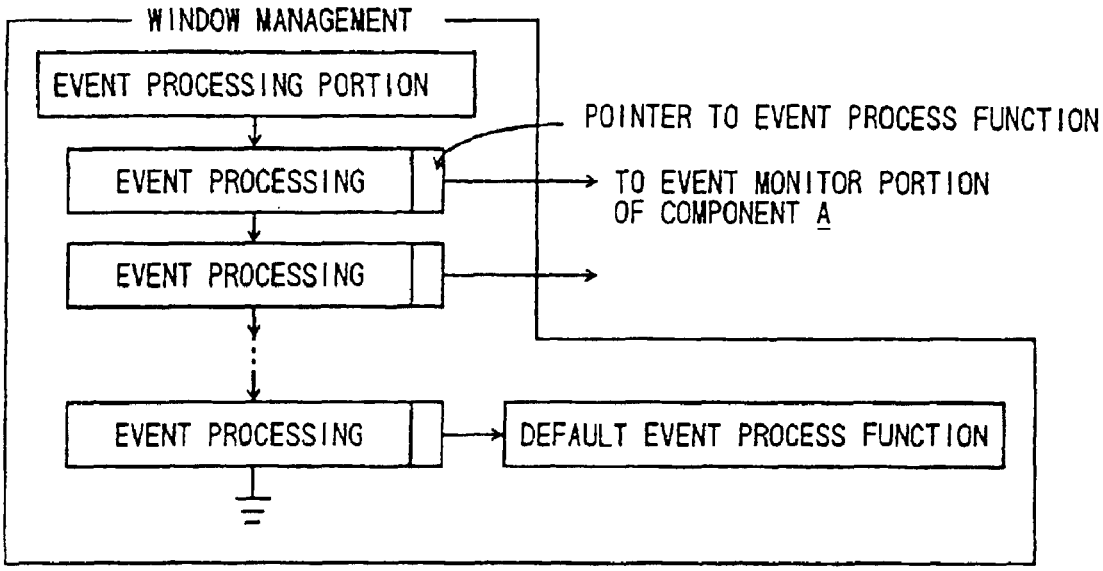
FIG. 104 is a typical illustration showing a structure of an event processing portion of the window management section shown in FIG. 103.
Figure 105:
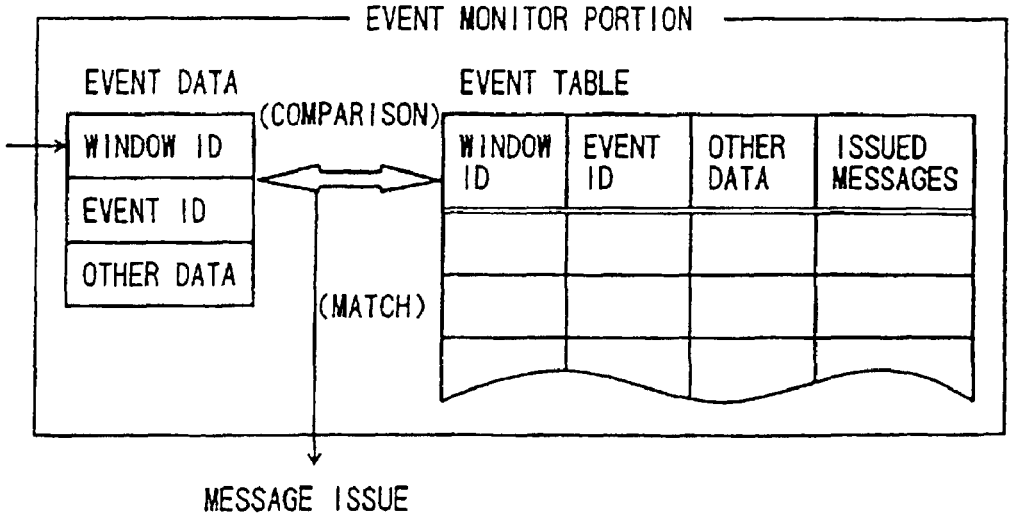
FIG. 105 is a typical illustration showing a structure of an event monitor portion of the component A shown in FIG. 103.

FIG. 104 is a typical illustration showing a structure of an event processing portion of the window management section shown in FIG. 103. FIG. 105 is a typical illustration showing a structure of an event monitor portion of the component A shown in FIG. 103.

The event processing portion of the window management section is a part in which upon receipt of the issue of an event, a processing associated with the event is carried out. The event processing portion has an event processing element list consisting of a plurality of event processing elements each storing therein pointers to various types of event processing functions. When a window event is generated, the event processing functions indicated by the pointers stored in each of the event processing elements are sequentially executed. The event processing element, which is arranged at the last of the event processing element list, indicates a default event process function. The default event process function serves, for example, when a button is clicked, to perform such a processing that a button on the display screen is moved as if the button on the display screen is depressed.

At the last of a drive method of the application A of the component A show in FIG. 103, there is described a program for requesting the window management unit to transmit the window event to one's own self (component A). Specifically, the event processing element, which stores therein a pointer to an event monitor portion of the component A, is added to the event processing list possessed by the event processing portion of the window management unit. In this manner, it is possible thereafter to refer to the occurred event at the event monitor portion of the component A, whenever the window event occurs.

The event monitor portion of the component A stores an event table shown in FIG. 105 in which described are a window ID for defining events concerning the application A, an event ID, other data, and a message issued when the event issued, in their corresponding relation.

When any of the window events occurs and event data related to the occurred window event is inputted through the window management unit shown in FIG. 104 to the event monitor portion of the component A, the event table is referred to by the window ID and the event ID of the event data to retrieve as to whether a window ID and an event ID, which match the window ID and the event ID of the event data, respectively, exist in the event table. When it is determined that a window ID and an event ID, which match the window ID and the event ID of the event data, respectively, exist in the event table, the component A issues a message associated with the matched window ID and event ID.

Figure 106:
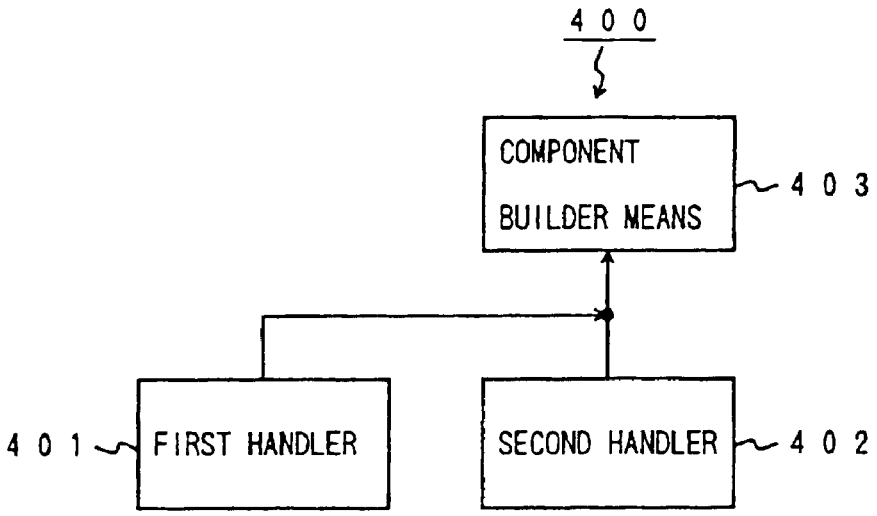
FIG. 106 is a basic construction view of a component builder apparatus according to the present invention.

FIG. 106 is a basic construction view of a component builder apparatus according to the present invention.

The component builder apparatus 400 comprises a first handler 401, a second handler 401 and a component builder means 403.

The first handler 401 serves to selectively indicate making of methods and messages.

The second handler 402 serves to input an instruction of an issue of a desired event of a predetermined existing software.

It is to be noted that while the first handler and the second handler are funtianlly separately distinguished from one another, it is acceptable that these handlers are constructed in form of a united body on a hardware basis. In the computer system shown in FIG. 1, the mouse 104 typically corresponds to both the first handler and the second handler.

The component builder means 403 builds a component which servers as one object in combination with an existing software. Specifically, the component builder means 403 serves, when making of a method is instructed by an operation of the first handler 401 and a predetermined event of the existing software is issued by an operation of the second handler 402, to make on the component a method which fires with a message issued by another object and issues the event, and serves, when making of a message is instructed to an operation of the first handler 401 and an issue of a predetermined event of the existing software is instruced by an operation of the second handler 402, in response to an occurrence of the event, to make on the component a message for informing other objects of the fact that the event occurred.

The component builder means 403 corresponds to the object builder unit 121 of the object ware programming system 120 shown in FIG. 2.

Figure 107:
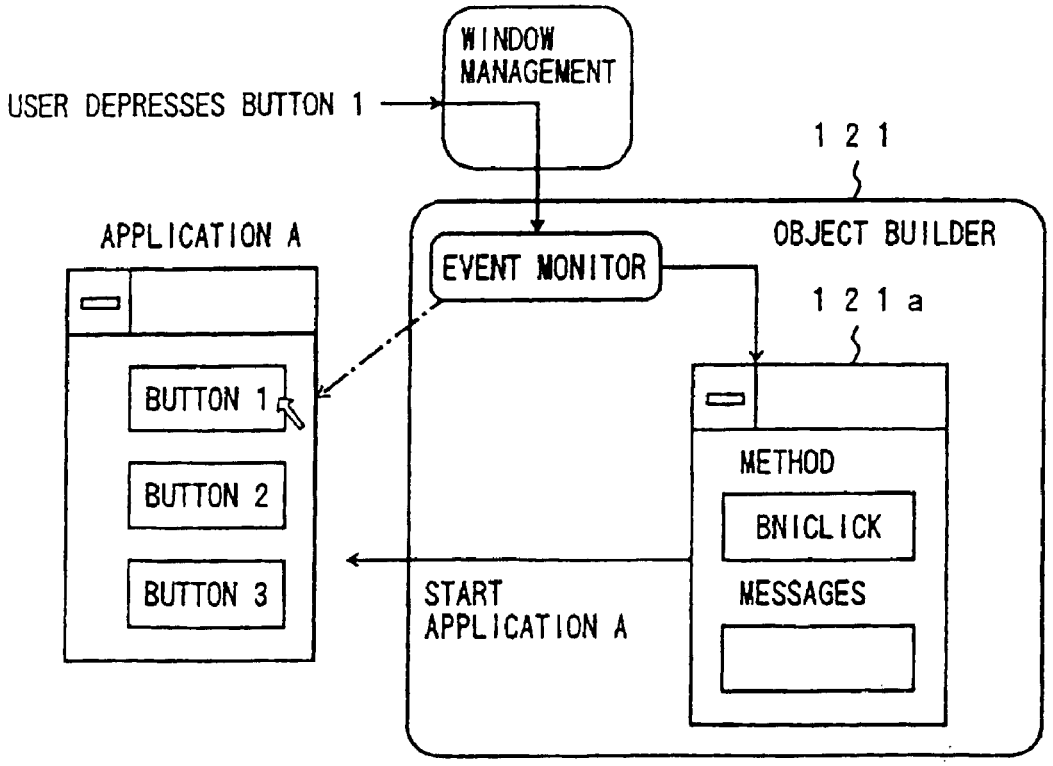
FIG. 107 is a typical illustration of an embodiment of a component builder apparatus according to the present invention.
Figure 108:
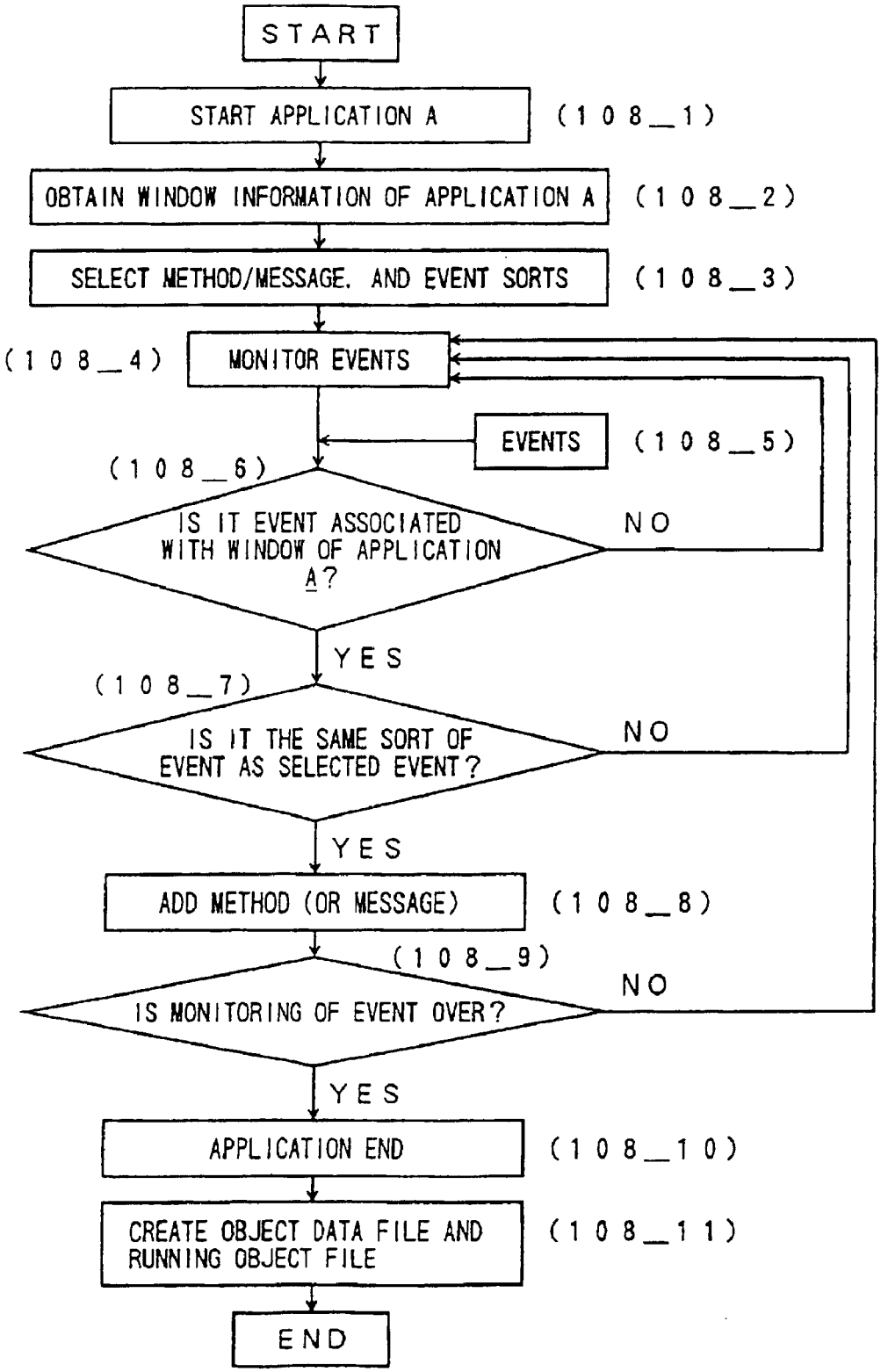
FIG. 108 is a flowchart useful for understanding processings of building a component using a component builder apparatus.

FIG. 107 is a typical illustration useful for understanding an embodiment of a component builder apparatus according to the present invention. FIG. 108 is a flowchart useful for understanding processings of building a component using a component builder apparatus.

An object builder portion 121 has a program 121a for building a component "including" or "involving" an existing software, which serves as one object together with the existing software. In step 108_1, the existing software (here application A) "included" from the program is driven in accordance with an instruction from a user. In step 108_2, window information of the application A is obtained and maintained.

Next, in step 108_3, the user makes a selection as to whether a method or a message is added to the component "including" the driven application A, and further makes a selection as to types of events (for example, a distinction between the button click and the menu click). The selection between the method and the message mentioned above is carried out in accordance with such a way that either one of the icons of a method and a message on the display screen is clicked by the mouse. A name of the method or the message to be added is registered into the selected column through an operation of the keyboard.

In step 108_4, an occurrence of events is monitored. When an event is generated by the button click or the like using a mouse (step 108_5), it is determined as to whether the generated event relates to a window of the application A (step 108_6). Further, in step 108_7, it is determined as to whether the generated event is the same type of event as the type (e.g. a distinction between the button click and the menu click) of the event selected in step 108_3.

With respect to the mechanism (function of the window management unit and the event monitor portion) for determining as to whether the generated event is a desired event, it is the same as that explained referring to FIGS. 103 to 105. Thus, the redundant explanation will be omitted.

When the generated event is concerned with the window of the application A and in addition is of the same type as the selected event, the event is added to the component A in the form of the method or the message in accordance with a distinction between the method and the message selected in step 108_3 together with the type of event. In other words, there is added a program such that when a message is received from another object at the component A "involving" the application A, a method of causing the event to generate is created, or when the event is generated, a message, which stands for that the event is generated, is informed to another object.

The above-mentioned operation is continued until a user gives an instruction for termination of monitoring an event (step 108_9). Upon receipt of the event monitoring termination instruction given by the user, the application (application A) now on drive is terminated in drive. Further, with respect to an object comprising the application A and the component A "involving" the application A, object data for display and wiring as to such an object is created and stored in the object data file 132, and the object is complied to create running object data and the running object data is stored in the running object file 133. In this manner, the component "involving" a desired existing software is built on an interactive basis.

Next, there will be explained embodiments of the fifth object-oriented programming supporting apparatus of the object-oriented programming supporting apparatuses according to the present invention.

Figure 109:
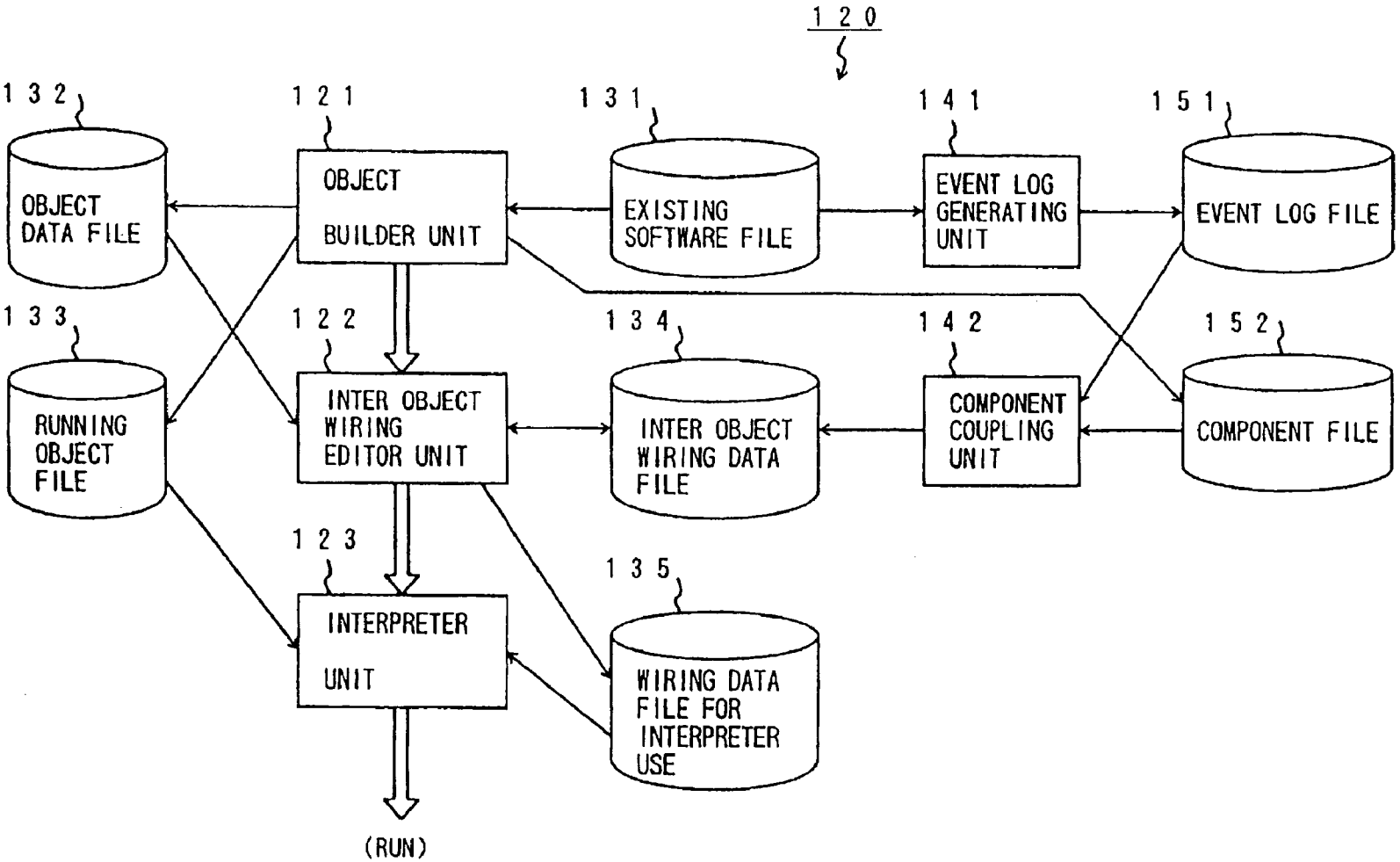
FIG. 109 is a construction view of an object ware programming system in which structural elements corresponding to the embodiment of the fifth object-oriented programming supporting apparatus according to the present invention are added to the object ware programming system shown in FIG. 2.

FIG. 109 is a construction view of an object ware programming system in which structural elements corresponding to the embodiment of the fifth object-oriented programming supporting apparatus according to the present invention are added to the object ware programming system 120 shown in FIG. 2. In FIG. 109, the same parts are denoted by the same reference numbers as those of FIG. 2, and the redundant description will be omitted.

An object ware programming system 120' shown in FIG. 109 comprises, in addition to the structural elements of the object ware programming system 120 shown in FIG. 2, an event log generating unit 141, a component coupling unit 142, an event log file 151 and a component file 152.

According to the embodiments of the component builder apparatus explained referring to FIGS. 107 and 108, the built component is stored in the object data file 132 and the running object file 133. On the contrary, according to the present embodiment shown in FIG. 109, while it is the same as the former embodiment with respect to the running object file, data for display and wiring of the built component is stored in the component file 152 instead of the object data file 132. It is to be noted that for the purpose of better understanding, the component file 152 is formed independently of the object data file 132, but it is acceptable that the component file 152 and the object data file 132 are constructed in the form of united body.

First, in accordance with the scheme explained referring to FIGS. 107 and 108, upon receipt of a message, an event of an existing software is issued, and a component, which outputs it in the form of a message that the event is issued, is built on each of a plurality of existing softwares and stored in the component file 152.

Next, a user drives simultaneously or sequentially those existing softwares in many number to generate a various types of events. Then, the event log generating unit 141 generates an event log indicate of as to what event is generated in what order. The event log thus generated is stored in the event log file 151.

When a generation of the event log is terminated, the component coupling unit 142 sequentially reads the events stored in the event log file 151 and wires the components stored in the component file 152 so that the events read out are sequentially generated.

A wiring result is stored in the interobject wiring data file 134. Further, if necessary, an additional wiring is conducted by the interobject wiring editor unit 122, and then the wiring is converted into wiring data for an interpreter use and stored in the wiring data file 135 for an interpreter use.

Figure 110:
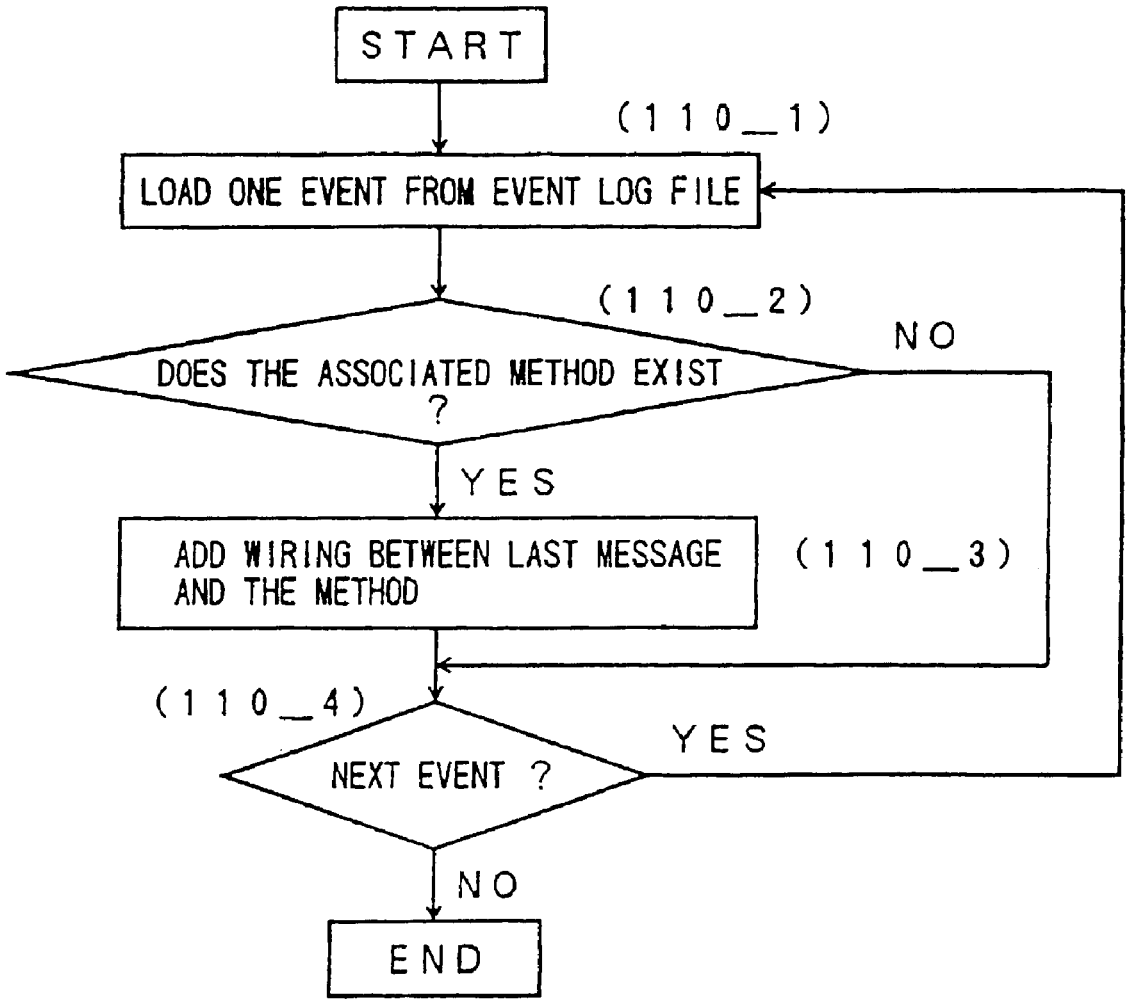
FIG. 110 is a flowchart useful for understanding an operation of a component coupling unit.
Figure 111:
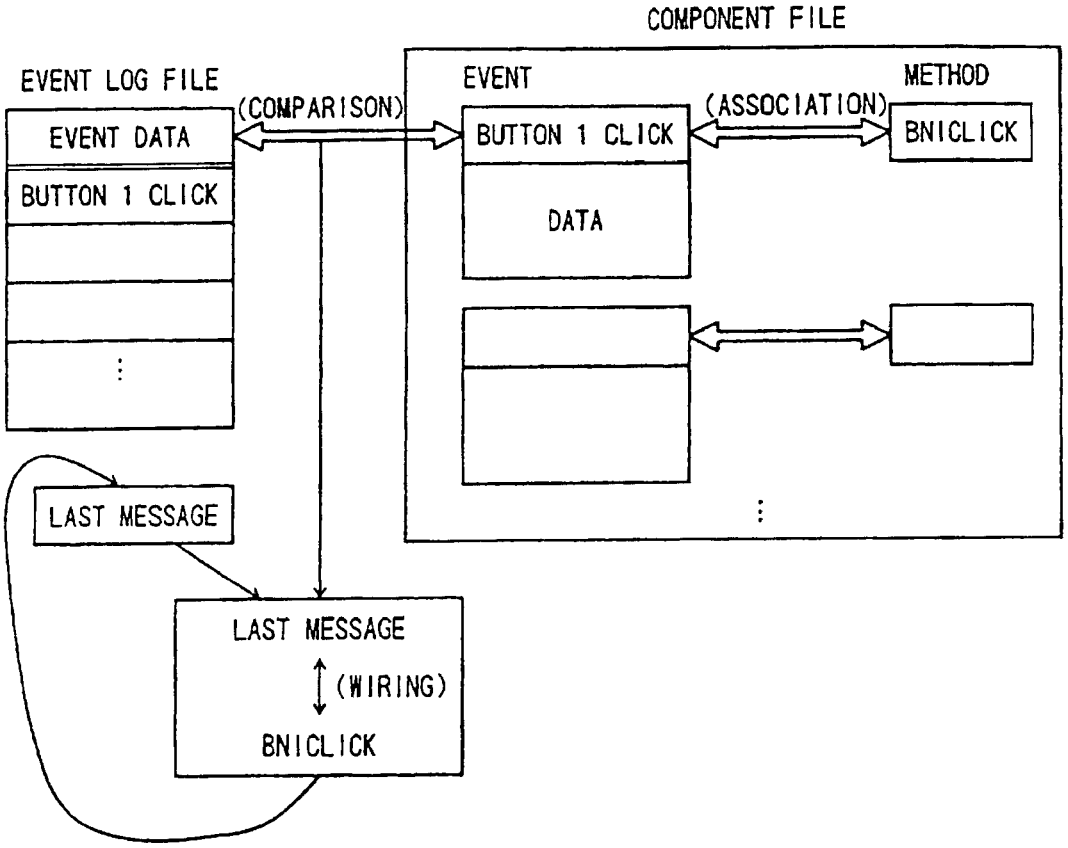
FIG. 111 is a flowchart useful for understanding an operation of a component coupling unit.

FIG. 110 is a flowchart useful for under standing an operation of a component coupling unit. FIG. 111 is a flowchart useful for understanding an operation of a component coupling unit.

As shown in FIG. 111, the event log file stores therein an event log in which a number of event data are arranged, which is generated in the event log generating unit 141 (cf. FIG. 109). The component file (cf. FIG. 109) stores therein a number of components in which the event is associated with the method in accordance with a manner mentioned above.

In the component coupling unit, as show in FIG. 110, an event is loaded by one from the event log file (step 110_1). In step 110_2, the loaded event is compared with a description of a corresponding relation between an event and a method, the description being possessed by a component stored in the component file, and the same event as the loaded event is retrieved from the component file. When the same event is identified, a wiring between a method associated with the event thus identified and a previous message (which will be described below) is conducted (step 110_3). A message, which is issued when the method is executed, is saved in the form of the "previous message". Regarding the "previous message", it is noted that the component file stores therein, as shown in FIG. 102, such a type of component that when a method is executed, a message indicative of that an event associated with the method is issued is issued. When the succeeding event remains in the event log stored in the event log file 141 (step 110_4), the process returns to step 110_1 in which the succeeding event is loaded, and a wiring is conducted in a similar fashion to that of the above.

Incidentally, with respect to the event which is arranged at the first of the event log, no "previous message" exists. Thus the wiring between a method and the previous message, as shown in FIG. 111, is not conducted, and a message, which is issued when the method issuing the event is executed, is saved in the form of the "previous message".

In the manner, it is possible to implement an automatic wiring among components. This wiring makes it possible in execution by the interpreter unit 123 to automatically sequentially issue events in accordance with the sequence of generation of the event log by a user, and thus an automatic operation for the existing software is possible.

When the event log is once produced, the automatic wiring is conducted sequentially in accordance with the sequence of the events arranged on the produced event log. It is also acceptable, however, that the event log once produced is displayed in the form of a table, and a user selects a necessary event from the table diapled so that an automatic wiring is conducted in accordance with a sequence selected by the user. According to this way, it is possible, when errors occur during a generation of an event log, to correct the errors without doing over again in generation of the event log.

In this manner, it is possible to implement, for example, an autopilot function of the WWW browser, by means of implementing an automatic operation of the application.

Next, there will be explained an alternative embodiment of a scheme in which an existing software is "involved" and replaced by an object, and an alternative embodiment of a component which serves as an object in combination with an existing software.

Figure 112:
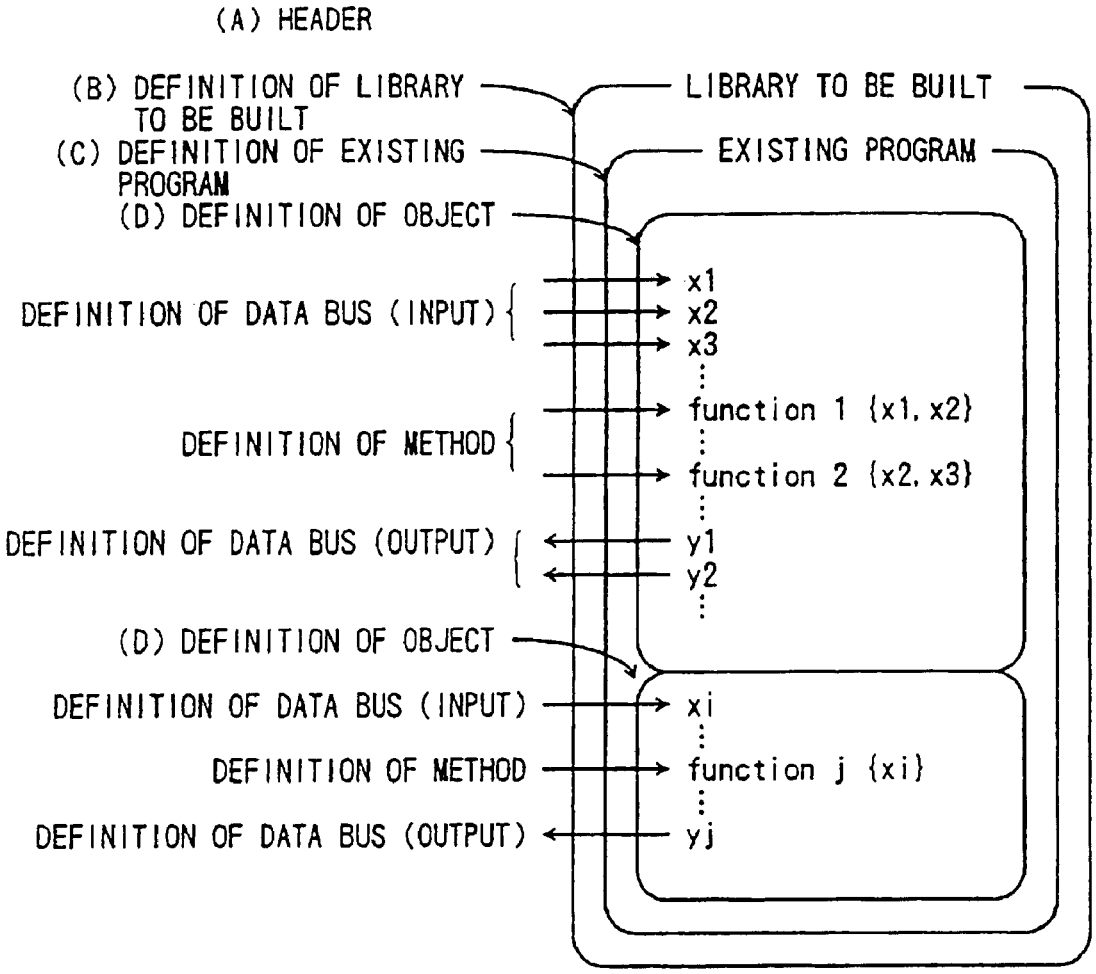
FIG. 112 is a conceptual view showing a state in which an existing soft ware is "included" in a component.

FIG. 112 is a conceptual view showing a state in which an existing software is "included" in a component. FIG. 113 is a view showing a table for definition items to give various definitions shown in FIG. 112. In FIG. 113, the object is referred to as "LSI".

Here, the existing software is an existing program consisting of a function or a set of functions, not solely executed but executed when called from other application program or the like.

In the existing programming, there exist data $x_1$, $x_2$, $x_3$, . . . , $x_i$, . . . to be received from other programming, functions function 1, function 2. . . , function j, . . . for performing a processing based on the received data, and data $y_1$, $y_2$, . . . , $y_j$, . . . to be transmitted to other program, which are representative of a result of processing.

When such a program is "involved", as shown in FIG. 112, it is assumed that an object is defined with a separation into two parts. The separating way is given with a certain degree of option, and may be determined by a user.

Here, various types of definitions are given as shown in FIG. 112. First, as (A) a header, there are defined a project name for specifying the whole of works or processings and an environment for executing the processings. (A) a header is followed by (B) a definition to be make up, (C) a definition of an existing program (defining as to which exiting program is to be replaced by an object), and (D) a definition of an object. It is noted that (D) a definition of an object is given with a plurality of definitions when the existing program is partitioned into a plurality of objects.

In (D) a definition of an object, there exist a definition of a data bus (a data input terminal) for use in data input for identifying a pointer which receives data from other object, a definition of a method (a method terminal) for identifying a pointer of an entrance of the processing to be executed, and a definition of a data bus (a data output terminal) for use in data output for identifying a pointer for data to be transmitted to other object. It is tob be noted that according to the present embodiment, since the existing program adapted for execution a processing when called from other program is assumed, it is not considered that this existing program requests (an issue of message) of another object a processing.

FIG. 113 is a view showing a table for definition items to give various definitions shown in FIG. 112.

The keyword groups appearing on the table are of a kind of program language useful for giving the above-mentioned various definitions. A detailed explanation of the individual keywords will be omitted, since it is not essential to the present invention.

Figure 114:
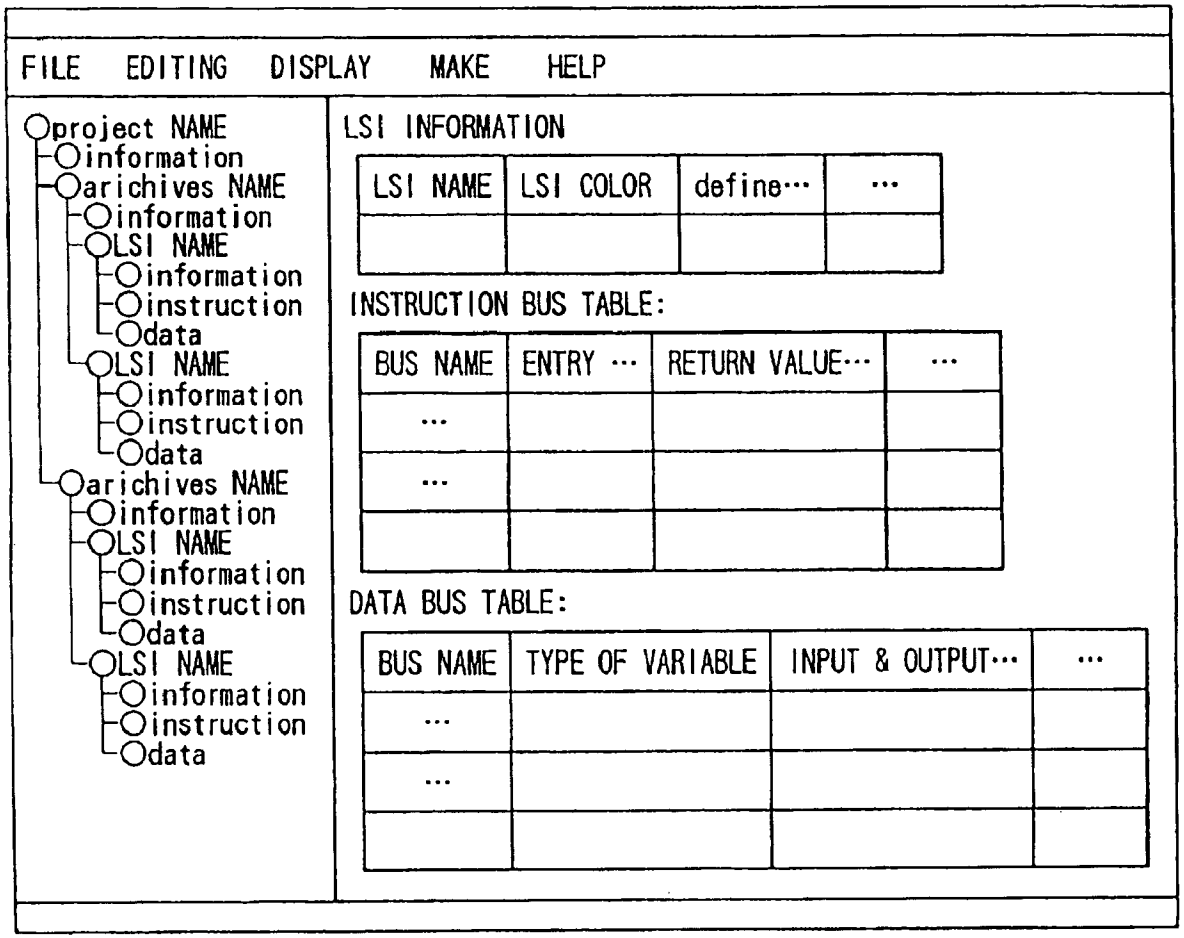
FIG. 114 is a view exemplarily showing images displayed on a display screen 102a when definitions are given.

FIG. 114 is a view exemplarily showing images displayed on a display screen 102a when definitions are given.

The left side of the screen shows structures of definitions, each of which serves as an icon. When any of the icons is clicked, there is displayed as shown at the right side of the screen a frame of a table for giving a definition of the item associated with the clicked icon. Filling the frames one by one completes a definition table.

An adoption of such a type of scheme that the frame of the table is filled makes it possible to readily give a definition on an interactive basis.

When the definition table is completed, and existing program and a component comprising the definition table related to the existing program are stored in the object data file 132 with an extraction of data for display and wiring by the object builder unit 121 shown in FIG. 2, and also are stored in the running object file 133 through a conversion into a running format by a compiler.

In this manner, it is possible to take in an existing software to the object ware programming system in the form of the object, regardless of a format of the exiting software, maintaining the existing software as it is.

As described above, according to the present invention, it is possible to specially enhance reuse of the software, and also to implement the software higher in the running speed.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An object-oriented programming apparatus for interconnecting a plurality of objects each having data and operations, said object-oriented programming apparatus comprising:

instruction coupling means for permitting a transfer of messages between a first object, having an output instruction bus portion for performing processing for issue of outgoing messages directed to at least one other object, and a second object having an input instruction bus portion responsive to incoming messages issued by another object and directed to the second object for activating at least one method of the second object associated with the incoming messages, by associating a message of the first object with a method of the second object;

data element list generating means for generating a data element list on the first object, the data element list containing pointers to data storage areas for storing data;

pointer element list generating means for generating a pointer element list of the second object, the pointer element list consisting pointers to pointer storage areas for storing pointers to data; and data coupling means for permitting transfer of data between the first object and the second object by writing the pointers arranged in the data element list of the first object into the pointer storage areas indicated by the pointers arranged in the pointer element list of the second object.

2. An object-oriented programming apparatus according to claim 1, wherein said instruction coupling means generates a method element list in which arranged are method elements including a method ID for specifying the method of the second object associated with the message of the first object, and a pointer to the second object.

[3. An object-oriented program storage medium for storing a plurality of objects each having data and operations, said object-oriented program storage medium storing an object coupling program to control a computer to perform a method comprising:

permitting transfer of messages between a first object having an output instruction bus portion to issue messages directed to at least one other object and a second object having an input instruction bus portion responsive to a message issued by the first object and directed to the second object for activating a method of the second object, by providing a correspondence between the message of the first object and the method of the second object;

generating a data element list of the first object, the data element list containing pointers to data storage areas for storing data;

generating a pointer element list of the second object, the pointer element list containing pointers to pointer storage areas in the second object for storing pointers to data in the first object; and permitting transfer of data between the first object having the data element list and the second object having the pointer element list, by writing the pointers arranged in the data element list of the first object into the pointer storage areas indicated by the pointers arranged in the pointer element list of the second object.]

[4. An object-oriented program storage medium for storing a plurality of objects each having data and operations, said object-oriented program storage medium storing an object coupling program to control a computer to perform a method comprising:

permitting transfer of a message between a first object having an output instruction bus portion to issue outgoing messages directed to at least one other object and a second object having an input insertion bus portion responsive to incoming messages issued by other objects and directed to the second object for activating at least one method of the second object associated with the incoming messages, by providing a correspondence between the message of the first object and a method of the second object;

generating a data element list of the first object, the data element list containing pointers to data storage areas for storing data;

generating a method element list of the first object in which arranged are method elements including a method ID for specifying the method of the second object associated with the message of the first object, and a pointer to the second object, the first object, when issuing the message, referring to a method element in the method element list associated with the message and calling the second object based on the pointer in the method element, giving the method ID in the method element as an argument;

generating a pointer element list of the second object, the pointer element list containing pointers to pointer storage areas in the second object for storing pointers to data in the first object; and permitting transfer of data between the first object having the data element list and the second object having the pointer element list, by writing the pointers arranged in the data element list of the first object into the pointer storage areas indicated by the pointers arranged in the pointer element list of the second object.]

[5. An object-oriented program storage medium according to claim 4, wherein the second object receives the message from the first object and executes the method identified by the method ID in the argument of the message.]

[6. A method of creating software objects, comprising:

generating a data element list for a first object, the data element list including first pointers to data storage areas;

generating a pointer element list for a second object, the pointer element list including second pointers to pointer storage areas; and providing for transfer of data from the first object to the second object by writing the first pointers into the pointer storage areas indicated by the second pointers.]

[7. At least one computer program stored on a computer-readable medium, composing a method of:

generating a data element list for a first object, the data element list including first pointers to data storage areas;

generating a pointer element list for a second object, the pointer element list including second pointers to pointer storage areas; and providing for transfer of data from the first object to the second object by writing the first pointers into the pointer storage areas indicated by the second pointers.]

[8. An object-oriented programming apparatus, comprising:

a memory containing data storage areas and pointer storage areas; and a processor, coupled to said memory, programmable to generate a data element list for a first object and a pointer element list for a second object, the data element list including first pointers to the data storage areas and the pointer element list including second pointers to the pointer storage areas, and to transfer data from the first object to the second object by writing the first pointers into the pointer storage areas indicated by the second pointers.]

[9. A method of creating software objects, comprising:

generating a method element list of a first object, each method element in the method element list including a method ID specifying a method of a second object associated with a message of the first object, and an object pointer to the second object that executes the method specified by the method ID;

generating a data element list of the first object, the data element list including first data pointers to data storage areas;

providing of issuance of the message from the first object by referencing a method element in the method element list associated with the message, and calling the second object based on the object pointer in the method element, giving the method ID stored in the method element as an argument;

generating a pointer element list of the second object, the pointer element list including second data pointers to pointer storage areas; and providing for transfer of data from the first object to the second object by writing the first data pointers into the pointer storage areas indicated by the second data pointers.]

* * * * *

UNITED STATES PATENT AND TRADEMARK OFFICE

CERTIFICATE OF CORRECTION

PATENT NO. : RE 40,189 E
APPLICATION NO. : 11/370278
DATED : March 25, 2008
INVENTOR(S) : Fumio Nagashima et al.

It is certified that error appears in the above-identified patent and that said Letters Patent is hereby corrected as shown below:

Title Page, Column 2 (Other Publications), Line 2, change “embadded” to --embedded--.

Title Page, Column 2 (Other Publications), Line 8, change “resubale” to --reusable--.

Title Page, Column 2 (Other Publications), Line 11, change “librray” to --library--.

Column 54, Line 5, change “on” to --of--.

Column 54, Line 10, change “consisting” to --containing--.

Column 54, Line 23, change “[3.” to --3--.

Column 54, Line 49, change “object.]” to --object.--.

Column 54, Line 50, change “[4.” to --4--.

Column 55, Line 21, change “object.]” to --object.--.

Column 55, Line 22, change “[5.” to --5--.

Column 55, Line 25, change “message.]” to --message.--.

Column 55, Line 26, change “[6.” to --6--.

Column 55, Line 35, change “pointers.]” to --pointers.--.

Column 55, Line 36, change “[7.” to --7--.

Column 55, Line 38, change “composing” to --comprising--.

UNITED STATES PATENT AND TRADEMARK OFFICE

CERTIFICATE OF CORRECTION

PATENT NO. : RE 40,189 E
APPLICATION NO. : 11/370278
DATED : March 25, 2008
INVENTOR(S) : Fumio Nagashima et al.

It is certified that error appears in the above-identified patent and that said Letters Patent is hereby corrected as shown below:

Column 56, Line 3, change “pointers.]” to -- pointers. --.

Column 56, Line 4, change “[8.” to --8--.

Column 56, Line 17, change “pointers.]” to --pointers.--.

Column 56, Line 18, change “[9.” to --9--.

Column 56, Line 29, after “providing” change “of” to --for--.

Column 56, Line 42, change “pointers.]” to --pointers.--.

Signed and Sealed this

Second Day of September, 2008

JON W. DUDAS
*Director of the United States Patent and Trademark Office*

UNITED STATES PATENT AND TRADEMARK OFFICE

CERTIFICATE OF CORRECTION

PATENT NO. : RE 40,189 E
APPLICATION NO. : 11/370278
DATED : March 25, 2008
INVENTOR(S) : Fumio Nagashima et al.

It is certified that error appears in the above-identified patent and that said Letters Patent is hereby corrected as shown below:

Delete the text appearing at Column 54, Line 23 through Column 56, Line 40 and insert therefor the text of claims 3-9

--3. An object-oriented program storage medium for storing a plurality of objects each having data and operations, said object-oriented program storage medium storing an object coupling program to control a computer to perform a method comprising:

permitting transfer of messages between a first object having an output instruction bus portion to issue messages directed to at least one other object and a second object having an input instruction bus portion responsive to a message issued by the first object and directed to the second object for activating a method of the second object, by providing a correspondence between the message of the first object and the method of the second object;

generating a data element list of the first object, the data element list containing pointers to data storage areas for storing data;

generating a pointer element list of the second object, the pointer element list containing pointers to pointer storage areas in the second object for storing pointers to data in the first object; and permitting transfer of data between the first object having the data element list and the second object having the pointer element list, by writing the pointers arranged in the data element list of the first object into the pointer storage areas indicated by the pointers arranged in the pointer element list of the second object.

UNITED STATES PATENT AND TRADEMARK OFFICE

CERTIFICATE OF CORRECTION

PATENT NO. : RE 40,189 E
APPLICATION NO. : 11/370278
DATED : March 25, 2008
INVENTOR(S) : Fumio Nagashima et al.

It is certified that error appears in the above-identified patent and that said Letters Patent is hereby corrected as shown below:

4. An object-oriented program storage medium for storing a plurality of objects each having data and operations, said object-oriented program storage medium storing an object coupling program to control a computer to perform a method comprising:

permitting transfer of a message between a first object having an output instruction bus portion to issue outgoing messages directed to at least one other object and a second object having an input instruction bus portion responsive to incoming messages issued by other objects and directed to the second object for activating at least one method of the second object associated with the incoming messages, by providing a correspondence between the message of the first object and a method of the second object;

generating a data element list of the first object, the data element list containing pointers to data storage areas for storing data;

generating a method element list of the first object in which arranged are method elements including a method ID for specifying the method of the second object associated with the message of the first object, and a pointer to the second object, the first object, when issuing the message, referring to a method element in the method element list associated with the message and calling the second object based on the pointer in the method element, giving the method ID in the method element as an argument;

generating a pointer element list of the second object, the pointer element list containing pointers to pointer storage areas in the second object for storing pointers to data in the first object; and permitting transfer of data between the first object having the data element list and the second object having the pointer element list, by writing the pointers arranged in the data element list of the first object into the pointer storage areas indicated by the pointers arranged in the pointer element list of the second object.

5. An object-oriented program storage medium according to claim 12, wherein the second object receives the message from the first object and executes the method identified by the method ID in the argument of the message.

UNITED STATES PATENT AND TRADEMARK OFFICE

CERTIFICATE OF CORRECTION

PATENT NO. : RE 40,189 E
APPLICATION NO. : 11/370278
DATED : March 25, 2008
INVENTOR(S) : Fumio Nagashima et al.

It is certified that error appears in the above-identified patent and that said Letters Patent is hereby corrected as shown below:

6. A method of creating software objects, comprising:

generating a data element list for a first object, the data element list including first pointers to data storage areas;

generating a pointer element list for a second object, the pointer element list including second pointers to pointer storage areas; and providing for transfer of data from the first object to the second object by writing the first pointers into the pointer storage areas indicated by the second pointers.

7. At least one computer program stored on a computer-readable medium, comprising a method of:

generating a data element list for a first object, the data element list including first pointers to data storage areas;

generating a pointer element list for a second object, the pointer element list including second pointers to pointer storage areas; and providing for transfer of data from the first object to the second object by writing the first pointers into the pointer storage areas indicated by the second pointers.

8. An object-oriented programming apparatus, comprising:

a memory containing data storage areas and pointer storage areas; and a processor, coupled to said memory, programmable to generate a data element list for a first object and a pointer element list for a second object, the data element list including first pointers to the data storage areas and the pointer element list including second pointers to the pointer storage areas, and to transfer data from the first object to the second object by writing the first pointers into the pointer storage areas indicated by the second pointers.

UNITED STATES PATENT AND TRADEMARK OFFICE

CERTIFICATE OF CORRECTION

PATENT NO. : RE 40,189 E
APPLICATION NO. : 11/370278
DATED : March 25, 2008
INVENTOR(S) : Fumio Nagashima et al.

It is certified that error appears in the above-identified patent and that said Letters Patent is hereby corrected as shown below:

9. A method of creating software objects, comprising:

generating a method element list of a first object, each method element in the method element list including a method ID specifying a method of a second object associated with a message of the first object, and an object pointer to the second object that executes the method specified by the method ID;

generating a data element list of the first object, the data element list including first data pointers to data storage areas;

providing for issuance of the message from the first object by referencing a method element in the method element list associated with the message, and calling the second object based on the object pointer in the method element, giving the method ID stored in the method element as an argument;

generating a pointer element list of the second object, the pointer element list including second data pointers to pointer storage areas; and providing for transfer of data from the first object to the second object by writing the first data pointers into the pointer storage areas indicated by the second data pointers.--.

Column 54, Line 58, change “insertion” to --instruction--.

Signed and Sealed this

Eighteenth Day of November, 2008

JON W. DUDAS
*Director of the United States Patent and Trademark Office*